(12) United States Patent
Namba

(10) Patent No.: US 11,579,270 B2
(45) Date of Patent: Feb. 14, 2023

(54) DEPTH IMAGE ACQUIRING APPARATUS, CONTROL METHOD, AND DEPTH IMAGE ACQUIRING SYSTEM

(71) Applicant: Sony Semiconductor Solutions Corporation, Kanagawa (JP)

(72) Inventor: Kazuhide Namba, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 332 days.

(21) Appl. No.: 16/633,623

(22) PCT Filed: Oct. 11, 2018

(86) PCT No.: PCT/JP2018/037854
§ 371 (c)(1),
(2) Date: Jan. 24, 2020

(87) PCT Pub. No.: WO2019/078074
PCT Pub. Date: Apr. 25, 2019

(65) Prior Publication Data
US 2020/0371217 A1    Nov. 26, 2020

(30) Foreign Application Priority Data

Oct. 20, 2017 (JP) .............................. JP2017-203519
Sep. 21, 2018 (JP) .............................. JP2018-176947

(51) Int. Cl.
*G01S 7/497* (2006.01)
*G01S 17/931* (2020.01)
(Continued)

(52) U.S. Cl.
CPC ............ *G01S 7/497* (2013.01); *G01S 7/4813* (2013.01); *G01S 7/4816* (2013.01);
(Continued)

(58) Field of Classification Search
CPC ...... G01S 7/497; G01S 7/4813; G01S 7/4816; G01S 17/894; G01S 17/931; G01S 17/36;
(Continued)

(56) References Cited

U.S. PATENT DOCUMENTS 10,234,546 B2 * 3/2019 Droz ....................... G01S 17/10
10,627,493 B2 * 4/2020 Morikawa ............. G01S 7/4816
(Continued)

FOREIGN PATENT DOCUMENTS

DE    10 2011 011 875 B3    7/2012
DE    10 2011 011 875 C5    3/2014
(Continued)

OTHER PUBLICATIONS

International Search Report and Written Opinion dated Jan. 23, 2019 in connection with International Application No. PCT/JP2018/037854.

*Primary Examiner* — Seung C Sohn
(74) *Attorney, Agent, or Firm* — Wolf, Greenfield & Sacks, P.C.

(57) ABSTRACT

It is intended to promote enhancement of performance of acquiring a depth image. A depth image acquiring apparatus includes a light emitting diode, a TOF sensor, and a filter. The light emitting diode irradiates modulated light toward a detection area becoming an area in which a depth image is to be acquired to detect a distance. The TOF sensor receives incident light into which the light irradiated from the light emitting diode is reflected by an object lying in the detection area to become, thereby outputting a signal used to produce the depth image. The filter passes more light having a wavelength in a predetermined pass bandwidth than light having a wavelength in a pass bandwidth other than the predetermined pass bandwidth of the light made incident toward the TOF sensor. In this case, at least one of the light emitting diode, the TOF sensor, or arrangement of the filter (Continued)

is controlled in accordance with a temperature of the light emitting diode or the TOF sensor. The present technique, for example, can be applied to a system for with international search report acquiring a depth image by using a TOF system.

18 Claims, 39 Drawing Sheets

(51) Int. Cl.
G01S 17/894 (2020.01)
G01S 7/48 (2006.01)
G02B 5/20 (2006.01)
G01S 7/481 (2006.01)
H04N 5/225 (2006.01)
G06V 10/143 (2022.01)
G06V 10/145 (2022.01)

(52) U.S. Cl.
CPC .......... *G01S 17/894* (2020.01); *G01S 17/931* (2020.01); *G02B 5/201* (2013.01); *G02B 5/208* (2013.01); *G06V 10/143* (2022.01); *G06V 10/145* (2022.01); *H04N 5/2256* (2013.01)

(58) Field of Classification Search
CPC ..... G01S 7/4815; G01S 7/4914; G02B 5/201; G02B 5/208; G06V 10/143; G06V 10/145; G06V 2201/121; G06V 20/58; G06V 20/64; H04N 5/2256
See application file for complete search history.

(56) References Cited

U.S. PATENT DOCUMENTS

| | | | |
|---|---|---|---|
| 10,739,444 B2* | 8/2020 | Hall | ............ G01S 7/4863 |
| 2011/0222064 A1 | 9/2011 | Umeda et al. | |
| 2011/0267522 A1 | 11/2011 | Gendai et al. | |
| 2017/0201702 A1 | 7/2017 | Niwa et al. | |

FOREIGN PATENT DOCUMENTS

| | | |
|---|---|---|
| JP | 2010122183 A | 6/2010 |
| JP | 2016-035398 | 3/2016 |

* cited by examiner

DEPTH IMAGE ACQUIRING APPARATUS, CONTROL METHOD, AND DEPTH IMAGE ACQUIRING SYSTEM

CROSS-REFERENCE TO RELATED APPLICATIONS

This application claims the benefit under 35 U.S.C. § 371 as a U.S. National Stage Entry of International Application No. PCT/JP2018/037854, filed in the Japanese Patent Office as a Receiving Office on Oct. 11, 2018, which claims priority to Japanese Patent Application Number JP2018-176947, filed in the Japanese Patent Office on Sep. 21, 2018, and Japanese Patent Application Number JP2017-203519, filed in the Japanese Patent Office on Oct. 20, 2017, each of which is hereby incorporated by reference in its entirety.

TECHNICAL FIELD

The present disclosure relates to a depth image acquiring apparatus, a control method, and a depth image acquiring system, and more particularly to a depth image acquiring apparatus, a control method, and a depth image acquiring system each of which enables enhancement of performance of acquiring a depth image to be promoted.

BACKGROUND ART

In recent years, a TOF (Time Of Flight) system for measuring a distance on the basis of a light time-of-flight has included a direct TOF system, and an indirect TOF system. In this case, in the direct TOF system, a distance is measured from a light time-of-flight directly measured by utilizing a pulse wave. In the indirect TOF system, a distance is measured from a light time-of-flight indirectly calculated by utilizing a phase of modulated light.

Now, the system for acquiring the depth image by utilizing either the indirect TOF system or the direct TOF system readily received an influence of ambient light such as sunlight when a distance was measured in the outdoors. Therefore, the accuracy of the depth image was reduced in some cases. For this reason, in the case where the light irradiated from a light source had a given intensity, a distance by which the depth image could be acquired with sufficient accuracy (hereinafter, refer to as an acquisition distance) was largely reduced due to the influence of the ambient light in some cases.

For example, PTL 1 proposes a technique in which in a distance measuring apparatus for measuring a distance on the basis of a phase difference between illumination light emitted from a light source and reflected light detected by a detector, a wavelength of the illumination light is limited to the range of 1290 to 1330 nm, thereby suppressing the influence of the ambient light.

CITATION LIST

Patent Literature

PTL 1: JP 2016-35398A

SUMMARY OF INVENTION

Technical Problem

As disclosed in PTL 1 described above, the technique for suppressing the influence of the ambient light is proposed. However, it is desired that the influence of the ambient light is more efficiently suppressed, and the acquisition distance by which the higher accurate depth image can be acquired is made longer, thereby enhancing the acquisition performance of the depth image.

The present disclosure has been made in the light of such a situation, and enables enhancement of acquisition performance of a depth image to be realized.

Solution to Problem

A depth image acquiring apparatus of an aspect of the present disclosure is provided with a light source emitting unit, a sensor, a filter unit, and an environment sensor In this case, the light emitting unit irradiates modulated light toward a detection area becoming an area in which a depth image is to be acquired to detect a distance. The sensor receives incident light into which the light irradiated from the light emitting unit is reflected by an object lying in the detection area to become, and outputs a signal used to produce the depth image. The filter unit passes more light having a wavelength in a predetermined pass band of light made incident toward the sensor than light having a wavelength other than the predetermined pass band. The environment sensor acquires environment information at the light emitting unit or the sensor. Some embodiments are directed to a depth image acquiring apparatus. The depth image acquiring apparatus may comprise a light emitting unit configured to irradiate modulated light toward a detection area, a sensor configured to receive the modulated light upon being reflected by an object positioned in the detection area and output a signal based on the received modulated light so as to generate depth information, a filter unit configured to pass more light having a wavelength in a predetermined pass bandwidth than light having a wavelength in a pass bandwidth other than the predetermined pass bandwidth, an environment sensor configured to acquire environment information at the light emitting unit or the sensor, and a controller configured to control at least one among the light emitting unit, the sensor, or the filter unit in accordance with the environment information acquired by the environment sensor.

A control method of an aspect of the present disclosure includes, by a depth image acquiring apparatus provided with a light emitting unit, a sensor, a filter unit, and an environment sensor acquiring environment information at the light source or the sensor, and controlling any one of the light source, the sensor, or arrangement of a filter unit in accordance with the environment information. In this case, the light source irradiates modulated light toward a detection area becoming an area in which a depth image is to be acquired to detect a distance. The sensor receives incident light into which the light irradiated from the light emitting unit is reflected by an object lying in the detection area to become, and outputs a signal used to produce the depth image. The filter unit passes more light having a wavelength in a predetermined pass band of light made incident toward the sensor than light having a wavelength other than the predetermined pass band. Some embodiments are directed to a method of controlling a depth image acquiring apparatus including a light emitting unit configured to irradiate modulated light toward a detection area in which a depth image is to be acquired to detect a distance, a sensor configured to receive light reflected by an object positioned in the detection area in response to receiving the modulated light, and to produce the depth image by outputting a signal representative of the reflected light, and a filter unit configured to pass more light having a wavelength in a predetermined pass bandwidth than light having a wavelength in a pass bandwidth other than the predetermined pass bandwidth of the reflected light. The method may comprise acquiring environment information at the light emitting unit or the sensor, and controlling at least one of the light emitting unit, the sensor, or the filter unit in accordance with the environment information.

A depth image acquiring system of an aspect of the present disclosure is provided with a conjunction control portion for controlling at least any one of a light emitting unit, a sensor, or arrangement of a filter in accordance with environment information acquired by an environment sensor. In this case, there is received light made incident through a filter for passing only more light having a wavelength of a predetermined pass band of light into which light from a light source for irradiating modulated light toward a detection area becoming an area in which a depth image is to be acquired to detect a distance, or light emitted from the light source which is reflected by an object lying in the detection area to become with respect to light having a wavelength other than the predetermined pass band. The environment information is acquired by an environment sensor for acquiring the environment information of a sensor for outputting a signal used to produce the depth image. Some embodiments are directed to a depth image acquiring system. The depth image acquiring system may comprise a controller configured to control at least one among a light emitting unit, a sensor, or a filter unit in accordance with environment information at the light emitting unit or to the sensor. The environment information may be acquired using an environment sensor. The light emitting unit may be configured to irradiate modulated light toward a detection area in which a depth image is to be acquired to detect a distance. The sensor may be configured to receive light having passed through the filter unit and reflected by an object positioned in the detection area in response to receiving the modulated light. The filter unit may be configured for passing more light having a wavelength in a predetermined pass bandwidth than light having a wavelength in a pass bandwidth other than the predetermined pass bandwidth.

In the aspect of the present disclosure, the modulated light is irradiated from the light source toward the detection area becoming the area in which the depth image is to be acquired to detect the distance. The light into which the light irradiated from the light source is reflected by the object lying in the detection area to be made incident so as to become is received by the sensor, thereby outputting the signal used to reproduce the depth image. Of the light made incident toward the sensor, more light having the wavelength in the predetermined pass band than the light having the wavelength other than the predetermined pass band is passed through the filter. In addition, at least one of the light source, the sensor, or the arrangement of the filter is controlled in accordance with the environment information acquired from the light source or the environment sensor for acquiring the environment information of the sensor.

Advantageous Effects of Invention

According to the aspect of the present disclosure, the enhancement of the acquisition performance for the depth image can be realized.

It should be noted that the effect described here is not necessarily limited, and any of the effects described in the present disclosure may be available.

DESCRIPTION OF EMBODIMENTS

Hereinafter, concrete embodiments to each of which the present technique is applied will be described in detail with reference to the drawings.

First Example of Configuration of Depth Image Acquiring Apparatus

Figure 1:
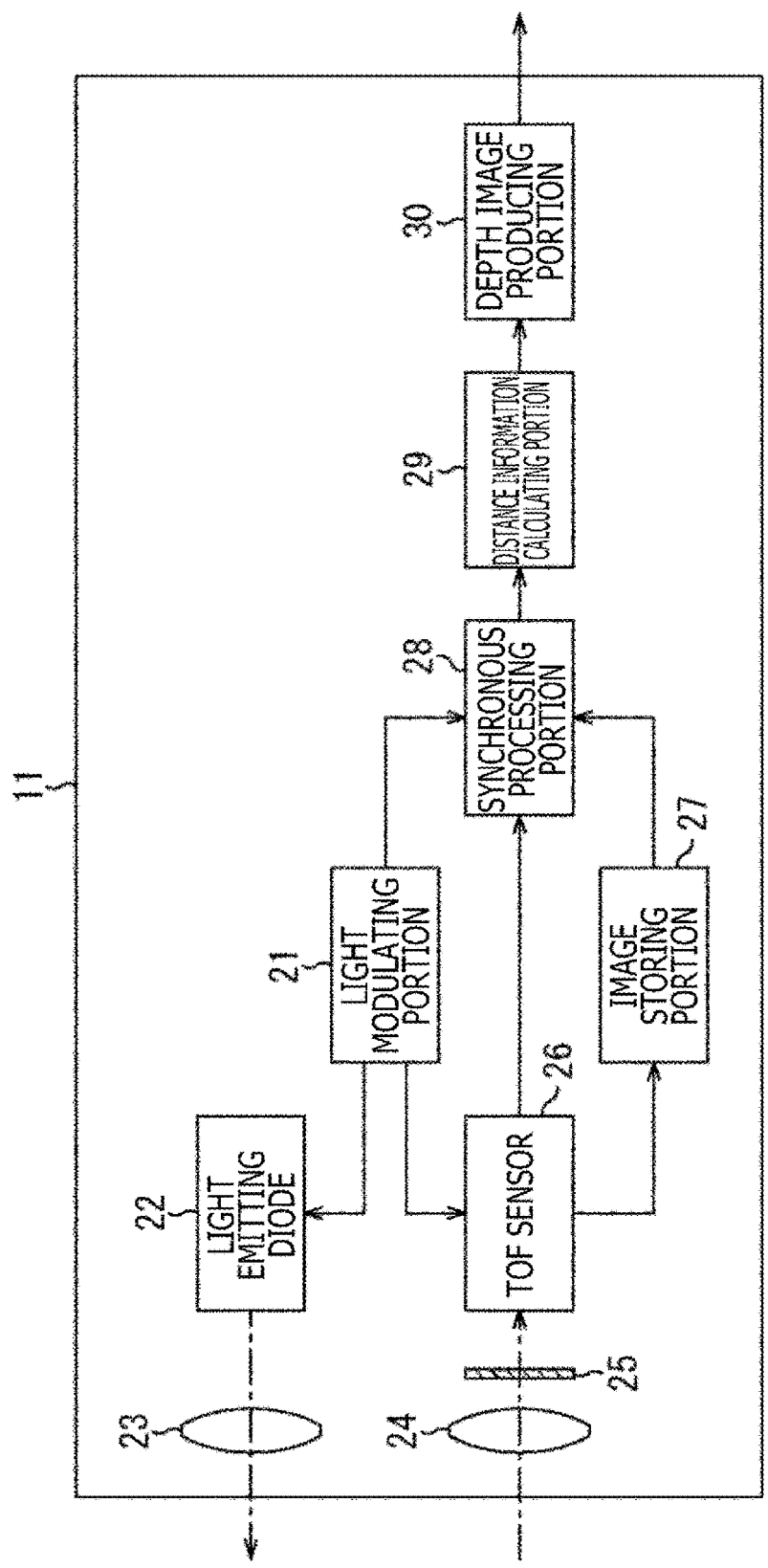
FIG. 1 is a block diagram depicting an example of a configuration of a first embodiment of a depth image acquiring apparatus to which the present technique is applied.

FIG. 1 is a block diagram depicting an example of a configuration of a first embodiment of a depth image acquiring apparatus to which the present technique is applied.

In FIG. 1, a depth image acquiring apparatus 11 is configured to include a light modulating portion 21, a light emitting diode 22, a light projecting lens 23, a light receiving lens 24, a filter 25, a TOF sensor 26, an image storing portion 27, a synchronous processing portion 28, a distance information calculating portion 29, and a depth image producing portion 30.

The light modulating portion 21 supplies a modulation signal used to modulate light output from the light emitting diode 22 with a high frequency having, for example, a frequency of approximately 10 MHz to the light emitting diode 22. In addition, the light modulating portion 21 supplies a timing signal exhibiting a timing at which the light from the light emitting diode 22 is modulated to each of the TOF sensor 26 and the synchronous processing portion 28.

The light emitting diode 22 emits light in invisible light area such as infrared light while modulating the light at a high speed in accordance with the modulation signal supplied thereto from the light modulating portion 21. In addition, the light emitting diode 22 irradiates the light concerned toward a detection area becoming an area in which the depth image acquiring apparatus 11 should acquire a depth image to detect a distance. It should be noted that although in the present embodiment, the light source for irradiating the light toward the detection area is described as the light emitting diode 22, any other light source such as a laser diode may also be used instead.

In addition, the light emitting diode 22 may be arranged adjacent to the TOF sensor 26 which will be described later. With this configuration, a path difference between outward and return when the emitted light is reflected by an object to return back to the depth image acquiring apparatus 11 becomes smallest and thus a distance measurement error can be reduced. Moreover, the light emitting diode 22 and the TOF sensor 26 may be formed integrally with each other in one chassis. With this configuration, a dispersion of the path difference between outward and return when the emitted light is reflected by the object to return back to the depth image acquiring apparatus 11 can be suppressed, and thus the distance measurement error can be reduced.

The light projecting lens 23 is configured by a lens for adjusting light distribution of light in such a way that the light irradiated from the light emitting diode 22 has a desired irradiation angle.

The light receiving lens 24 is configured by a lens for fitting the detection area to which the light is to be irradiated from the light emitting diode 22 into the field of view, and images the light reflected by the object lying in the detection area on a sensor surface of the TOF sensor 26.

The filter 25 is a BPF (Band Pass Filter) for passing only light in a predetermined bandwidth, and passes only the light in the predetermined bandwidth of the light into which the light is reflected by a certain object laying in the detection area to be made incident toward the TOF sensor 26. For example, the filter 25 is set in the range of 920 to 960 nm in central wavelength of the pass bandwidth, and passes more light in that pass bandwidth than the light having the wavelength in a bandwidth other than the pass bandwidth. Specifically, the filter 25 passes 60% or more of the light having the wavelength in the pass bandwidth, and passes 30% and under of the light having the wavelength in the bandwidth other than the pass bandwidth.

In addition, the pass bandwidth in which the filter 25 passes the light is narrower than that of the filter used in the past TOF system, and is limited to the narrow bandwidth corresponding to the wavelength of the light irradiated from the light emitting diode 22. For example, in the case where the wavelength of the light irradiated from the light emitting diode 22 is 940 nm, the bandwidth of ±10 nm with 940 nm as a center (930 to 950 nm) is adopted as the pass bandwidth of the filter 25 in conjunction with that wavelength.

By adopting such a pass bandwidth of the filter 25, the TOF sensor 26 can detect the irradiated light while the TOF sensor 26 suppresses the influence of the ambient light of the sun. It should be noted that the pass bandwidth of the filter 25 is by no means limited thereto, and may be the bandwidth of ±15 nm or less with a predetermined wavelength as a center. In addition, the bandwidth of ±10 nm may be adopted with 850 nm as the wavelength band, in which the TOF center 26 exhibits the best characteristics, as a center (840 to 860 nm). As a result, the TOF sensor 26 can effectively detect the irradiated light.

The TOF sensor 26 is configured by an image pickup element having the sensitivity in the wavelength band of the light irradiated from the light emitting diode 22. Thus, the TOF sensor 26 receives the light which is condensed by the light receiving lens 24 to pass through the filter 25 by a plurality of pixels which is arranged in an array on a sensor surface. As depicted in the figure, the TOF sensor 26 can receive the light reflected by an object lying in a detection area which is arranged in the vicinity of the light emitting diode 22, and is irradiated with the light from the light emitting diode 22. Then, the TOF sensor 26 outputs pixel signals with the quantities of light received by the respective pixels as pixel values used to produce a depth image. For example, various sensors such as a SPAD (Single Photon Avalanche Diode), an APD (Avalanche Photo Diode), and a CAPD (Current Assisted Photonic Demodulator) can be applied in terms of a concrete configuration of the TOF sensor 26.

The image storing portion 27 stores therein data associated with an image built from the pixel signals output from the TOF sensor 26. For example, the image storing portion 27 can store the data associated with the newest image when a change occurs in the detection area, or can store data associated with an image on a state in which no object is present in the detection area as a background image.

The synchronous processing portion 28 executes processing for extracting the pixel signal at a timing at which the reflected light corresponding to a modulated light irradiated from the light emitting diode 22 is received of the pixel signals supplied from the TOF sensor 26 synchronously with a timing signal supplied from the light modulating portion 21. As a result, the synchronous processing portion 28 can supply only the pixel signal at a timing at which the light irradiated from the light emitting diode 22 and reflected by a certain object lying in the detection area is made a main component to the distance information calculating portion 29. In addition, the synchronous processing portion 28 reads out data, associated with the background image, stored in the image storing portion 27, and obtains a difference between the background image and the image built by the pixel signal supplied from the TOF sensor 26, thereby enabling the pixel signal associated with only an object having a movement in the detection area to be produced. It should be noted that the synchronous processing portion 28 is not essential in configuration and thus the pixel signal supplied from the TOF sensor 26 may be directly supplied to the distance information calculating portion 29.

The distance information calculating portion 29 carries out the calculation for obtaining the distance to the object laying in the detection area every pixel on the basis of the pixel signal supplied either from the synchronous processing portion 28 or from the TOF sensor 26. The distance information calculating portion 29 supplies a depth signal exhibiting the distance obtained from that calculation to the depth image producing portion 30.

Specifically, in case of the indirect TOF system, the distance information calculating portion 29 carries out the calculation for obtaining a distance to the object lying in the detection area on the basis of a phase difference between a phase of the light emitted from the light emitting diode 22, and a phase of the light made incident to the pixel of the TOF sensor 26 after that light irradiated from the light emitting diode 22 is reflected by the object. In addition, in case of the direct TOF system, the distance information calculating portion 29 measures a time ranging from emission of the light from the light emitting diode 22 to reception of the light by the pixels of the TOF sensor 26 by a plurality of number of times (for example, several thousand times to ten-thousand times) every pixel, and produces a histogram corresponding to the measured times. Then, the distance information calculating portion 29 detects a peak of the histogram, thereby determining a time until the light irradiated from the light emitting diode 22 is reflected by the object to return back to the original position. Then, the distance information calculating portion 29 carries out the calculation for obtaining the distance to the object on the basis of the determined time and the light velocity.

The depth image producing portion 30 produces a depth image in which the distances to the subject are arranged side by side in accordance with the arrangement of the pixels from the depth signal supplied thereto from the distance information calculating portion 29, and outputs the data associated with the depth image to a processing device (not depicted) in a subsequent stage.

In the depth image acquiring apparatus 11 configured in such a manner, as described above, there is adopted the narrow bandwidth filter 25 in which the pass bandwidth is limited to the narrow bandwidth in response to the wavelength of the light irradiated from the light emitting diode 22. As a result, the filter 25 removes away the noise components caused by the ambient light, thereby enabling many signal components necessary for the measurement to be passed. That is to say, in the depth image acquiring apparatus 11, the TOF sensor 26 can receive much light as the signal components necessary for the measurement as compared with the ambient light becoming the noise components, and thus an SN ratio (Signal to Noise Ratio) of the acquired depth image can be improved.

Therefore, the depth image acquiring apparatus 11, even in such an environment as to receive the influence of the ambient light, can cause an acquisition distance, by which the more accurate depth image can be acquired, to be longer, and enhances the acquisition performance for the depth image.

Figure 2:
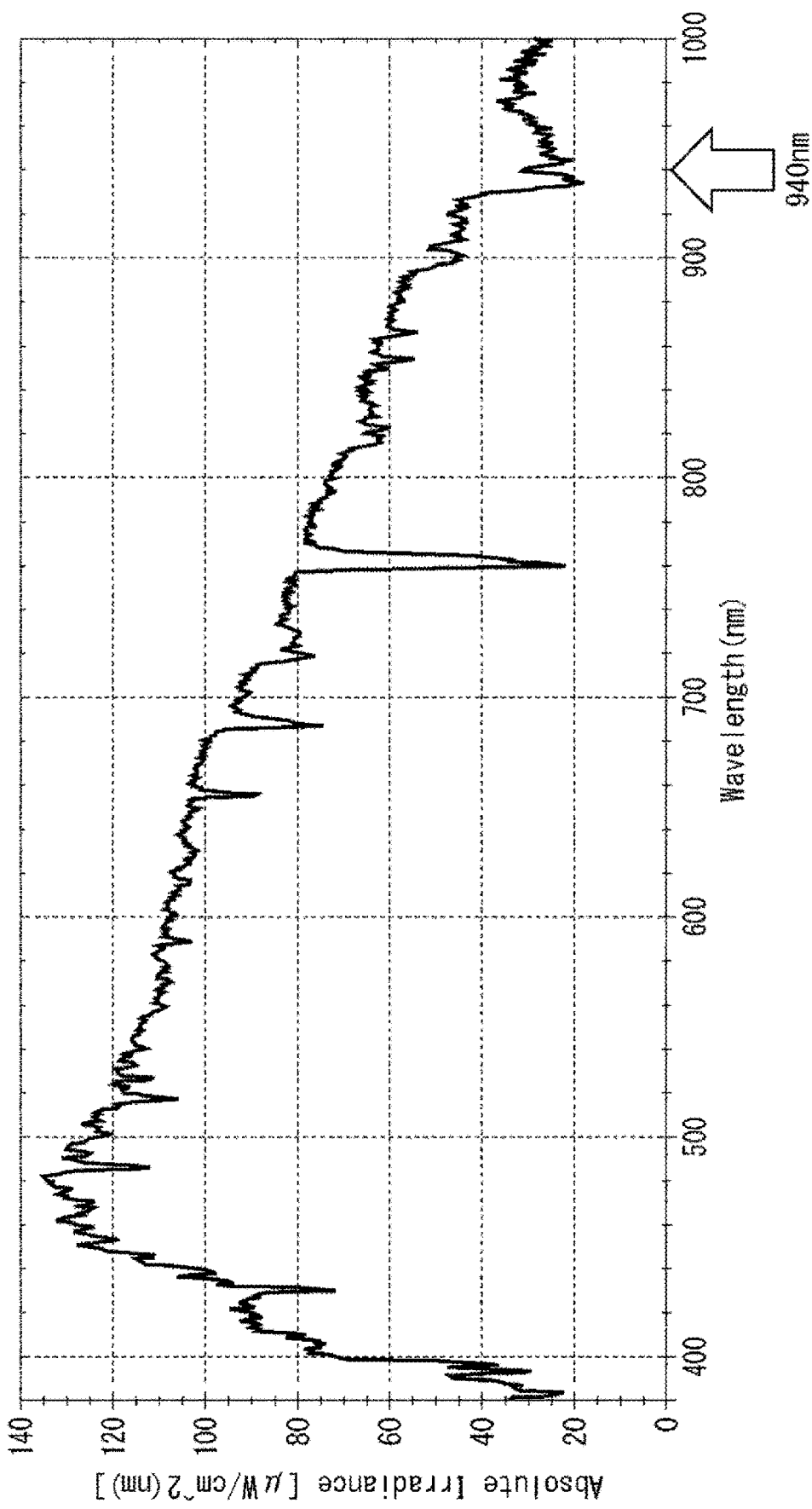
FIG. 2 is a graphical representation depicting a relationship between a wavelength and illuminance of light observed in outdoors.

For example, FIG. 2 depicts a relationship between the wavelength and the illuminance of the light observed in the outdoors. In general, in the outdoors, the illuminance of the light in the vicinity of the wavelength of 940 nm is reduced. Therefore, in the depth image acquiring apparatus 11, the light emitting diode 22 for emitting the light having the wavelength of 940 nm is used, and the filter 25 in the pass bandwidth of ±10 nm with 940 nm as a center is adopted in conjunction with the use of the light emitting diode 22, thereby enabling the effect of suppressing the influence of the ambient light to be enhanced. As a result, for example, even in such utilization as to mount the depth image acquiring apparatus 11 to a vehicle as depicted in FIG. 3, the highly accurate depth image can be acquired.

Figure 3:
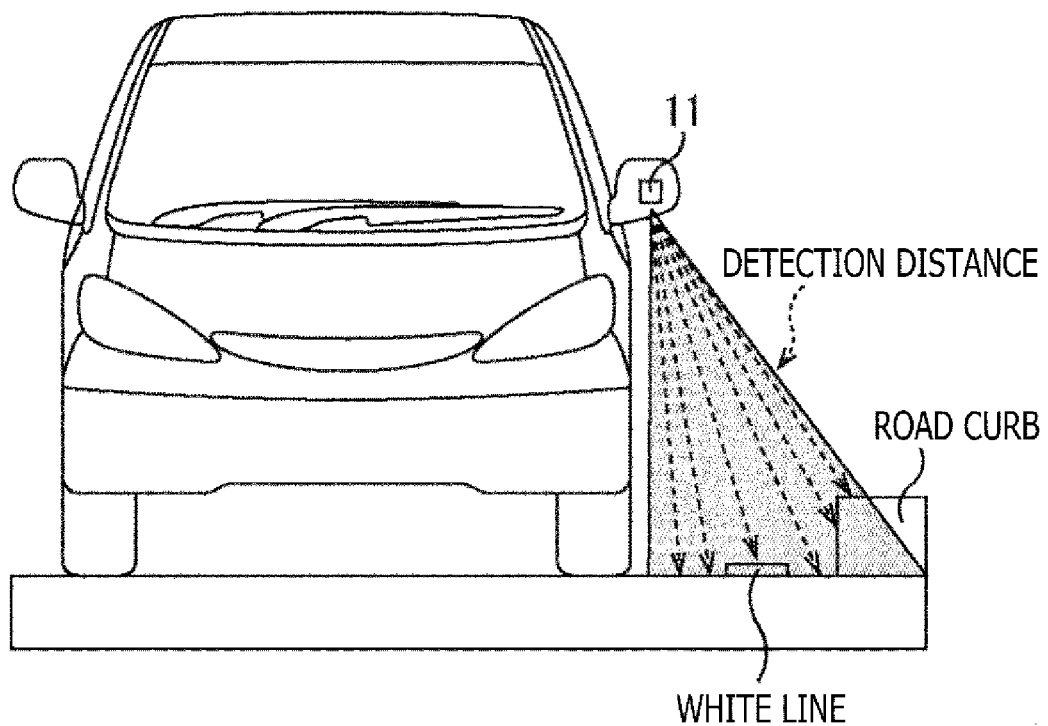
FIG. 3 is a view explaining an example of utilization in which the depth image acquiring apparatus is utilized in a vehicle.

FIG. 3 depicts an example of utilization in which the depth image acquiring apparatus 11 is utilized in the vehicle. As depicted in the figure, the depth image acquiring apparatus 11 is built in a side mirror of the vehicle, and is mounted in such a way that the depth image directed downward from the side of the vehicle is acquired. As a result, the depth image acquiring apparatus 11 can irradiate the light to a hatched area, and can detect a distance indicated by arrows of broken lines. Even in the case where the depth image acquiring apparatus 11 is utilized in the vehicle and is used in the outdoors, the depth image acquiring apparatus 11 suppresses the influence of the ambient light, and thus can acquire the depth image with which a distance to a road curb or a white line can be detected with high accuracy.

Second Configuration Example of Depth Image Acquiring Apparatus

Figure 4:
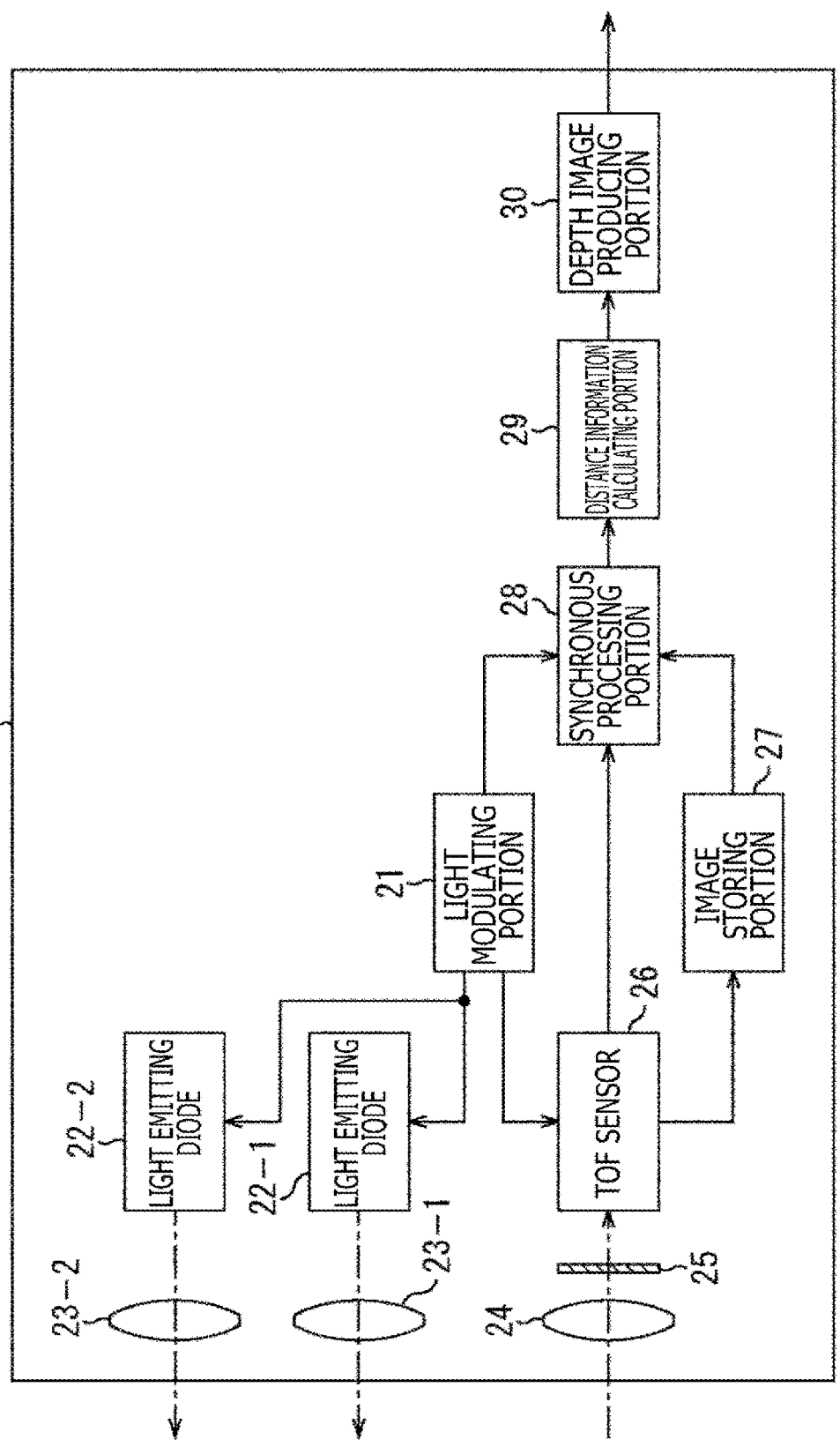
FIG. 4 is a block diagram depicting an example of a configuration of a second embodiment of the depth image acquiring apparatus.

FIG. 4 is a block diagram depicting an example of a configuration of a second embodiment of the depth image acquiring apparatus to which the present technique is applied. It should be noted that in the depth image acquiring apparatus 11A depicted in FIG. 4, constituent elements common to the depth image acquiring apparatus 11 depicted in FIG. 1 are assigned the same reference numerals and a detailed description thereof is omitted here.

That is to say, the depth image acquiring apparatus 11A, similarly to the case of the depth image acquiring apparatus 11 of FIG. 1, is configured to include the light modulating potion 21, the light receiving lens 24, the filter 25, the TOF sensor 26, the image storing portion 27, the synchronous processing portion 28, the distance information calculating portion 29, and the depth image producing portion 30.

Moreover, the depth image acquiring apparatus 11A is configured to include two light emitting diodes 22-1 and 22-2, and two light projecting lenses 23-1 and 23-2. In a word, the depth image acquiring apparatus 11 of FIG. 1 is provided with one set of the light emitting diode 22 and the light projecting lens 23, while the depth image acquiring apparatus 11A is provided with two sets of the light emitting diodes 22 and the light projecting lenses 23.

The light emitting diodes 22-1 and 22-2 can emit two pieces of light having different wavelengths. For example, the light emitting diode 22-1 emits the light having the wavelength of 970 nm, and the light emitting diode 22-2 emits the light having the wavelength of 945 nm. Then, the depth image acquiring apparatus 11A has a configuration in which any one of the light emitting diodes 22-1 and 22-2 is adopted so as to emit the light in conjunction with the pass bandwidth of the filter 25.

For example, the depth image acquiring apparatus 11A adopts the narrow bandwidth filter 25 so as to be able to suppress the influence of the ambient light. Therefore, the depth image acquiring apparatus 11A adopts one, which emits the light suitable for the pass bandwidth of the filter 25, of the light emitting diodes 22-1 and 22-2 which emit the two pieces of light having the different wavelength bands, individually, so that the modulated signal is supplied from the light modulating portion 21 to one of the light emitting diodes 22-1 and 22-2. As a result, the filter 25 removes away the noise components caused by the ambient light, and thus can pass much signal component (the light having the wavelength from adopted one of the light emitting diodes 22-1 and 22-2) necessary for the measurement. The TOF sensor 26 can improve the SN ratio of the depth image.

Therefore, the depth image acquiring apparatus 11A suppresses the influence of the ambient light by the narrow bandwidth filter 25, and enables the acquisition distance, by which the higher accurate depth image can be acquired, to be made longer, and can enhance the acquisition performance for the depth image. It should be noted that the present technique is by no means limited to the present embodiment, and may also be configured to include three or more light emitting diodes 22. In the case where the present technique is provided with three or more light emitting diodes 22, three or more light emitting diodes 22 emit three pieces of light having different waveforms, individually, and the narrower bandwidth filter 25 can be used, and thus the influence of the ambient light such as the sunlight can be further suppressed.

Third Configuration Example of Depth Image Acquiring Apparatus

Figure 5:
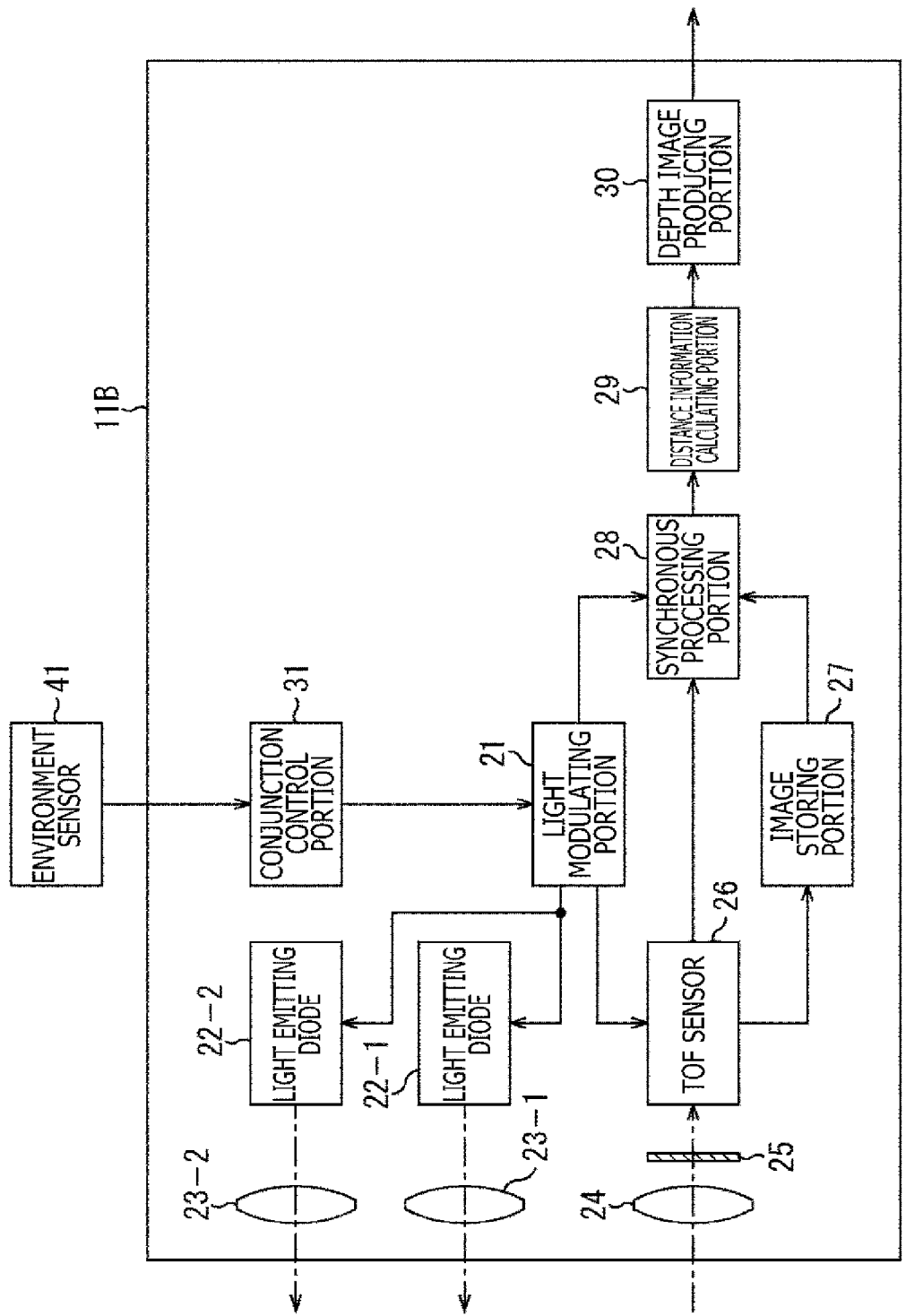
FIG. 5 is a block diagram depicting an example of a configuration of a third embodiment of the depth image acquiring apparatus.

FIG. 5 is a block diagram depicting an example of a configuration of a third embodiment of the depth image acquiring apparatus to which the present technique is applied. It should be noted that in the depth image acquiring apparatus 11B depicted in FIG. 5, constituent elements common to those of the depth image acquiring apparatus 11A depicted in FIG. 4 are assigned the same reference numerals and a detailed description is omitted here.

That is to say, the depth image acquiring apparatus 11B, similarly to the case of the depth image acquiring apparatus 11A of FIG. 4, is configured to include the light modulating potion 21, two light emitting diodes 22-1 and 22-2, two light projecting lenses 23-1 and 23-2, the light receiving lens 24, and the filter 25, the TOF sensor 26, the image storing portion 27, the synchronous processing portion 28, the distance information calculating portion 29, and the depth image producing portion 30.

In addition thereto, the depth image acquiring apparatus 11B is configured to include a conjunction control portion 31. Sensor information (environment information) obtained by sensing the circumference environment by an environment sensor 41 provided outside the depth image acquiring apparatus 11B is supplied to the conjunction control portion 31. Then, the conjunction control portion 31, as will be described later, controls at least one of the light emitting diodes 22, the TOF sensor 26, or the arrangement of the filter 25 in accordance with the sensor information acquired by the environment sensor 41.

For example, in the case where a temperature sensor for detecting a temperature of the circumference environment of the depth image acquiring apparatus 11B is used as the environment sensor 41, the environment sensor 41 acquires the sensor information exhibiting the circumference environment of the depth image acquiring apparatus 11B, especially, a temperature of either the light emitting diode 22 or the TOF sensor 26, and supplies the resulting sensor information to the conjunction control portion 31. Of course, in addition to the temperature sensor, any of various kinds of sensors such as an illuminance sensor may be used as the environment sensor 41, and a configuration in which the environment sensor 41 is incorporated in the depth image acquiring apparatus 11B may also be adopted. Moreover, a configuration in which the environment sensor 41 is incorporated in a chassis of the light emitting diodes 22-1 and 22-2 may also be adopted. In the case where such a configuration is adopted, the temperature of each of the light emitting diodes 22-1 and 22-2 can be more accurately detected.

The depth image acquiring apparatus 11B is configured in such a manner. The conjunction control portion 31 acquires the sensor information supplied thereto from the environment sensor 41, and carries out the control for selecting one of the light emitting diodes 22-1 and 22-2 in conjunction with the pass bandwidth of the filter 25 in accordance with the sensor information. Then, the conjunction control portion 31 causes one light emitting diode 22 thus selected to irradiate the light, and causes the other light emitting diode 22 not selected to stop the irradiation of the light.

Figure 6:
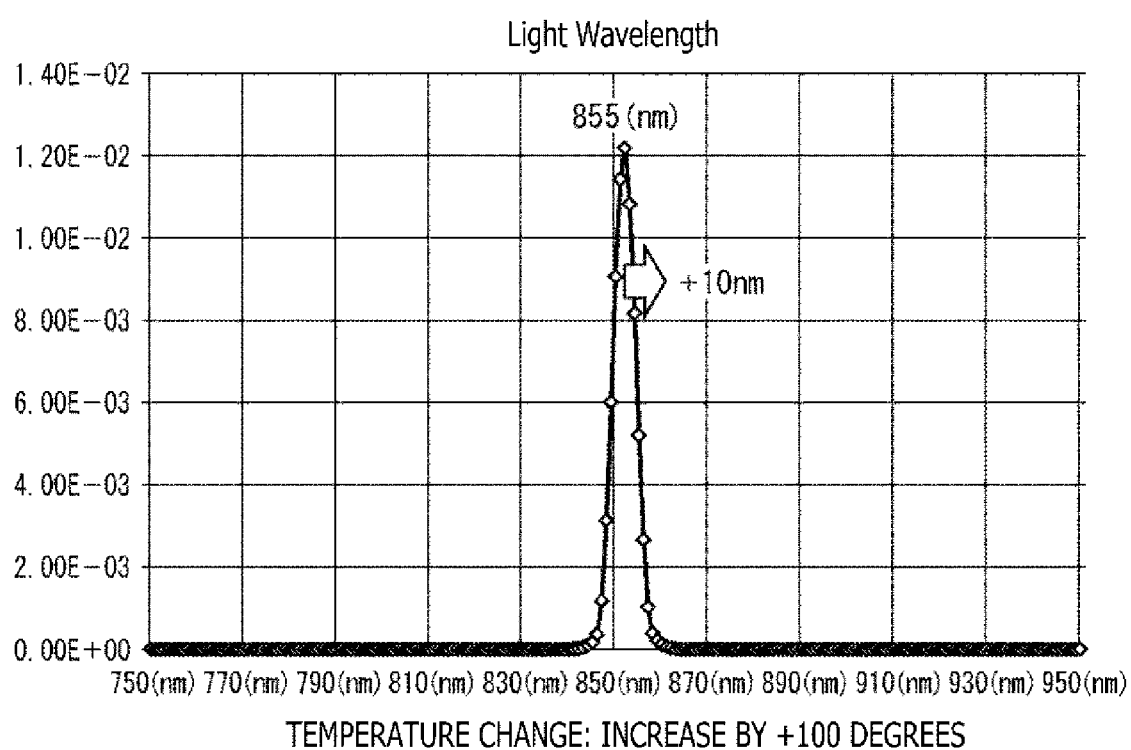
FIG. 6 is a graphical representation explaining a relationship between light source spectral characteristics and a temperature change.

For example, each of the light emitting diodes 22-1 and 22-2 has the light source spectral characteristics having a peak as depicted in FIG. 6. FIG. 6 depicts an example of the light source spectral characteristics of the light source for emitting light with a wavelength of 855 nm as a center. As depicted in the figure, this light source has the temperature characteristics such that when a temperature change is increased by 100 degrees, the wavelength shift of +10 nm is generated.

By exhibiting such the temperature characteristics, for example, with the configuration using only one light source, in order to cope with the wavelength shift due to the temperature change of the light source, it is necessary to select a filter in which a pass bandwidth is set to a wide bandwidth (for example, 940 ±50 nm). As a result, the influence of the ambient light such as the sunlight was readily received, so that the SN ratio became worse to reduce the measurement accuracy.

Then, in the depth image acquiring apparatus 11B, even when the wavelength shift due to the temperature change is generated, any of the light emitting diodes 22-1 and 22-2 is selected so that the wavelengths of the light used in the respective temperatures correspond to the pass bandwidth of the filter 25.

Figure 7:
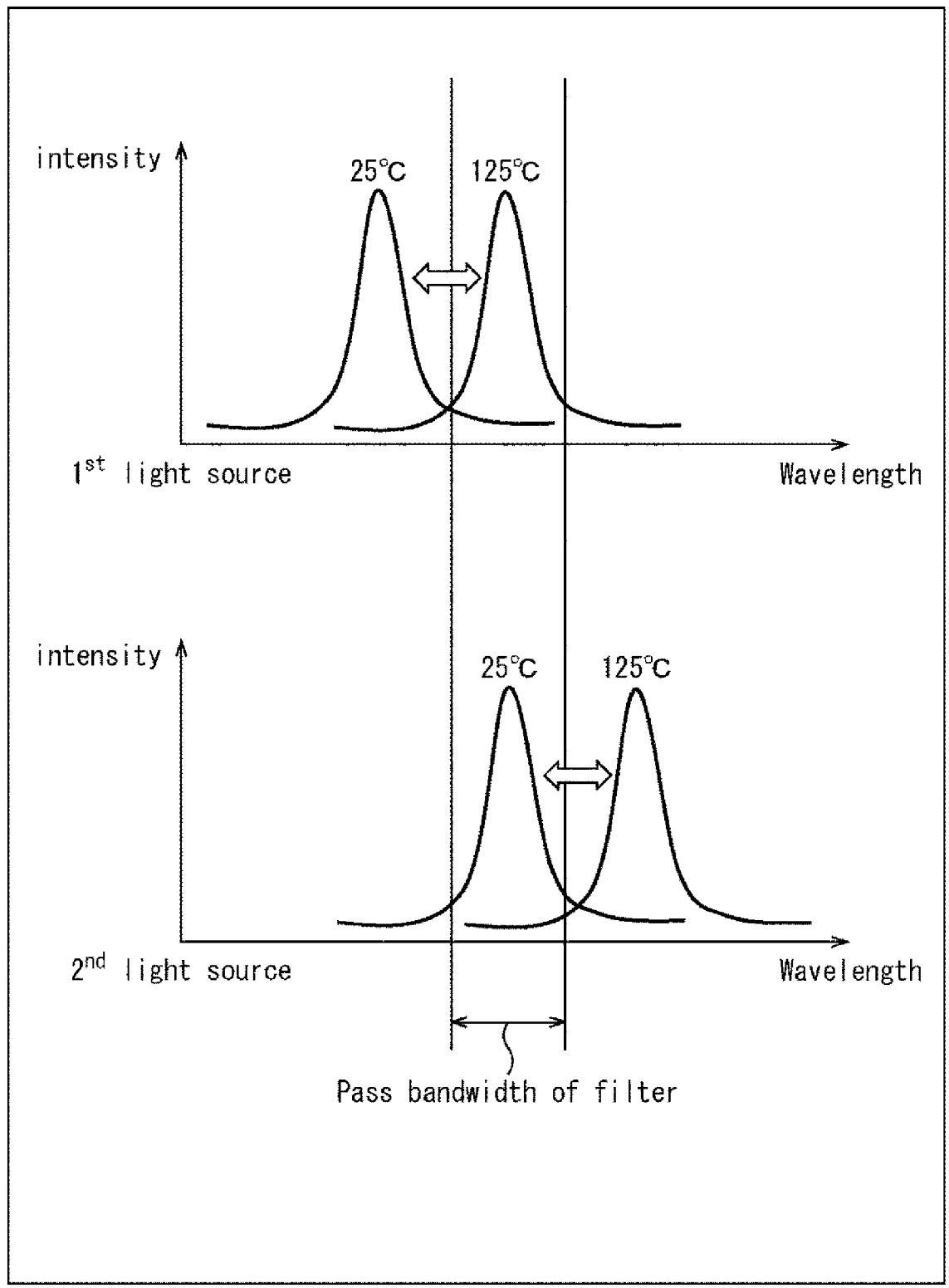
FIG. 7 is a view explaining a relationship between a pass bandwidth of a filter and characteristics of two light sources.

For example, in the case where as depicted in FIG. 7, a pass bandwidth of the filter 25 is set, such a light emitting diode 22-1 as to emit the light in the pass bandwidth of the filter 25 in the environment of a temperature of 125 degrees and such a light emitting diode 22-2 as to emit the light in the pass bandwidth of the filter 25 in the environment of a temperature of 25 degrees are used. In a word, the light emitting diode 22-1 has the characteristics in which the wavelength is shifted depending on the temperature in such a way that the light emitting diode 22-1 has a peak in the wavelength of the pass bandwidth of the filter 25 in the environment of the temperature of 125 degrees and has a peak in the wavelength of the pass bandwidth or lower of the filter 25 in the environment of the temperature of 25 degrees. On the other hand, the light emitting diode 22-2 has the characteristics in which the wavelength is shifted depending on the temperature in such a way that the light emitting diode 22-2 has a peak in the wavelength of the pass bandwidth or higher of the filter 25 in the environment of the temperature of 125 degrees and has a peak in the wavelength of the pass bandwidth of the filter 25 in the environment of the temperature of 25 degrees. Therefore, the depth image acquiring apparatus 11B is configured to cause the light emitting diode 22-1 to emit the light in the environment of the temperature of 125 degrees and cause the light emitting diode 22-2 to emit the light in the environment of the temperature of 25 degrees in conjunction with the pass bandwidth of the filter 25.

Specifically, in the depth image acquiring apparatus 11B, it is possible to use the light emitting diode 22-1 for emitting the light having the wavelength of 925 nm in the environment at a temperature of 25 degrees and emitting the light having the wavelength of 935 nm in the environment at a temperature of 125 degrees, and the light emitting diode 22-2 for emitting the light having the wavelength of 945 nm in the environment at the temperature of 25 degrees and emitting the light having the wavelength of 955 nm in the environment at the temperature of 125 degrees. In addition, in the depth image acquiring apparatus 11B, it is possible to use the filter 25 the pass bandwidth of which is limited to the narrow bandwidth of ±10 nm with 940 nm as a center (a half of the width of the pass bandwidth is narrower than a band (10 nm) of fluctuation of the wavelength shift due to the temperature change of the light emitting diode 22).

In the depth image acquiring apparatus 11B configured in such a manner, the conjunction control portion 31 carries out the control in such a way that in the case where the temperature exhibited by the sensor information is 25 degrees, the light emitting diode 22-2 is selected, while in the case where the temperature exhibited by the sensor information is 125 degrees, the light emitting diode 22-1 is selected. As a result, in the depth image acquiring apparatus 11B, even when the temperature of the circumference environment is changed from 25 to 125 degrees, one of the light emitting diodes 22-1 and 22-2 is suitably selected in accordance with the sensor information. As a result, the filter 25 removes away the noise components due to the ambient light, and thus can pass much signal component necessary for the measurement.

Therefore, the depth image acquiring apparatus 11B, even when the temperature change is generated in the circumference environment, suppresses the influence of the ambient light by the filter 25 in the narrow bandwidth 25, and enables the acquisition distance, by which the more accurate depth image can be acquired, to be made longer, and can enhance the acquisition performance for the depth image.

Fourth Configuration Example of Depth Image Acquiring Apparatus

Figure 8:
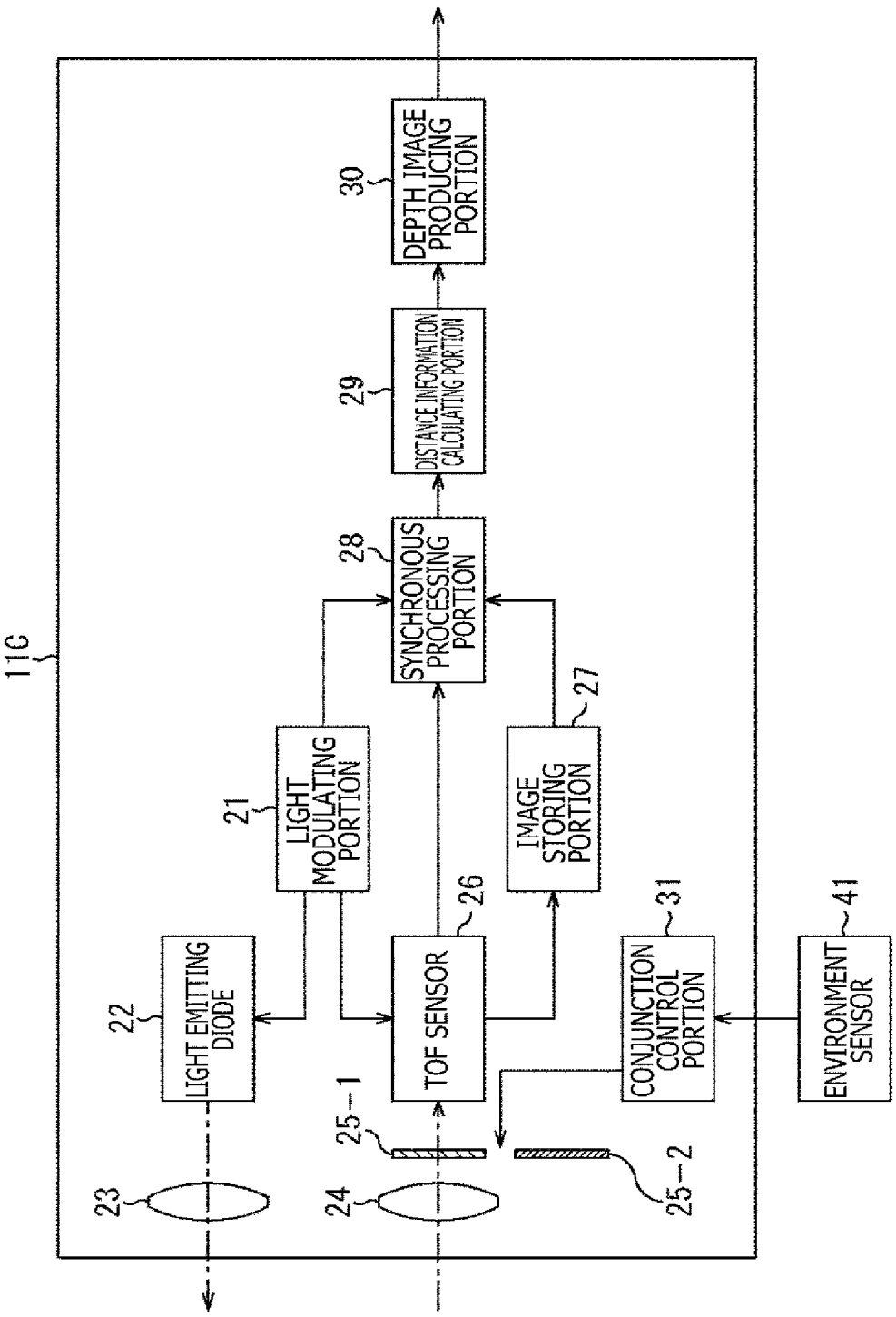
FIG. 8 is a block diagram depicting an example of a configuration of a fourth embodiment of the depth image acquiring apparatus.

FIG. 8 is a block diagram depicting an example of a configuration of a fourth embodiment of the depth image acquiring apparatus to which the present technique is applied. It should be noted that in the depth image acquiring apparatus 11C depicted in FIG. 8, constituent elements common to those of the depth image acquiring apparatus 11 depicted in FIG. 1 and the depth image acquiring apparatus 11B depicted in FIG. 5 are assigned the same reference numerals and a detailed description thereof is omitted here.

That is to say, the depth image acquiring apparatus 11C, similarly to the case of the depth image acquiring apparatus 11 of FIG. 1, is configured to include the light modulating potion 21, the light emitting diode 22, the light projecting lens 23, the light receiving lens 24, the TOF sensor 26, the image storing portion 27, the synchronous processing portion 28, the distance information calculating portion 29, and the depth image producing portion 30. In addition, similarly to the case of the depth image acquiring apparatus 11B of FIG. 5, the depth image acquiring apparatus 11C is configured to include the conjunction control portion 31, and the sensor information is supplied from the environment sensor 41 to the conjunction control portion 31.

Moreover, the depth image acquiring apparatus 11C is configured to include two filters 25-1 and 25-2. The filters 25-1 and 25-2 can pass two pieces of light having different wavelength bands. For example, the pass bandwidth of the filter 25-1 is limited to the narrow bandwidth of ±10 nm with 940 nm as a center, and the pass bandwidth of the filter 25-2 is limited to the narrow bandwidth of ±10 nm with 960 nm as a center. In addition, the light emitting diode 22 with which the depth image acquiring apparatus 11C is provided has the light source spectral characteristics as depicted in FIG. 6 described above. For example, the light emitting diode 22 has the temperature characteristics such that the light emitting diode 22 emits the light having the wavelength of 945 nm in the environment in which the temperature is 25 degrees, and emits the light having the wavelength of 955 nm in the environment in which the temperature is 125 degrees.

Figure 9:
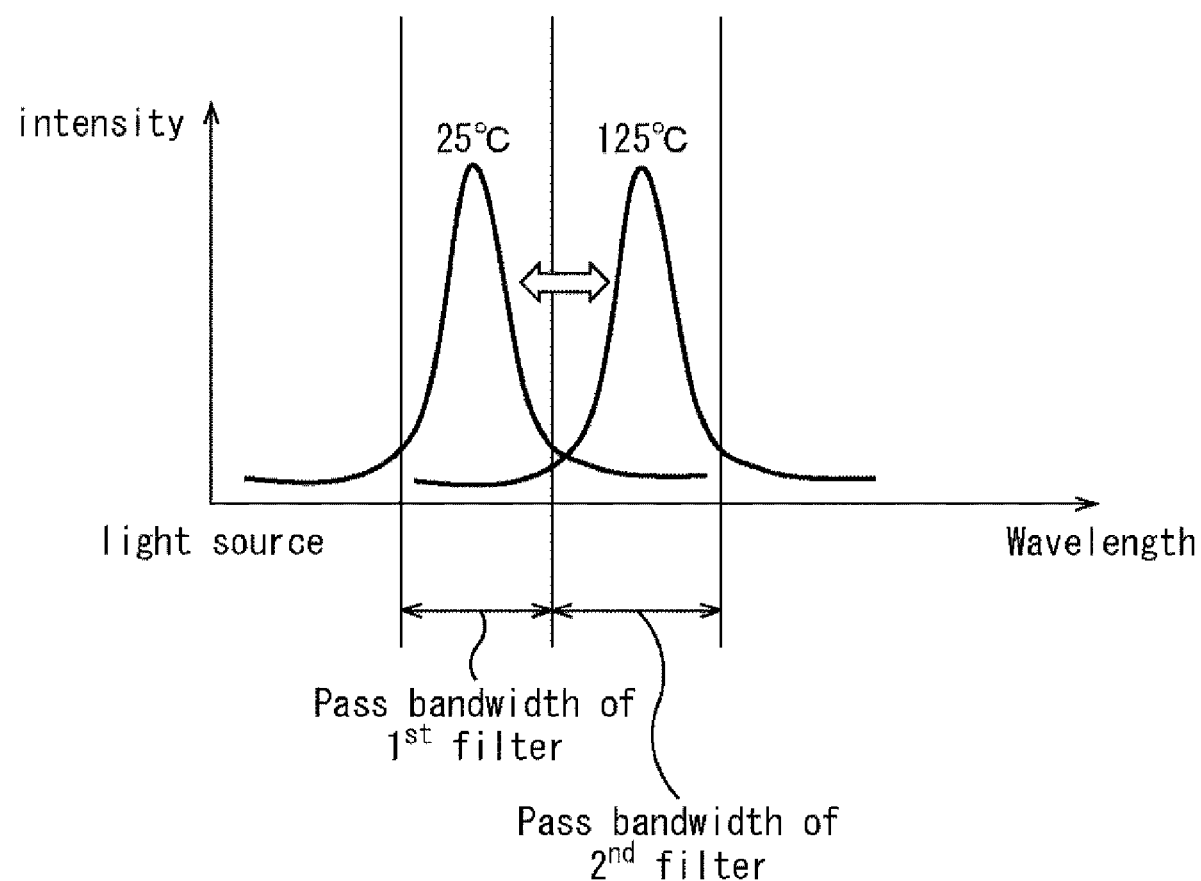
FIG. 9 is a view explaining a relationship between two filters and characteristics of the light source.

For example, in the case where as depicted in FIG. 9, the pass bandwidths of the two filters 25-1 and 25-2 are set, the light emitting diode 22 has the characteristics in which the peak is changed depending on the temperature in such a way that the light emitting diode 22 emits the light in the pass bandwidth of the filter 25-1 in the environment of the temperature of 25 degrees and emits the light in the pass bandwidth of the filter 25-2 in the environment of the temperature of 125 degrees. Therefore, the depth image acquiring apparatus 11C is configured to cause the TOF sensor 26 to receive the light which passes through the filter 25-1 in the environment of the temperature of 25 degrees and cause the TOF sensor 26 to receive the light which passes through the filter 25-2 in the environment of the temperature of 125 degrees in conjunction with the characteristics of the light emitting diode 22.

The depth image acquiring apparatus 11C is configured in such a manner. The conjunction control portion 31 carries out the control in such a way that one of the filters 25-1 and 25-2 is selected in conjunction with the wavelength of the light emitted from the light emitting diode 22 in accordance with the sensor information supplied from the environment sensor 41. That is to say, the conjunction control portion 31 carries out the control so as to select the filter 25-1 in the case where the temperature exhibited by the sensor information is 25 degrees, and select the filter 25-2 in the case where the temperature exhibited by the sensor information is 125 degrees.

For example, the depth image acquiring apparatus 11C is configured in such a way that one, which is selected by the conjunction control portion 31, of the filters 25-1 and 25-2 is arranged on a light receiving surface of the TOF sensor 26, that is, the positions of the filters 25-1 and 25-2 are switchably arranged. As far as a method of switching the arrangement portions, the arrangement may be automatically switched by an actuator (not depicted) or the like. In addition, the arrangement may also be switched by manipulation made by the user. Alternatively, by applying a voltage, the characteristics of the filter may be changed, thereby switching the pass bandwidth.

As a result, in the depth image acquiring apparatus 11C, even when the temperature of the circumference environment is changed from 25 to 125 degrees, one of the filters 25-1 and 25-2 is suitably selected in accordance with the sensor information. As a result, the selected one filter 25 removes away the noise components due to the ambient light, and thus can pass much signal component necessary for the measurement.

Therefore, the depth image acquiring apparatus 11C, even when the temperature change is generated in the circumference environment, suppresses the influence of the ambient light by the narrow bandwidth filter 25-1 or 25-2, and enables the acquisition distance, by which the more accurate depth image can be acquired, to be made longer, and can enhance the acquisition performance of the depth image. It should be noted that the present technique is by no means limited to the present embodiment, and a configuration in which the depth image acquiring apparatus is provided with three or more filters 25 may also be adopted. In the case where the depth image acquiring apparatus 11C is provided with three or more filters 25, the process of light having different wavelength bandwidths are passed, so that the narrower bandwidth filters 25 can be used, and thus the influence by the ambient light such as the sunlight can be further suppressed.

Fifth Configuration Example of Depth Image Acquiring Apparatus

Figure 10:
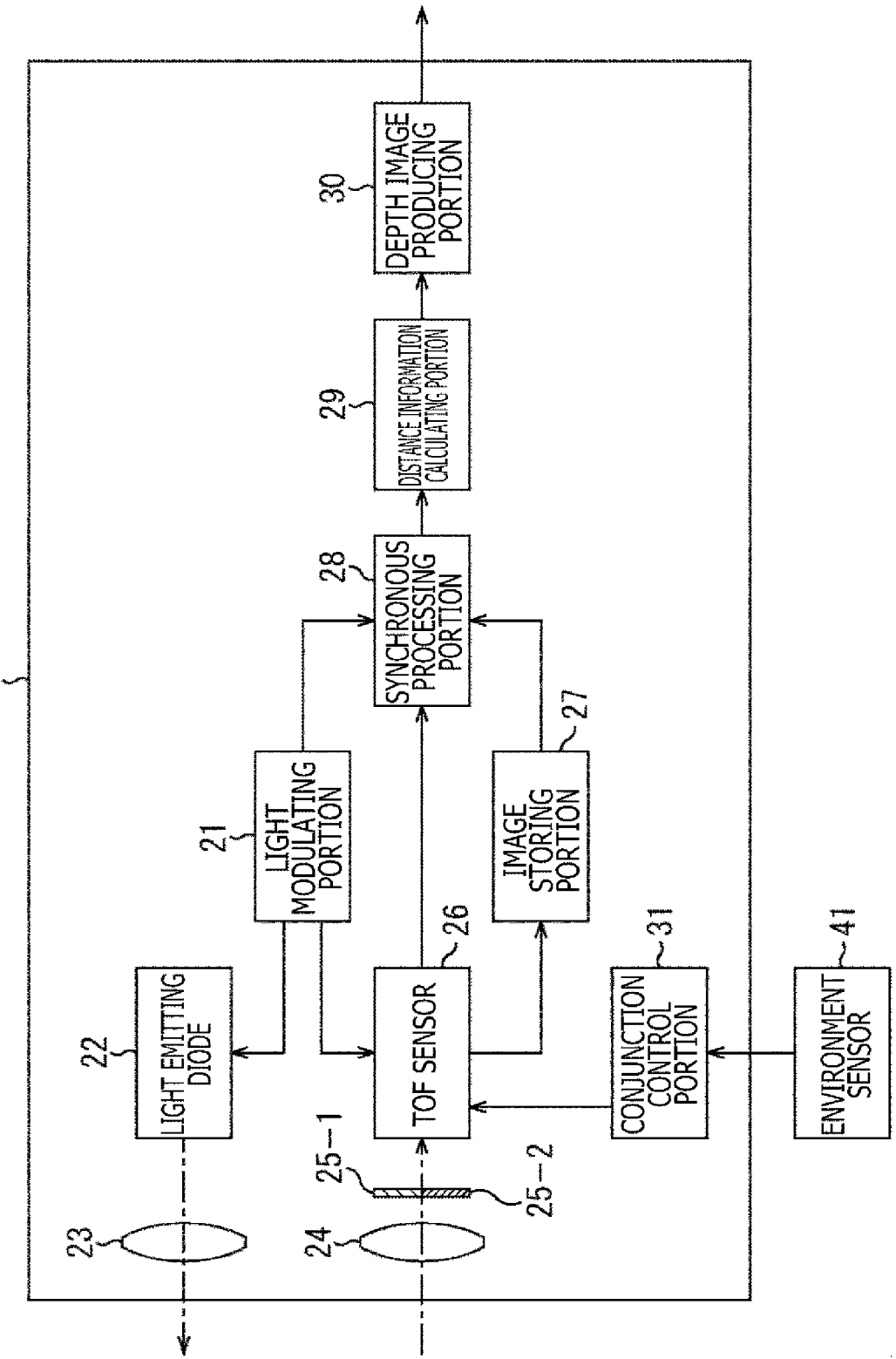
FIG. 10 is a block diagram depicting an example of a configuration of a fifth embodiment of the depth image acquiring apparatus.

FIG. 10 is a block diagram depicting an example of a configuration of a fifth embodiment of the depth image acquiring apparatus to which the present technique is applied. It should be noted that in the depth image acquiring apparatus 11D depicted in FIG. 10, constituent elements common to those of the depth image acquiring apparatus 11C depicted in FIG. 8 are assigned the same reference numerals and a detailed description thereof is omitted here.

That is to say, the depth image acquiring apparatus 11D, similarly to the case of the depth image acquiring apparatus 11C of FIG. 8, is configured to include the light modulating potion 21, the light emitting diode 22, the light projecting lens 23, the light receiving lens 24, the filters 25-1 and 25-2, the TOF sensor 26, the image storing portion 27, the synchronous processing portion 28, the distance information calculating portion 29, the depth image producing portion 30, and the conjunction control portion 31. In addition, similarly to the case of the depth image acquiring apparatus 11C of FIG. 8, in the depth image acquiring apparatus 11C, the sensor information is supplied from the environment sensor 41 to the conjunction control portion 31.

Then, the depth image acquiring apparatus 11D is different from the depth image acquiring apparatus 11C of FIG. 8 in that the filters 25-1 and 25-2 are arranged so as to divide the light receiving surface of the TOF sensor 26 into a plurality of areas. That is to say, the depth image acquiring apparatus 11D is configured in such a way that the light receiving surface of the TOF sensor 26 is divided into a division area in which the filters 25-1 is arranged, and a division area in which the filter 25-2 is arranged, and two division areas receive the corresponding pieces of light in the pass bandwidths, individually.

In the depth image acquiring apparatus 11D configured in such a manner, the conjunction control portion 31 carries out the control in such a way that one of the filters 25-1 and 25-2 is selected in conjunction with the wavelength of the light emitted from the light emitting diode 22 in accordance with the sensor information supplied from the environment sensor 41. That is to say, in the depth image acquiring apparatus 11D, the pixel signals output from the division area in which one, which is selected by the conjunction control portion 31, of the filters 25-1 and 25-2 are used in production of the depth image.

For example, the depth image acquiring apparatus 11D can use the filter 25-1 in the pass bandwidth of ±10 nm with 940 nm as a center, and the filter 25-2 in the pass bandwidth of ±10 nm with 960 nm as a center. In addition, the light emitting diode 22 with which the depth image acquiring apparatus 11D is provided has the light source spectral characteristics as depicted in FIG. 6 described above. For example, the light emitting diode 22 has the temperature characteristics such that the light emitting diode 22 emits the light having the wavelength of 945 nm in the environment in which the temperature is 25 degrees, and emits the light having the wavelength of 955 nm in the environment in which the temperature is 125 degrees.

In the depth image acquiring apparatus 11D configured in such a manner, the conjunction control portion 31 carries out the control for the TOF sensor 26 in such a way that in the case where the temperature exhibited by the sensor information is 25 degrees, the filter 25-1 is selected and, for example, the pixel signals from the division area in which the filter 25-1 is arranged are output. In addition, the conjunction control portion 31 carries out the control for the TOF sensor 26 in such a way that in the case where the temperature exhibited by the sensor information is 125 degrees, the filter 25-2 is selected and, for example, the pixel signals from the division area in which the filter 25-2 is arranged are output.

As a result, in the depth image acquiring apparatus 11D, even when the temperature of the circumference environment is changed from 25 to 125 degrees, one of the filters 25-1 and 25-2 is suitably selected in accordance with the sensor information. As a result, the selected one filter 25 removes away the noise components due to the ambient light, and thus can pass much signal component necessary for the measurement, thereby outputting the resulting pixel signals.

Therefore, the depth image acquiring apparatus 11D, even when the temperature change is generated in the circumference environment, suppresses the influence of the ambient light by the narrow bandwidth filter in the 25-1 or 25-2, and enables the acquisition distance, by which the more accurate depth image can be acquired, to be made longer, and can enhance the acquisition performance of the depth image. It should be noted that the examples of configurations described above may be suitably combined with each other. For example, the depth image acquiring apparatus 11D may be provided with a plurality of light emitting diodes 22 and a plurality of filters 25, and may be operated in suitable combination of a plurality of light emitting diodes 22, and a plurality of filters 25 on the basis of the sensor information acquired by the environment sensor 41.

Arrangement Examples of Filters

A description will now be given with respect to examples of arrangement of the filters 25-1 and 25-2 for the light receiving surface of the TOF sensor 26, and the depth images acquired in the respective pieces of arrangement with reference to FIG. 11 to FIG. 17.

Figure 11:
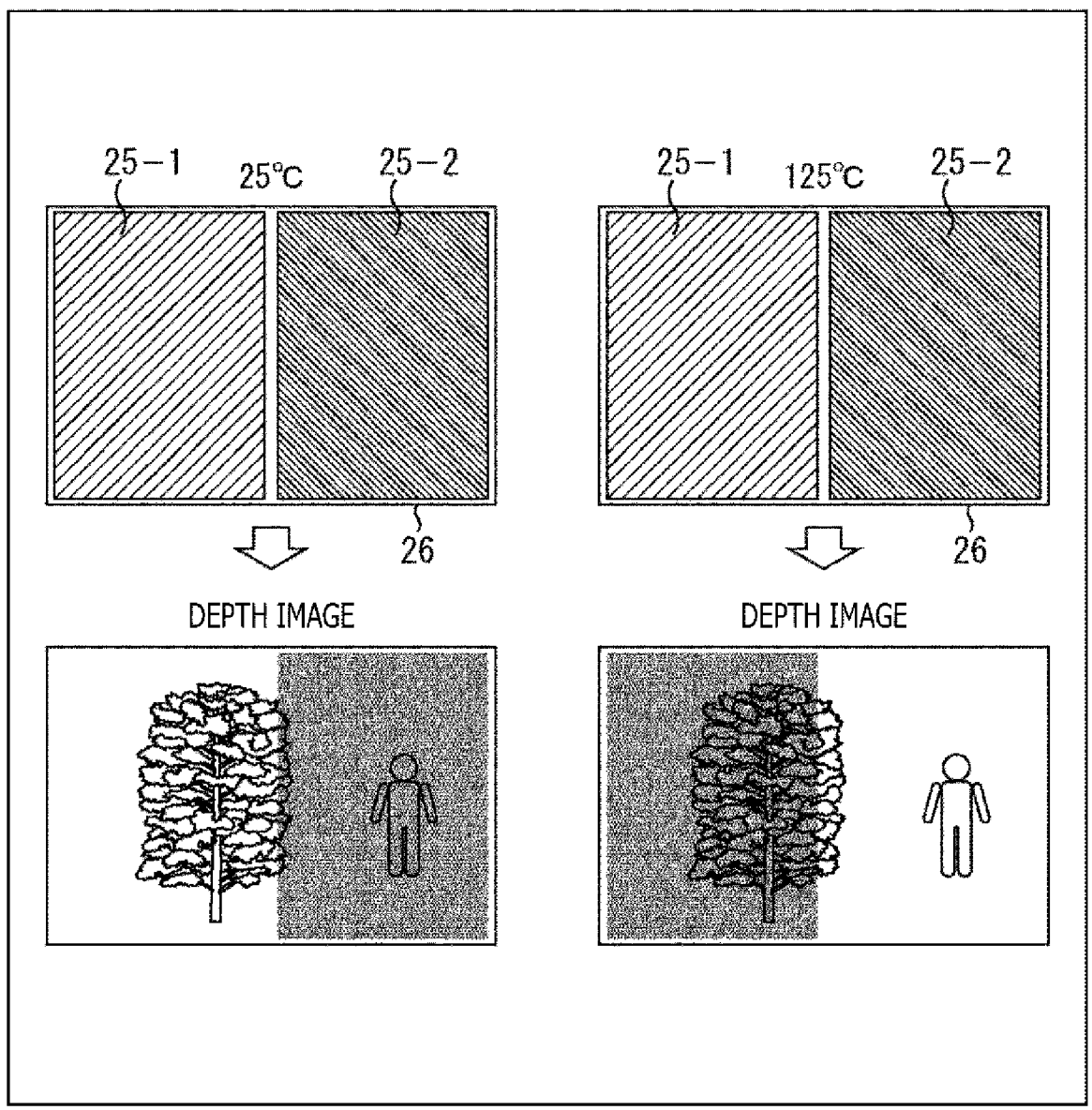
FIG. 11 is a view depicting an example of arrangement in a configuration in which two filters are used.

FIG. 11 depicts an example of arrangement in the configuration in which the two filters 25-1 and 25-2 are used. For example, there are used the rectangular shaped filters 25-1 and 25-2 which divide the light receiving surface of the TOF sensor 26 into two parts, or the right and left division areas. Then, in the example of arrangement depicted in the figure, the filter 25-1 is arranged in the division area on the left side of the light receiving surface of the TOF sensor 26, and the filter 25-2 is arranged in the division area on the right side of the light receiving surface of the TOF sensor 26.

Therefore, although when the temperature is 25 degrees, the normal depth image can be acquired in the division area on the left side of the TOF sensor 26, the normal depth image is not acquired due to the shortage of the SN ratio in the division area on the right side of the TOF sensor 26. On the other hand, although when the temperature is 125 degrees, the normal depth image can be acquired in the division area on the right side of the TOF sensor 26, the normal depth image is not acquired due to the shortage of the SN ratio in the division area on the left side of the TOF sensor 26.

In the configuration of such an example of arrangement, the conjunction control portion 31 shall select the division area in conjunction with the temperature characteristics of the light emitting diode 22 in accordance with the sensor information supplied thereto from the environment sensor 41. That is to say, when the temperature is 25 degrees, the conjunction control portion 31 carries out the control for the TOF sensor 26 in such a way that the pixel signals from the division area in which the filter 25-1 is arranged are output. On the other hand, when the temperature is 125 degrees, the conjunction control portion 31 carries out the control for the TOF sensor 26 in such a way that the pixel signals from the division area in which the filter 25-2 is arranged are output.

Figure 12:
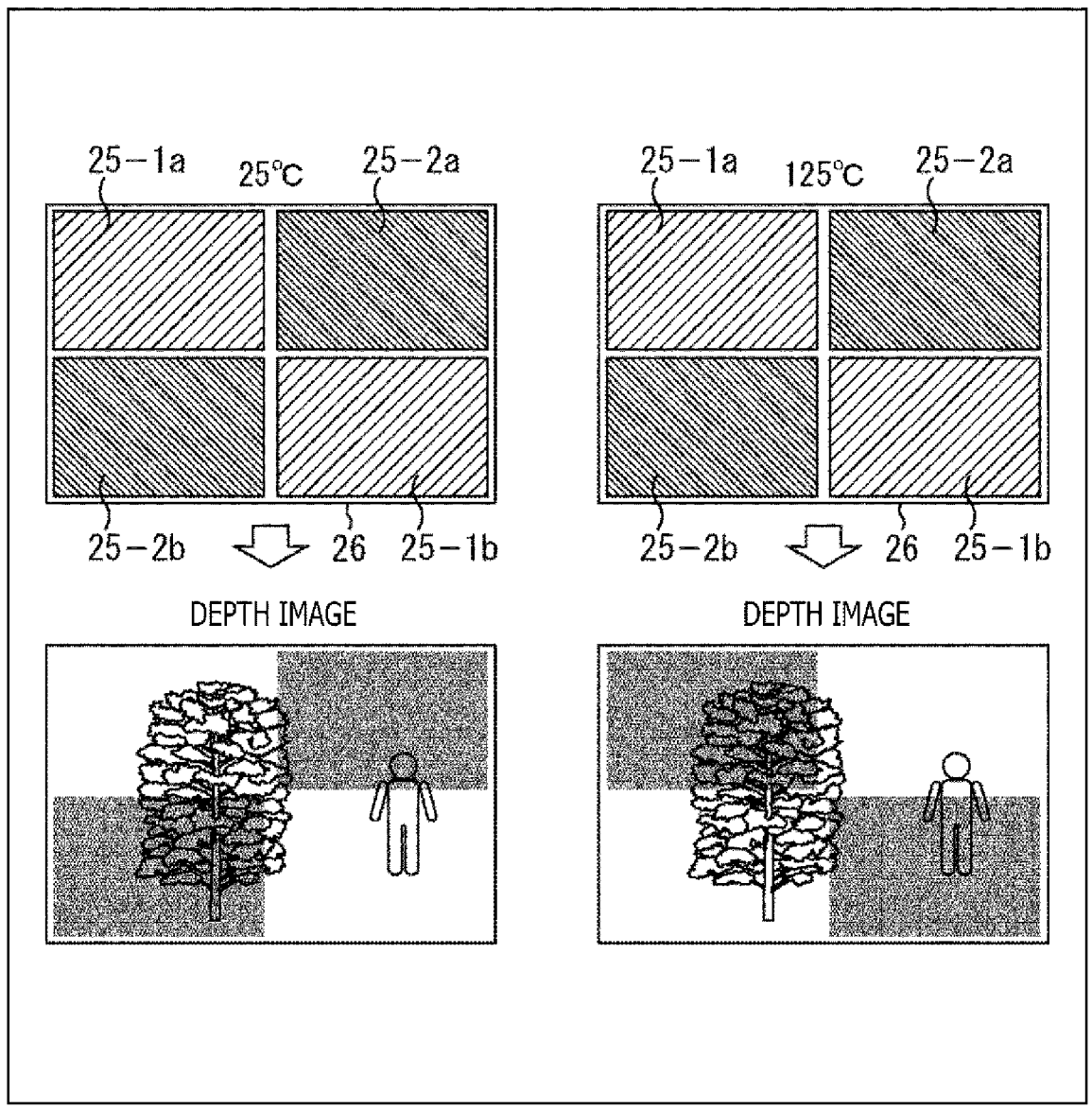
FIG. 12 is a view depicting an example of arrangement in a configuration in which four filters are used.

FIG. 12 depicts an example of arrangement in a configuration in which four filters 25-1a and 25-1b, and 25-2a and 25-2b. For example, there are used the rectangular shaped filters 25-1a and 25-1b, and 25-2a and 25-2b which divide the light receiving surface of the TOF sensor 26 into four parts, or the division areas of 2×2. Then, in the example of arrangement depicted in the figure, the filter 25-1a is arranged in the division area on the upper left side of the light receiving surface of the TOF sensor 26. The filter 25-2a is arranged in the division area on the upper right side of the light receiving surface of the TOF sensor 26. In addition, the filter 25-1b is arranged in the division area on the lower right side of the light receiving surface of the TOF sensor 26. The filter 25-2b is arranged in the division area on the lower left side of the light receiving surface of the TOF sensor 26.

Therefore, although when the temperature is 25 degrees, the normal depth image can be acquired in the division areas on the upper left side and the lower right side of the TOF sensor 26, the normal depth image is not acquired in the division areas on the upper right side and the lower left side of the TOF sensor 26 because of the shortage of the SN ratio. On the other hand, although when the temperature is 125 degrees, the normal depth image can be acquired in the division areas on the upper right side and the lower left side of the TOF sensor 26, the normal depth image is not acquired in the division areas on the upper left side and the lower right side of the TOF sensor 26 because of the shortage of the SN ratio.

In the configuration of such an example of arrangement, the conjunction control portion 31 shall select the division area in conjunction with the temperature characteristics of the light emitting diode 22 in accordance with the sensor information supplied thereto from the environment sensor 41. That is to say, when the temperature is 25 degrees, the conjunction control portion 31 carries out the control for the TOF sensor 26 in such a way that the pixel signals from the division areas in which the filters 25-1a and 25-1b are arranged are output. On the other hand, when the temperature is 125 degrees, the conjunction control portion 31 carries out the control for the TOF sensor 26 in such a way that the pixel signals from the division areas in which the filters 25-2a and 25-2b are arranged are output.

Figure 13:
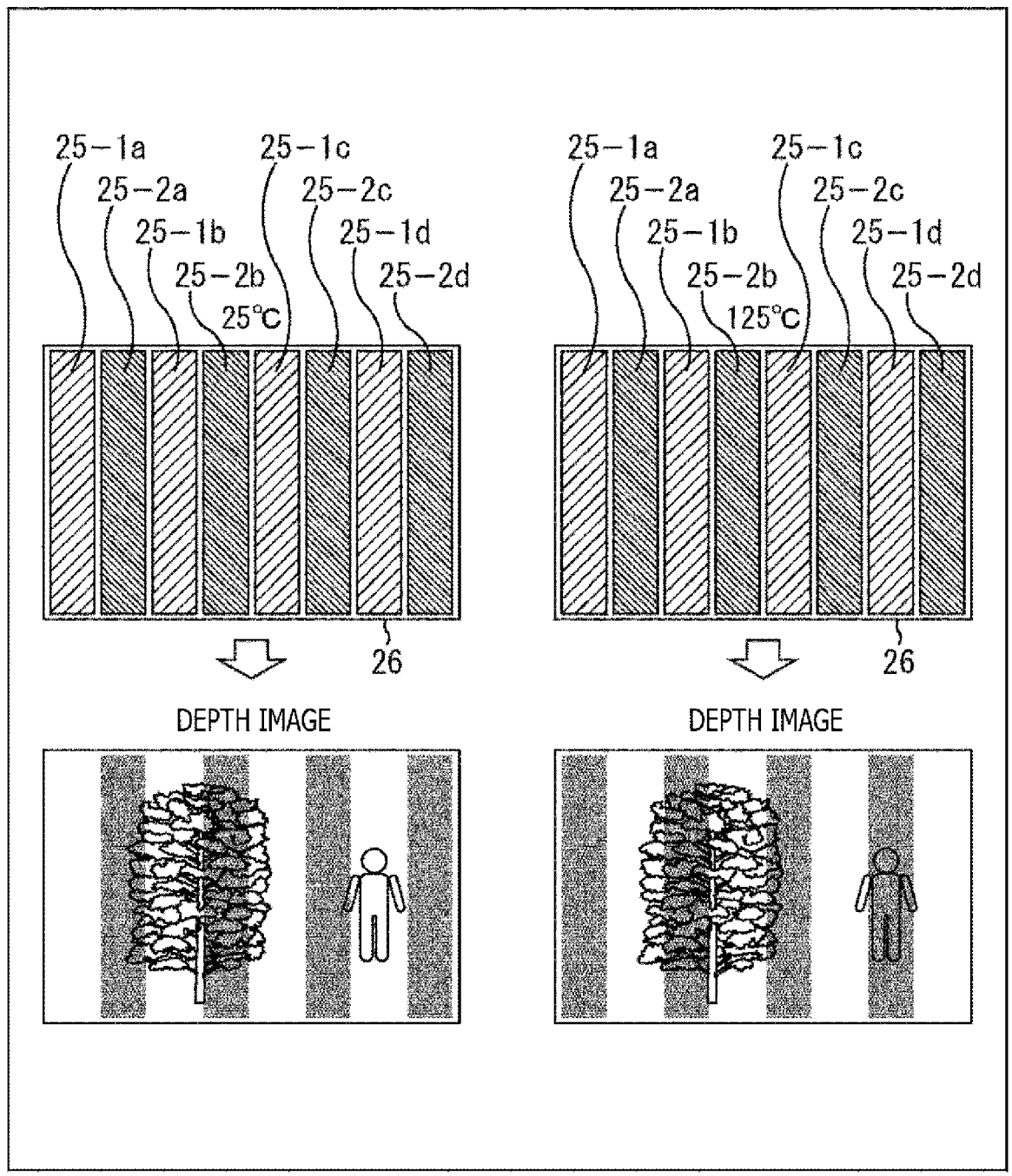
FIG. 13 is a view depicting an example of arrangement in a configuration in which eight filters are used.

FIG. 13 depicts an example of arrangement in a configuration in which eight filters: 25-1a to 25-1d; and 25-2a to 25-2d are used. For example, there are used eight long and narrow rectangular shaped filters 25-1a to 25-1d and 25-2a to 25-2d, or eight equal division areas in which the TOF sensor 26 is equally divided. Each of the eight filters has a vertical width corresponding to the vertical width of the TOF sensor 26, and has a width corresponding to a width of each of the eight equal division areas. Then, in the example of arrangement depicted in the figure, the filters 25-1a to 25-1d, and the filters 25-2a to 25-2d are alternatively arranged in a transverse direction of the TOF sensor 26.

Therefore, when the temperature is 25 degrees, and when the temperature is 125 degrees, the areas in which the normal depth images can be acquired are alternately arranged to form a stripped pattern. That is to say, although when the temperature is 25 degrees, the normal depth image can be acquired in the division areas in which the filters 25-1a to 25-1d are arranged, the normal depth image is not acquired in the division areas in which the filters 25-2a to 25-2d are arranged because of the shortage of the SN ratio. On the other hand, although when the temperature is 125 degrees, the normal depth image can be acquired in the division areas in which the filters 25-2a to 25-2d are arranged, the normal depth image is not acquired in the division areas in which the filters 25-1a to 25-1d are arranged because of the shortage of the SN ratio.

In the configuration of such an example of arrangement, the conjunction control portion 31 shall select the division area in conjunction with the temperature characteristics of the light emitting diode 22 in accordance with the sensor information supplied thereto from the environment sensor 41. That is to say, when the temperature is 25 degrees, the conjunction control portion 31 carries out the control for the TOF sensor 26 in such a way that the pixel signals from the division areas in which the filters 25-1a to 25-1d are arranged are output. On the other hand, when the temperature is 125 degrees, the conjunction control portion 31 carries out the control for the TOF sensor 26 in such a way that the pixel signals from the division areas in which the filters 25-2a to 25-2d are arranged are output.

For example, for the depth image acquiring apparatus 11D of such an example of arrangement as depicted in FIG. 3 described above, the utilization method of mounting the depth image acquiring apparatus 11D to the vehicle is supposed. For example, the depth image acquiring apparatus 11D is mounted to the vehicle in such a way that the transverse direction of the depth image acquiring apparatus 11D becomes the direction of travel of the vehicle, and the depth image toward the lower side from the side of the vehicle is acquired.

Figure 14:
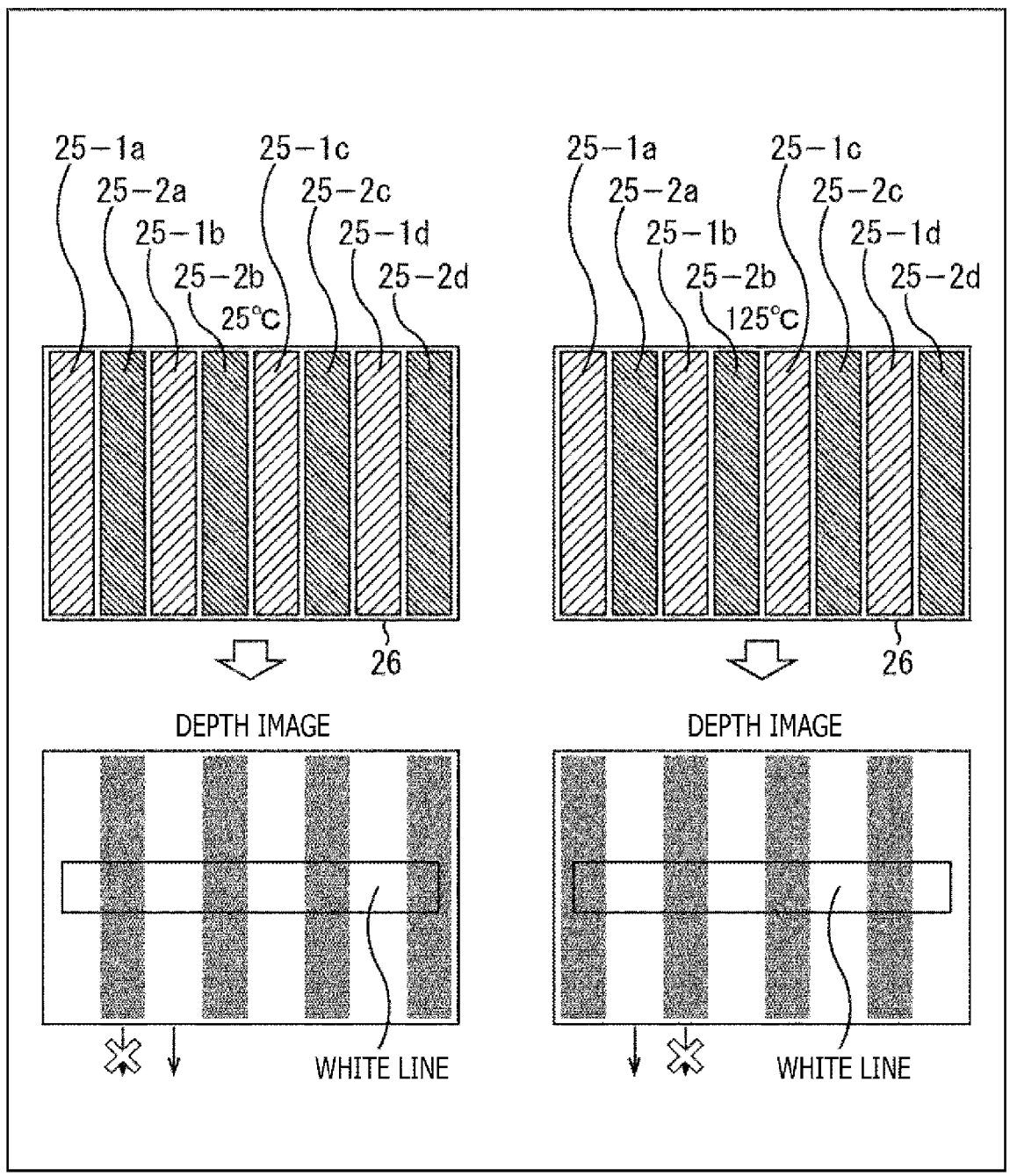
FIG. 14 is a view explaining an example of utilization of a TOF sensor in the example of arrangement depicted in FIG. 13.

As a result, as depicted in FIG. 14, the depth image acquiring apparatus 11D can acquire the depth image in which the white line is imaged so as to be perpendicular to the longitudinal direction of the filters 25-1a to 25-1d, and the filters 25-2a to 25-2d. Therefore, when the temperature is 25 degrees, the depth image acquiring apparatus 11D can acquire the depth image in which the white line is imaged in the division areas in which the filters 25-1a to 25-1d are arranged. On the other hand, when the temperature is 125 degrees, the depth image acquiring apparatus 11D can acquire the depth image in which the white line is imaged in the division areas in which the filters 25-2a to 25-2d are arranged.

That is to say, even when the temperature of the circumference environment is changed from 25 to 125 degrees, the depth image acquiring apparatus 11D can surely acquire the depth image in which the white line is imaged, and thus can measure a distance to the white line.

Figure 15:
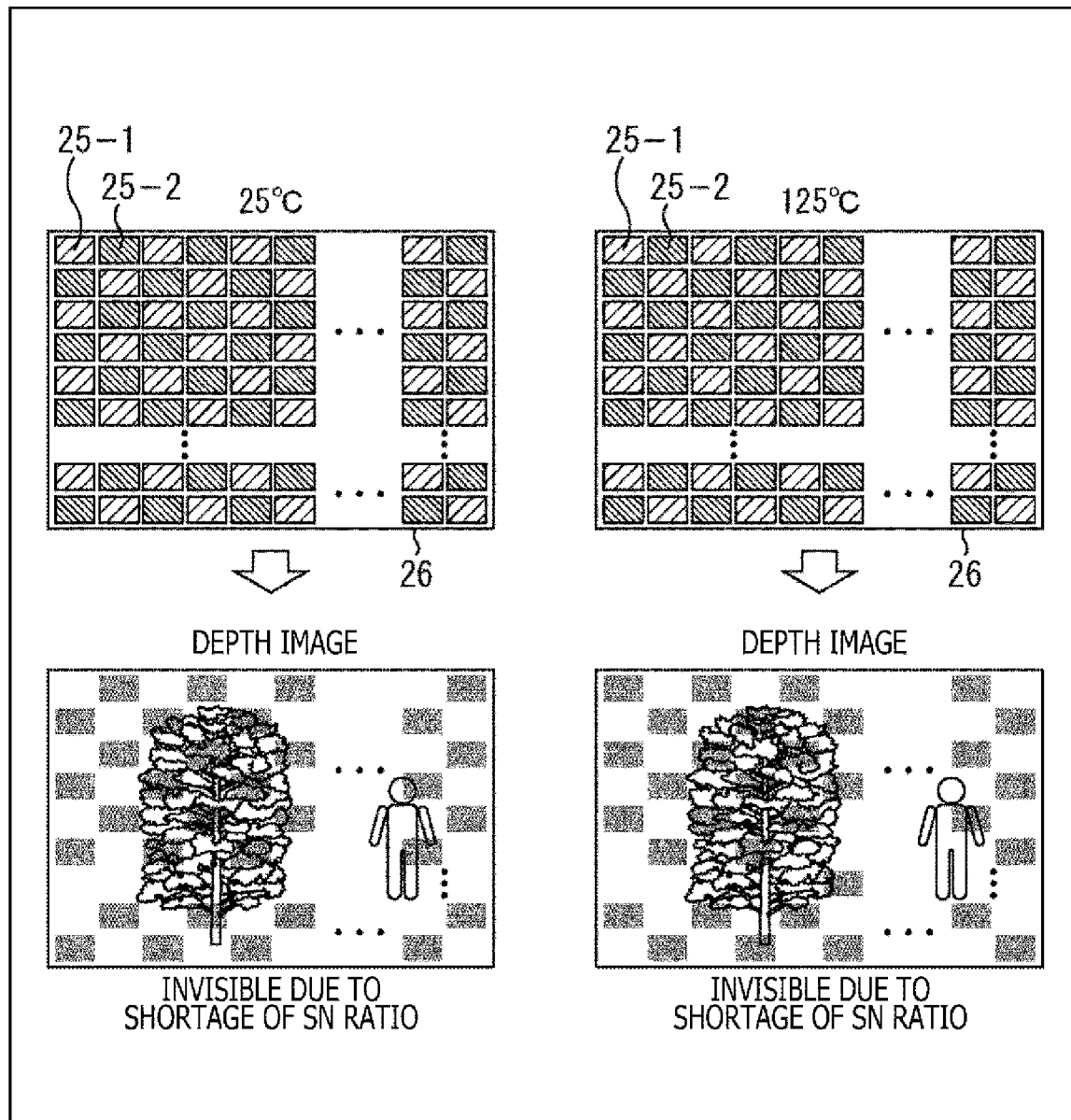
FIG. 15 is a view depicting an example of arrangement in which filters are alternately arranged every predetermined number of pixels.

FIG. 15 depicts an example of arrangement in a configuration in which filters 25-1 and 25-2 are alternately arranged in a longitudinal direction and in a transverse direction every division area in which a predetermined number of pixels (for example, the 16 pixels of 4×4) are rectangularly arranged. For example, the filters 25-1 and 25-2 can be arranged in such an on-chip style as to be directly laminated on the TOF sensor 26.

Therefore, although when the temperature is 25 degrees, the normal depth image can be acquired in the division areas in which the filters 25-1 are arranged, the normal depth image is not acquired in the division areas in which the filters 25-2 are arranged because of the shortage of the SN ratio. On the other hand, although when the temperature is 125 degrees, the normal depth image can be acquired in the division areas in which the filters 25-2 are arranged, the normal depth image is not acquired in the division areas in which the filters 25-1 are arranged because of the shortage of the SN ratio.

Figure 16:
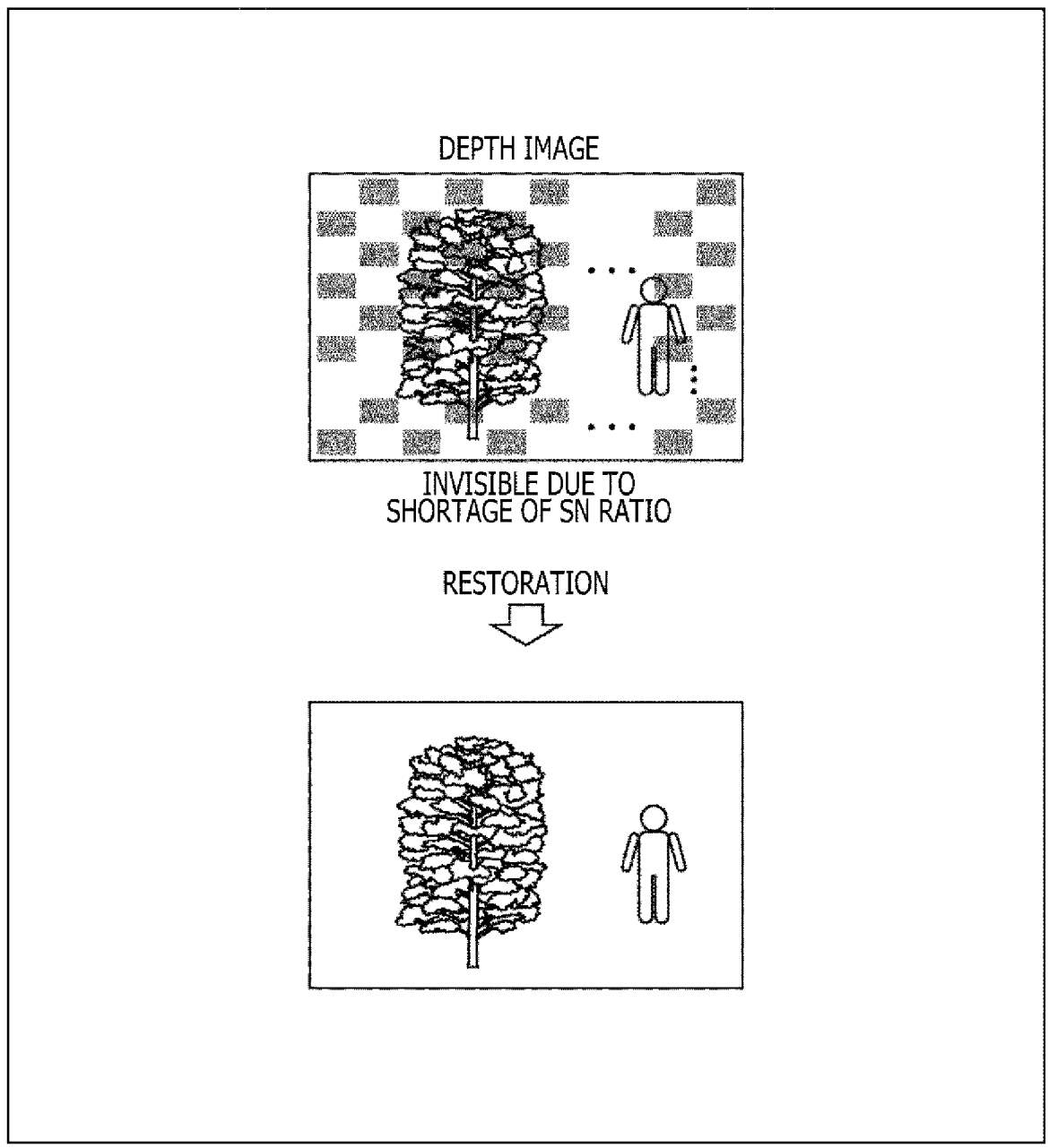
FIG. 16 is a view explaining restoration of a depth image.

In such a manner, in the example of arrangement in which the filters 25-1 and 25-2 are alternately arranged in the longitudinal direction and in the transverse direction, the division areas in which the normal depth image cannot be acquired because of the shortage of the SN ratio, as depicted in FIG. 16, can be restored in a subsequent stage. For example, the leaning processing utilizing the so-called artificial intelligence, the deep learning or the like is executed so as to complement the division area, adjacent to the division area in which the normal depth image can be acquired, in which the normal depth image cannot be acquired by using the division area adjacent thereto. As a result, the division area in which the normal depth image cannot be acquired is restored from the upper and lower and right and left division areas, thereby enabling the depth image corresponding to the entire TOF sensor 26 to be acquired.

In addition, for example, in case of a configuration in which the light receiving surface of the TOF sensor 26 is divided into a plurality of division areas in which the filters 25-1 and 25-2 are in turn arranged, the SN ratio can be improved as compared with the past technique adopting the wide bandwidth filter.

Figure 17:
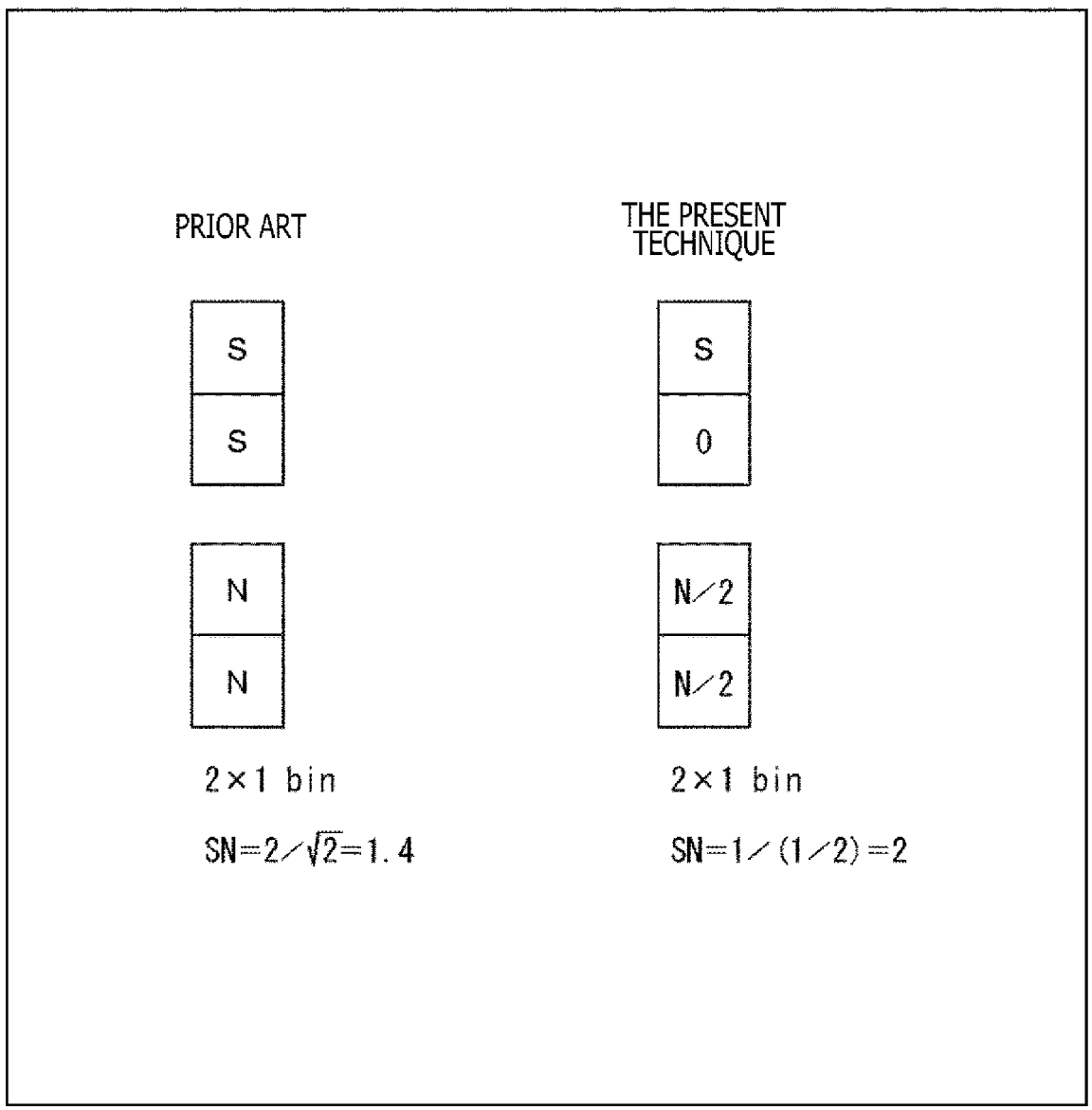
FIG. 17 is a view explaining enhancement of an SN ratio by narrowing a band of a filter.

That is to say, as depicted in FIG. 17, in the past technique adopting the wide bandwidth filter, with respect to certain two pixels, in the environment in which the ambient light is less, these pixels can output the pixel signals each having the more signal component. In addition, with respect to the two pixels, in the environment in which the ambient light is less, both the pixels output the pixel signals each containing much noise component. The SN ratio at this time becomes 1.4.

On the other hand, for example, in the case where the narrow bandwidth filters 25-1 and 25-2 in each of which the pass bandwidth is limited to ½ of the past bandwidth are arranged, in the environment in which the ambient light is less, one pixel outputs the pixel signal containing much signal component, and the other pixel outputs the pixel signal containing much noise component. In addition, in the environment in which the ambient light is much, both the pixels output the pixel signals each containing the noise component which becomes ½ of the past one. The SN ratio at this time becomes 2.

Therefore, as compared with the past technique adopting the filter having the wide bandwidth as the pass bandwidth, in the case where the filters 25-1 and 25-2 each of the pass bandwidth of which is narrower than that of the past one, the SN ratio is enhanced. As a result, for example, when the restoration is carried out as depicted in FIG. 16, as a whole, the depth image containing the less noise can be acquired.

Control of Light Source Temperature

Figure 18:
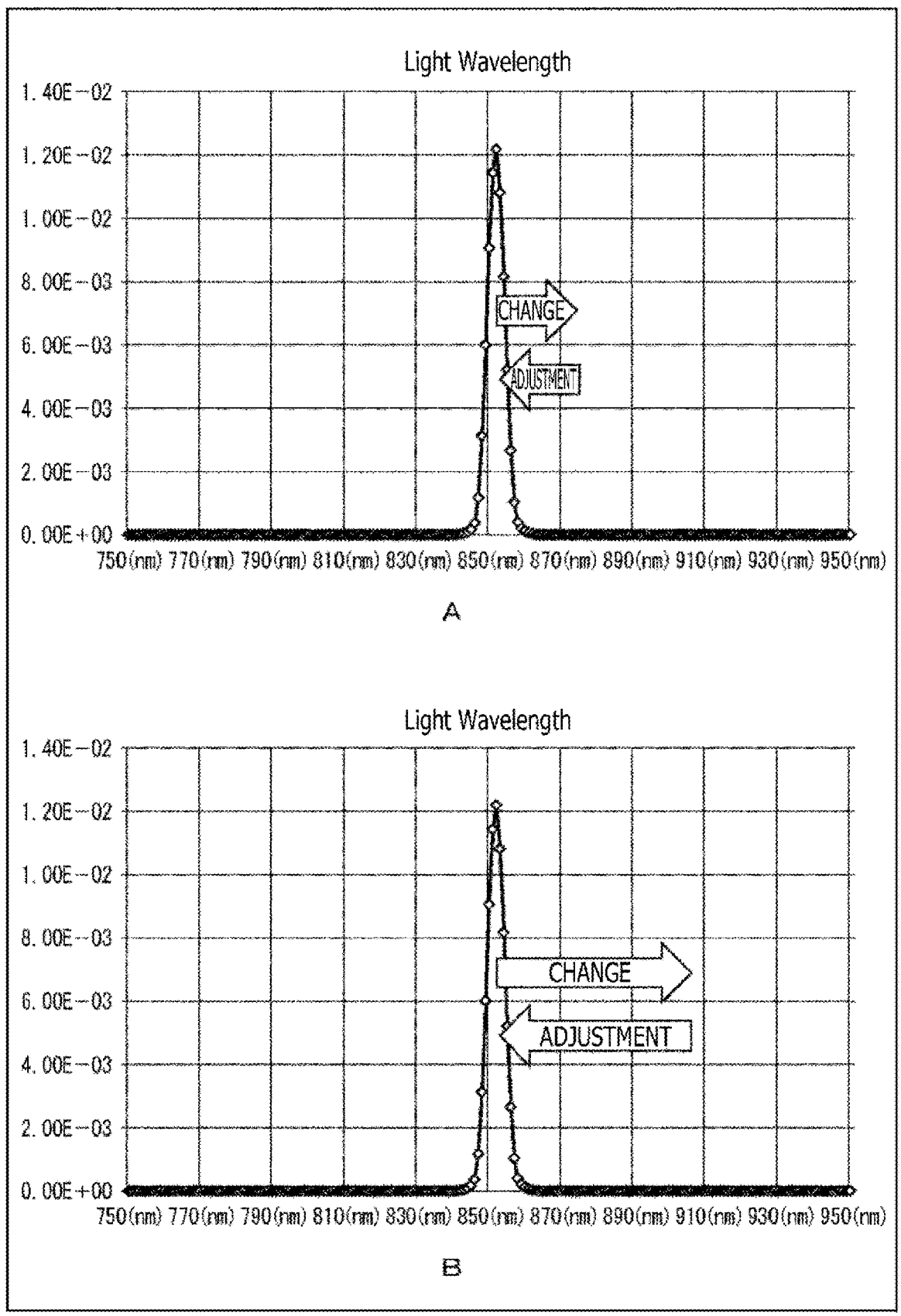
FIG. 18 is a graphical representation explaining control for maintaining a temperature of a light emitting diode at a constant value.

A description will now be given with respect to the control for maintaining the temperature of the light emitting diode 22 at a constant value with reference to FIG. 18.

For example, for realizing the TOF system, the TOF sensor 26 adopting a CAPD (Current Assisted Photonic Demodulator) has a feature that the large electric power is consumed. By utilizing the feature, the temperature of the light emitting diode 22 can be controlled by using the heat generated by consuming the electric power in the TOF sensor 26. In a word, the TOF sensor 26 is arranged in the vicinity of the light emitting diode 22 and the heat generated in the TOF sensor 26 is heat-transferred to the light emitting diode 22 through a heat transfer path, thereby enabling the temperature of the light emitting diode 22 to be adjusted.

That is to say, of the CAPD pixels which the TOF sensor 26 has, a predetermined number of CAPD pixels are dummy-operated, and in the case where the temperature of the light emitting diode 22 rises to a higher temperature than a desired temperature, the number of dummy-operated CAPD pixels is reduced. Thus, the heat transfer to the light emitting diode 22 can be reduced, and as a result, the temperature of the light emitting diode 22 can be reduced to the desired temperature. On the other hand, in the case where the temperature of the light emitting diode 22 is reduced to a lower temperature than the desired temperature, the number of dummy-operated CAPD pixels is increased. Thus, the heat transfer to the light emitting diode 22 can be increased, and as a result, the temperature of the light emitting diode 22 can rise to the desired temperature.

Therefore, as depicted in FIG. 18A, for example, when the temperature rise of the light emitting diode 22 is a small change, a less number of CARD pixels is stopped in the dummy operation to adjust the temperature of the light emitting diode 22, thereby enabling the temperature of the light emitting diode 22 to be maintained at a constant value. On the other hand, as depicted in FIG. 18B, for example, when the temperature rise of the light emitting diode 22 is a large change, a large number of CARD pixels are stopped in the dummy operation to adjust the temperature of the light emitting diode 22, thereby enabling the temperature of the light emitting diode 22 to be maintained at a constant value.

In such a manner, the TOF sensor 26 adjusts the temperature of the light emitting diode 22, and thus can carry out the control in such a way that the light emitting diode 22 can maintain a given desired temperature, thereby enabling the generation of the wavelength shift due to the temperature characteristics as described above to be suppressed. Therefore, the light emitting diode 22 can be made to emit such light as to pass the narrow bandwidth filter 25, and the influence of the ambient light is suppressed, thereby enabling the acquisition performance for the depth image to be enhanced. It should be noted that the control for the light source temperature is by no means limited to the CAPD pixel, and can also be applied to the SPAD pixel, the APD pixel or the like. In this case, the similar effect can be offered.

Utilization Example of Depth Image Acquiring Apparatus

A description will now be given with respect to examples of utilization of the depth image acquiring apparatus 11 with reference to FIG. 19 to FIG. 21.

As described above, the depth image acquiring apparatus 11 enables the acquisition distance, by which the higher accurate depth image can be acquired, to be made larger even in the use in the outdoors by using the narrow bandwidth filter 25. For example, in the case where the acquisition distance in the outdoors is approximately 15 meters, the depth image acquiring apparatus 11 can have the excellent recognition characteristics by the enhancement of the pixel resolution, the resolution, the viewing angle, and the like as compared with the other systems (for example, the ultrasonic sensor, the millimeter-wave sensor, the camera, and the like).

Figure 19:
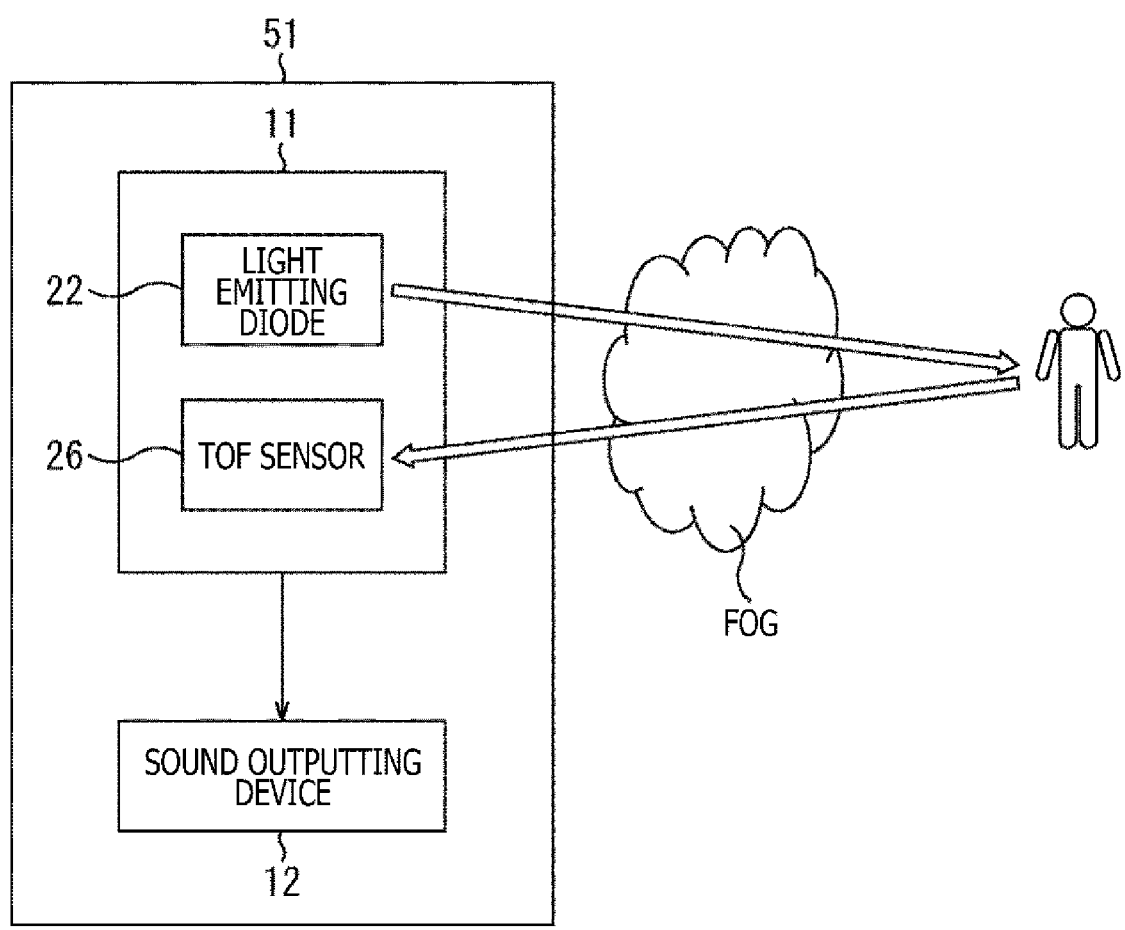
FIG. 19 is a block diagram explaining an example of utilization of the depth image acquiring apparatus.

FIG. 19 is a block diagram depicting an example of arrangement of a TOF system provided with notice means for notifying the outside of that an object is detected.

As depicted in FIG. 19, a TOF system 51 is configured to include the depth image acquiring apparatus 11 and a sound outputting device 12. It should be noted that in the depth image acquiring apparatus 11 depicted in FIG. 19, an illustration of the blocks other than those of the light emitting diode 22 and the TOF sensor 26 is omitted here.

The depth image acquiring apparatus 11 receives the light which is emitted from the light emitting diode 22 and reflected by the object at the TOF sensor 26, thereby enabling the depth image capable of recognizing that object to be acquired, for example, even when the fog is generated between the TOF system 51 and the subject. Then, in the case where, for example, a person makes a specific gesture, the depth image acquiring apparatus 11 outputs a signal exhibiting that the person is detected on the basis of the depth image acquired by the TOF sensor 26 to the sound outputting device 12.

The sound outputting device 12 is notice means for notifying that an object is detecting by outputting a specific sound. It should be noted that the notice utilizing the sound is merely an example, and thus the sound outputting device 12 may notify that an object is detected by utilizing means other than the sound.

Even in case of the environment such as the night or the bad weather such that the TOF system 51 cannot be recognized from a person becoming an object, the TOF system 51 configured in such a manner can recognize the person from the system 51. Then, when the person gives the signal by the gesture or the like, the sound outputting device 12 output the sound in accordance with a signal supplied from the depth image acquiring apparatus 11 to the sound outputting device 12. By this sound, the person can be made to recognize the apparatus (for example, the automatic driving vehicle or the like) equipped with the TOF system 51.

Figure 20:
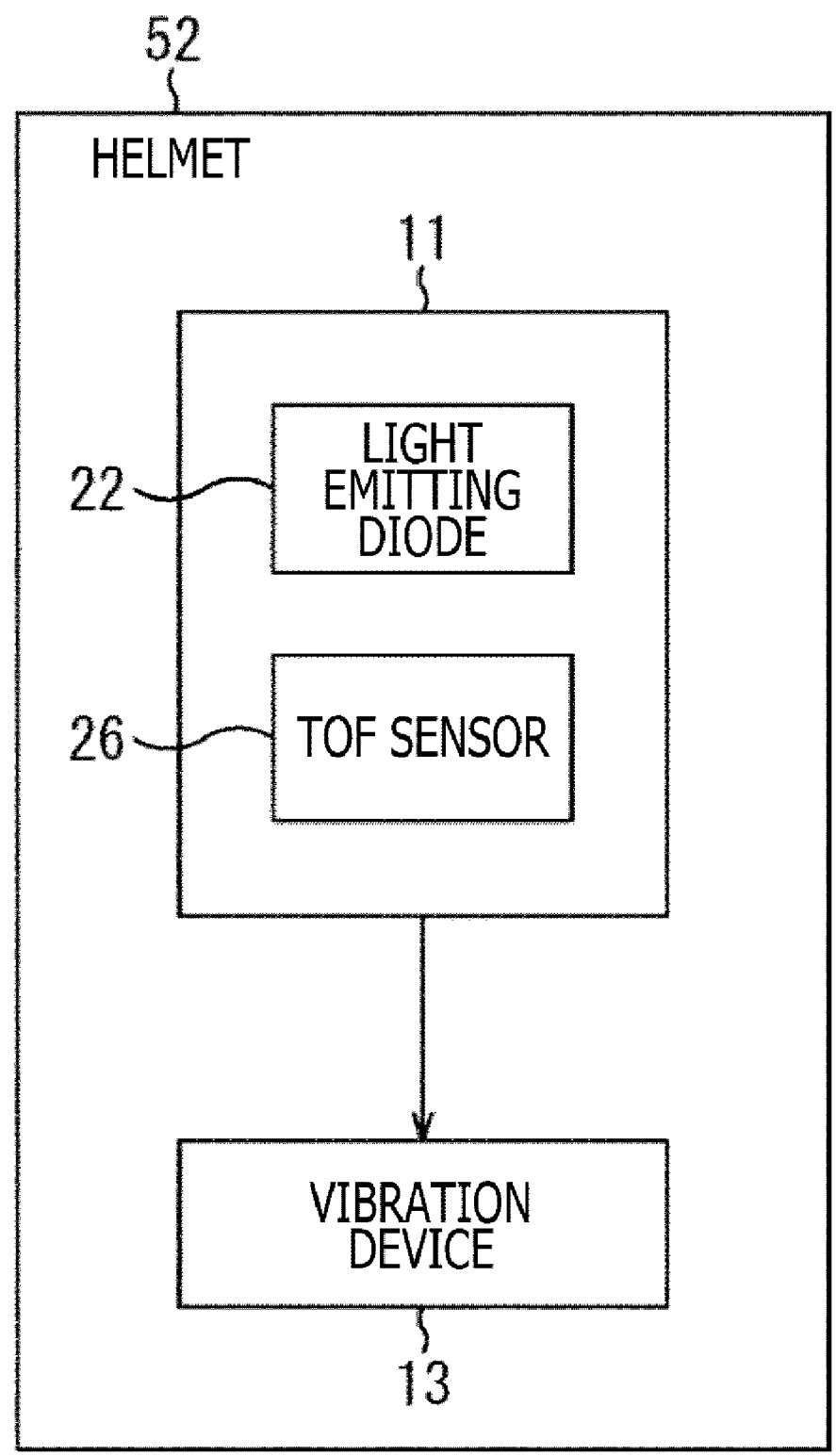
FIG. 20 is a block diagram explaining another example of utilization of the depth image acquiring apparatus.

FIG. 20 is a block diagram depicting an example of a configuration of a TOF system provided with notice means for notifying the outside of that an object is detected.

As depicted in FIG. 20, a TOF system 52 is configured to include the depth image acquiring apparatus 11 and a vibration device 13. It should be noted that in the depth image acquiring apparatus 11 depicted in FIG. 20, an illustration of the blocks other than those of the light emitting diode 22 and the TOF sensor 26 is omitted here.

For the TOF system 52, such an example of utilization as to mount the TOF system 52 to a tool capable of transmitting the vibration to the body of the user, for example, a helmet or the like with which a driver of a two-wheeled vehicle is equipped is supposed. For example, when the driver drives the two-wheeled vehicle when he/she pays attention to the front, the TOF system 52 mounted to the helmet can recognize an object lying in the side, the rear side or the like even in the environment such as the night or the bad weather on the basis of the depth image acquired by the depth image acquiring apparatus 11. Then, when the TOF system 52 detects such an object as to become the danger for the drive, the TOF system 52 supplies a signal representing that the object is detected to the vibration device 13. The vibration of the vibration device 13 can notify the driver of the effect.

Figure 21:
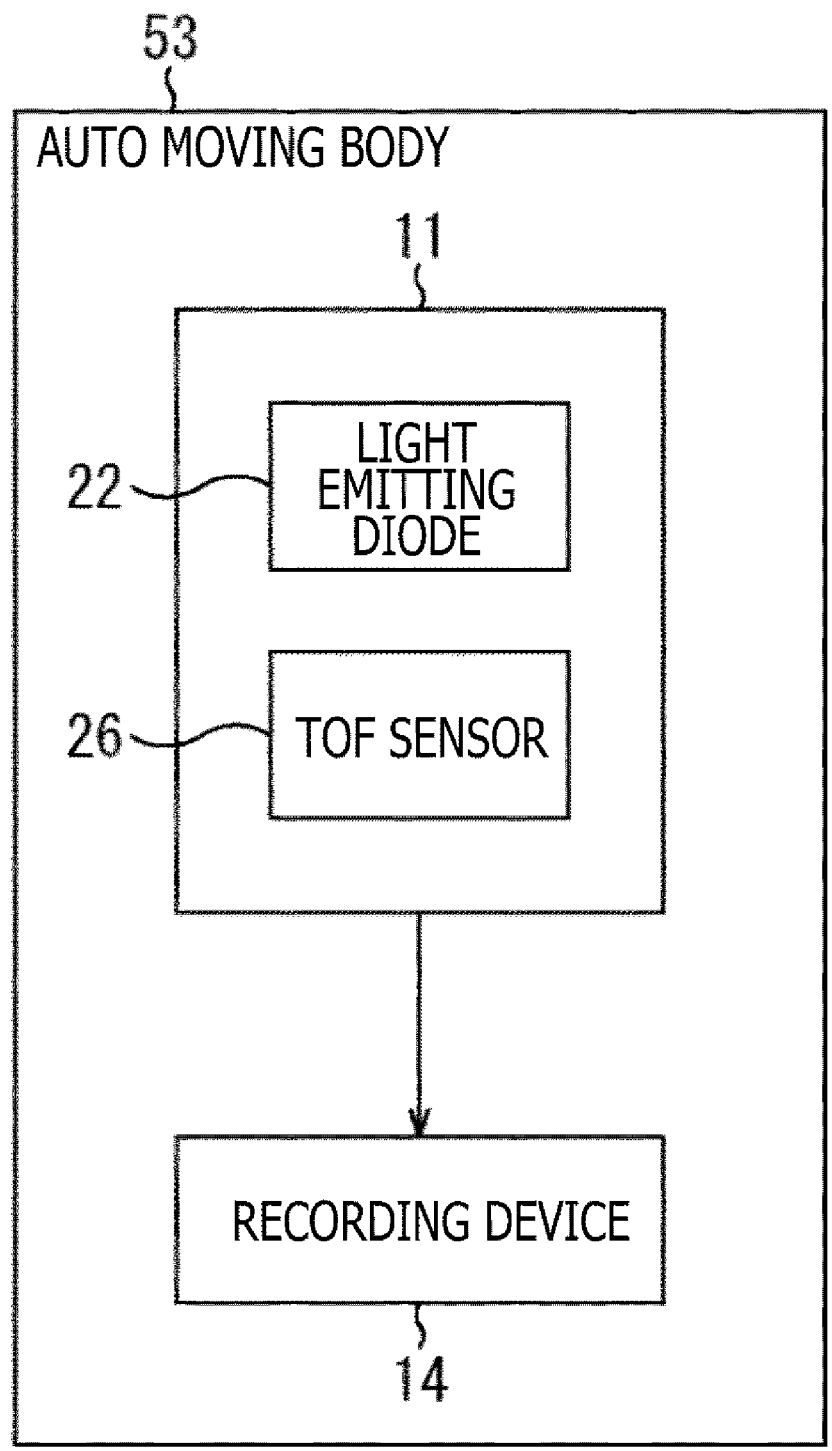
FIG. 21 is a block diagram explaining still another example of utilization of the depth image acquiring apparatus.

FIG. 21 is a block diagram depicting an example of a configuration of a TOF system provided with recording means for recording that the object is detected.

As depicted in FIG. 21, a TOF system 53 is configured to include the depth image acquiring apparatus 11 and a recording device 14. It should be noted that in the depth image acquiring apparatus 11 depicted in FIG. 21, an illustration of the blocks other than those of the light emitting diode 22 and the TOF sensor 26 is omitted here.

For the TOF system 53, such an example of utilization as to mount the TOF system 53 to an auto moving body such as an automatic mowing apparatus or a crop harvesting apparatus is supposed.

For example, for the mowing of a wide garden in Europe and the United States or the maintenance of the grass in a golf course or the like, an autonomous automatic mowing apparatus is used. In this case, the TOF system 53 mounted to the automatic mowing apparatus can recognize an object even in such daytime as to contain the ambient light. In addition, the automatic mowing apparatus having the TOF system 53 mounted thereto may be used in the night. In this case, the maintenance of the grass which is not utilized in the night can be automatically carried out, and thus the efficiency of the maintenance work can be promoted.

Then, when the TOF system 53 recognizes the object on the basis of the depth image acquired by the depth image acquiring apparatus 11, the TOF system 53 supplies the signal representing that the object is recognized to the recording device 14 which can in turn record the information associated with the recognition of the object. As a result, for example, the automatic mowing apparatus having the TOF system 53 mounted thereto can also be utilized as a nighttime security apparatus, and a suspicious person or the like is grasped on the basis of the recorded information, and can be managed as risk information.

For example, it is supposed that the autonomous automatic mowing apparatus is utilized for the harvest of the crops which becomes concerned about the labor shortage in the future. In this case, the TOF system 53 mounted to the autonomous automatic mowing apparatus can recognize an object such as an animal coming and going to the farm even in such daytime as to contain the ambient light. In addition, the autonomous automatic mowing apparatus having the TOF system 53 mounting thereto may be utilized in the night. In this case, the harvest of the crops is carried out in the night, thereby enabling the efficiency of the harvest work to be promoted.

Then, when the TOF system 53 recognizes the object such as the animal on the basis of the depth image acquired by the depth image acquiring apparatus 11, the TOF system 53 supplies a signal representing that the object is recognized to the recording device 14 which can in turn record the information associated with the recognition of the object. As a result, in the case where the animal coming and going to the farm is a harmful animal, the recorded information can be used as reference during the extermination thereof. In addition, in the TOF system 53, the infrared light output from the light emitting diode 22, for example, is used for detecting the freshness of the harvest, thereby enabling the TOF system 53 to be utilized in a crop harvesting system.

Figure 22:
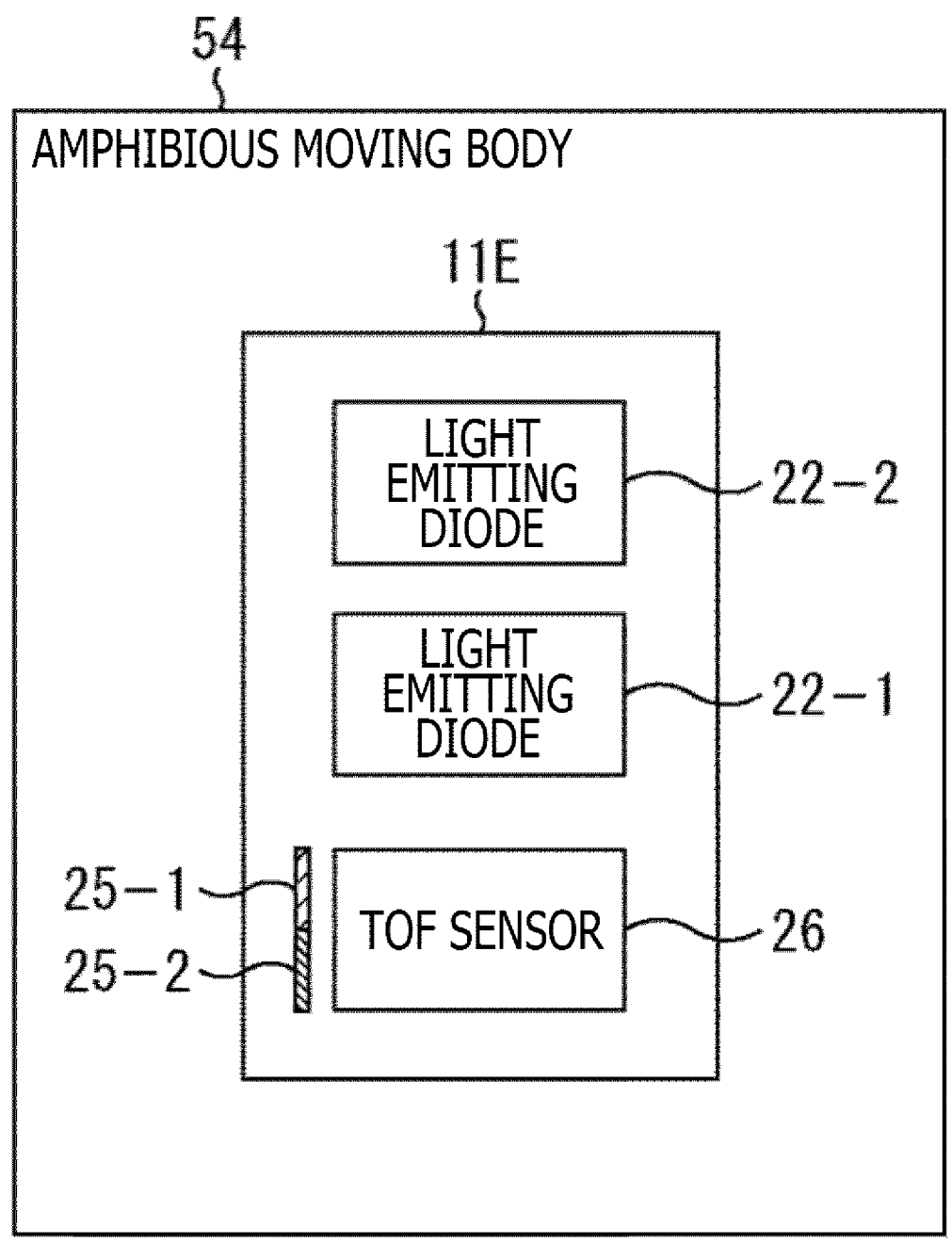
FIG. 22 is a block diagram explaining yet another example of utilization of the depth image acquiring apparatus.

FIG. 22 is a block diagram depicting an example of a configuration of the TOF system which can detect an object in the underwater and in the land.

As depicted in FIG. 22, the TOF system 54 is configured to include the depth image acquiring apparatus 11E. For example, the depth image acquiring apparatus 11E, similarly to the case of the depth image acquiring apparatus 11A of FIG. 4, is provided with the two light emitting diodes 22-1 and 22-2, and similarly to the case of the depth image acquiring apparatus 11D of FIG. 10, is provided with the filters 25-1 and 25-2 arranged on the light receiving surface of the TOF sensor 26. It should be noted that in the depth image acquiring apparatus 11E depicted in FIG. 22, an illustration of the blocks other than those of the light emitting diodes 22-1 and 22-2, the filters 25-1 and 25-2, and the TOF sensor 26 is omitted here.

For the TOF system 54, such an example of utilization as to mount the TOF system 54 to an amphibious moving body which can detect an object in the land and in the underwater so as to autonomously move.

For example, the TOF system 54 can use the light emitting diode 22-1 for emitting the light having the wavelength of 940 nm (refer to FIG. 2) and low illuminance in the outdoors, and the light emitting diode 22-1 for emitting the light having the wavelength of 520 nm and a low attenuation rate in the underwater. In response thereto, the pass bandwidth of the filter 25-1 is limited to the narrow bandwidth with 940 nm corresponding to the light emitting diode 22-1 as a center, and the pass bandwidth of the filters 25-2 is limited to the narrow bandwidth with 520 nm corresponding to the light emitting diode 22-2 as a center.

Therefore, the amphibious moving body having the TOF system 54 mounted thereto carries out the control such that in the land, the light emitting diode 22-1 is selected, and the depth image is acquired on the basis of the light passed the filter 25-1 in conjunction with the selection of the light emitting diode 22-1. As a result, the object in the land can be detected by the TOF sensor 26. On the other hand, the amphibious moving body having the TOF system 54 mounted thereto carries out the control such that in the underwater, the light emitting diode 22-2 is selected, and the depth image is acquired on the basis of the light passed the filter 25-2 in conjunction with the selection of the light emitting diode 22-2. As a result, the object in the underwater can be detected by the TOF sensor 26.

In such a manner, the amphibious moving body having the TOF system 54 mounted thereto selects the light emitting diodes 22 and the filters 25 corresponding to the land and the underwater, and thus can acquire the depth image by which the object can be satisfactorily recognized in any of the land and the underwater.

Incidentally, like the depth image acquiring apparatus 11E, a configuration in which the two light emitting diodes 22-1 and 22-2 are provided and the filters 25-1 and 25-2 are arranged on the light receiving surface of the TOF sensor 26 may be mounted to the auto moving body as described with reference to FIG. 21. With this configuration, for example, for the daylight and the night, the selection of the light emitting diodes 22-1 and 22-2, and the selection of the filters 25-1 and 25-2 are switched.

For example, the light emitting diode 22-1 and the filter 25-1 can be set for the daytime (wavelength: 940 nm), and the light emitting diode 22-2 and the filter 25-2 can be set for the night (wavelength: 850 nm). Therefore, the depth image acquiring apparatus 11E mounted to the auto moving body can use the light having the wavelength of 940 nm by which the influence of the ambient light can be suppressed in the daytime, and can use the light having the wavelength of 850 nm in which the sensitivity of the sensor is more satisfactory in the night. As a result, the auto moving body having the depth image acquiring apparatus 11E mounted thereto can acquire the depth image by which even in any of the daytime and the night, the object can be satisfactorily recognized.

In addition thereto, it is supposed that the TOF system provided with any of the depth image acquiring apparatuses 11 to 11E as described above is utilized in the various apparatuses such as a car navigation and a drive recorder.

Examples of Configuration of TOF Sensor

A description will now be given with respect to examples of a configuration of the TOF sensor 26 with reference to FIGS. 23 to 31.

Figure 23:
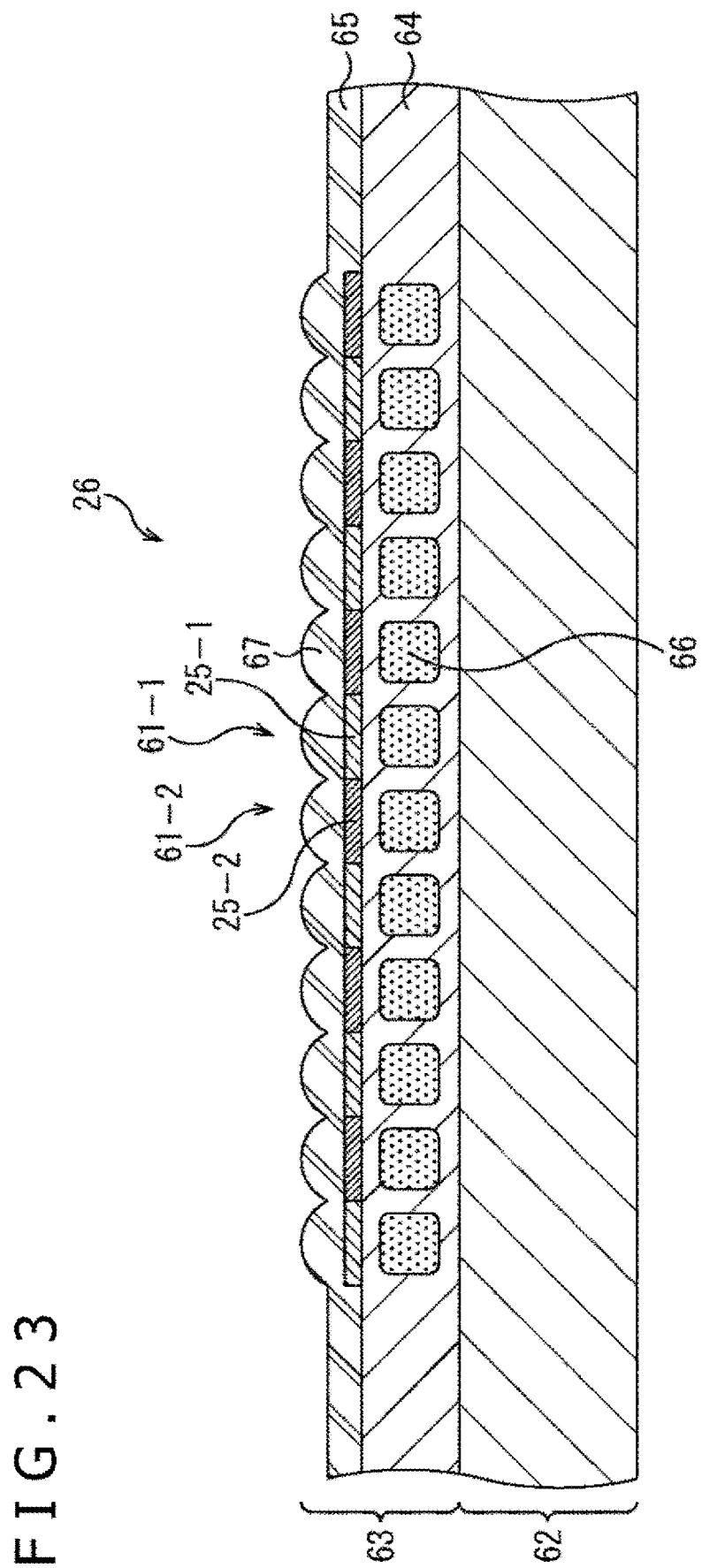
FIG. 23 is a cross-sectional view depicting a cross-sectional configuration of a TOF sensor.

FIG. 23 depicts a cross-sectional configuration of the TOF sensor 26.

In the example of the configuration depicted in FIG. 23, pixels 61 are arranged in a matrix in the light receiving surface of the TOF sensor 26. The TOF sensor 26 has a lamination structure in which a sensor substrate 63 is laminated on a logic substrate 62.

A signal processing circuit, a control circuit, a memory circuit, and the like are formed on the logic substrate 62. In this case, the signal processing circuit executes signal processing for signals output from the sensor substrate 63. The control circuit carries out the control for the pixels 61 of the sensor substrate 63. The memory circuit stores therein signals output from the sensor substrate 63.

The sensor substrate 63 is configured in such a way that an on-chip lens layer 65 is laminated on a semiconductor layer 64. A photodiode 66 is formed every pixel 61 in the semiconductor layer 64. The filter 25 is arranged every pixel 61 on the light receiving surface of the semiconductor layer 64. A microlens 67 is arranged every pixel 61 in the on-chip lens layer 65.

In the TOF sensor 26, the pixel 61-1 in which the filter 25-1 is arranged receives the light having the wavelength corresponding to the pass bandwidth of the filter 25-1. The pixel 61-2 in which the filter 25-2 is arranged receives the light having the wavelength corresponding to the pass bandwidth of the filter 25-2.

Figure 24:
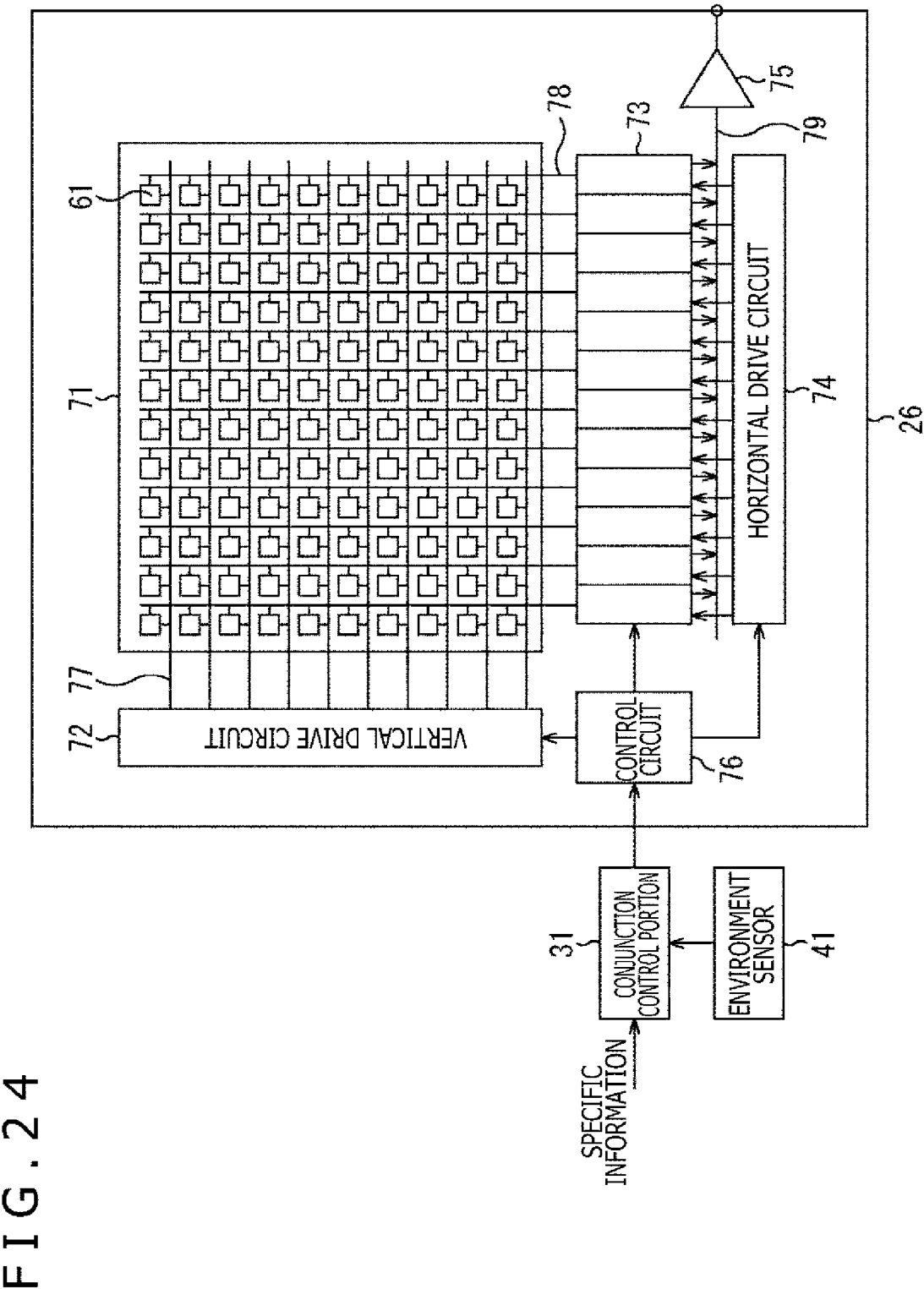
FIG. 24 is a block diagram depicting an example of a configuration of the TOF sensor.

FIG. 24 depicts a block diagram depicting an example of a configuration of the TOF sensor 26.

As depicted in FIG. 24, the TOF sensor 26 is configured to include a pixel area 71, a vertical drive circuit 72, a column signal processing circuit 73, a horizontal drive circuit 74, an output circuit 75, and a control circuit 76.

The pixel area 71, for example, is a light receiving surface for receiving the light condensed by the light receiving lens 24 of FIG. 1. A plurality of pixels 61 is arranged in a matrix in the pixel area 71. The respective pixels 61 are connected to the vertical drive circuit 72 every row through the horizontal signal line 77, and are connected to the column signal processing circuit 73 every column through the vertical signal line 78. A plurality of pixels 61 outputs the pixel signals having the respective levels corresponding to the quantities of light passed the filters 25 which are individually arranged.

The vertical drive circuit 72 supplies a drive signal used to drive (transfer, selection, reset or the like) the pixels 61 in order every row of a plurality of pixels 61 arranged in the pixel area 71 to the pixels 61 through the horizontal signal lines 77. The column signal processing circuit 73 subjects the pixel signals output from a plurality of pixels 61 through the respective vertical signal lines 78 to CDS (Correlated Double Sampling) processing, thereby carrying out AD conversion of the pixel signal, and removing away the reset noise.

The horizontal drive circuit 74 supplies a drive signal used to output the pixel signals are output from the column signal processing circuit 73 to the data output signal line 79 in order every column of a plurality of pixels 61 arranged in the pixel area 71 to the column signal processing circuit 73. The output circuit 75 amplifies the pixel signal supplied thereto from the column signal processing circuit 73 through the data output signal line 79 at a timing in accordance with the drive signal of the horizontal drive circuit 74, and outputs the resulting pixel signal to a circuit in a subsequent stage (for example, the synchronous processing portion 28 of FIG. 1). The control circuit 76, for example, produces a clock signal in accordance with a drive period of the blocks of the TOF sensor 26 and supplies the resulting clock signal, thereby controlling the drive for the blocks.

Then, in the TOF sensor 26, the conjunction control portion 31 carries out the control as described above in accordance with either the sensor information output from the environment sensor 41, or specific information registered at the time of manufacture of the TOF sensor 26.

For example, when the environment sensor 41 detects the temperature of the circumference environment of the light emitting diode 22, and supplies the sensor information exhibiting that temperature to the conjunction control portion 31, the conjunction control portion 31 carries out the control for selecting one of the filters 25-1 and 25-2 in accordance with the temperature exhibited by the sensor information. Then, the conjunction control portion 31 notifies the control circuit 76 of the selected one of the filters 25-1 and 25-2. The control circuit 76 controls the drive of the pixels 61 in such a way that the pixel signal is output from the pixel 61 in which one filter selected by the conjunction control portion 31 is arranged. As a result, even when there is the temperature change, the pixel signal based on which the high accurate depth signal can be produced can be output.

In addition, for example, in the case where the environment sensor 41 can detect presence or absence of the water of the circumference environment, the environment sensor 41 can supply the sensor information exhibiting which of the land or the underwater, the environment sensor 41 is used in to the conjunction control portion 31. Therefore, as described with reference to FIG. 22, the conjunction control portion 31 carries out the control for selecting one of the filter 25 for the land (wavelength: 940 nm) and the filter 25 for the underwater (wavelength: 520 nm) of the filters 25-1 and 25-2 in accordance with the sensor information. Then, the conjunction control portion 31 notifies the control circuit 76 of the selected one of the filters 25-1 and 25-2. The control circuit 76 controls the drive of the pixels 61 in such a way that the pixel signal is output from the pixel 61 in which one filter 25 selected by the conjunction control portion 31 is arranged. As a result, in case of any of the land and the underwater, the pixel signal based on which the high accurate depth signal can be produced can be output.

In addition, for example, in the case where the environment sensor 41 can detect the illuminance of the circumference environment, the environment sensor 41 can supply the sensor information exhibiting which of the daytime or the night it is to the conjunction control portion 31. Therefore, the conjunction control portion 31 carries out the control for selecting one set of the light emitting diode 22 and the filter 25 for the daytime (wavelength: 940 nm) and the light emitting diode 22 and the filter for the night (wavelength: 850 nm) of the light emitting diode 22-1 and the filter 25-1, and the light emitting diode 22-2 and the filter 25-2. As a result, in any of the daytime and the night, the pixel signal based on which the high accurate depth signal can be produced can be output.

Now, the conjunction control portion 31 can carry out the control in accordance with the specific information specific to the individual TOF sensors 26 in addition to the sensor signal. For example, information exhibiting the viewing angle end or the center every pixel 61, information exhibiting the manufacture dispersion, or the like can be used as the specific information.

For example, in the TOF sensor 26, the suitable pass bandwidths of the filter 25 need to be used for the pixel 61 in the viewing angle end, and the pixel 61 at the center, in accordance with a converging angle (wide angle or narrow angle) of the light receiving lens 24. Therefore, the conjunction control portion 31 carries out the control for selecting one set from the light emitting diode 22-1 and the filter 25-1, and the light emitting diode 22-2 and the filter 25-2 depending on which of the viewing angle end and the center the pixel 61 is arranged in accordance with the switching of the converging angle of the light receiving lens 24. As a result, even in the case where the converging angle of the light receiving lens 24 is any of the wide angle and the narrow angle, the TOF sensor 26 can output the pixel signal based on which the highly accurate depth signal can be produced.

In addition, in the TOF sensor 26, the suitable pass bandwidths need to be used in the individual pixels 61 depending on the dispersion at the time of the manufacture. Therefore, the conjunction control portion 31 carries out the control for selecting one set of the light emitting diode 22-1 and the filter 25-1, and the light emitting diode 22-2 and the filter 25-2 so as to correct the dispersion at the time of the manufacture. As a result, the TOF sensor 26 can output the pixel signal based on which the highly accurate depth image in which the dispersion every pixel 61 is suppressed can be produced.

Figure 25:
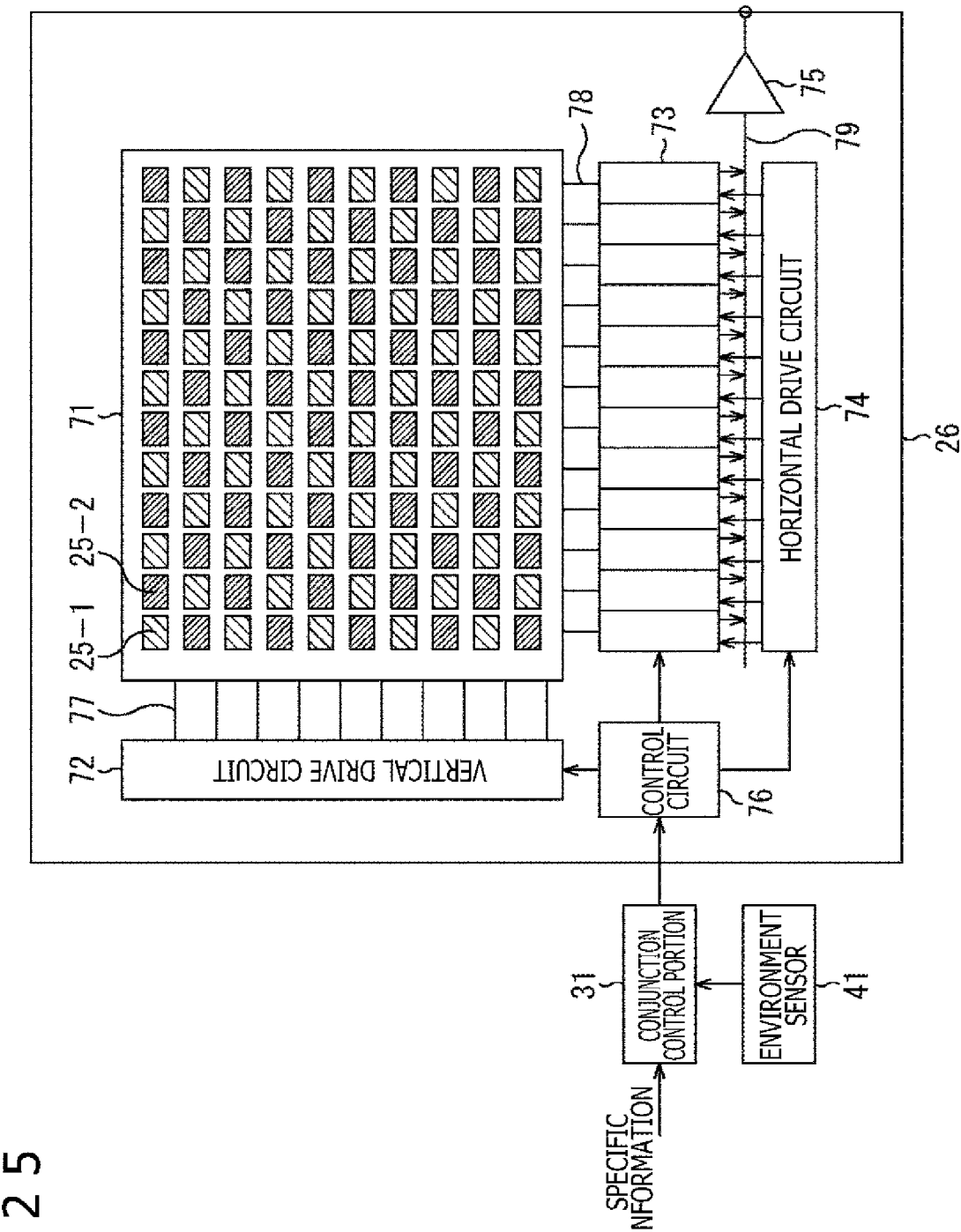
FIG. 25 is a block diagram depicting an example of arrangement in which filters are alternately arranged in a row direction and in a column direction of pixels.

FIG. 25 depicts an example of arrangement in which the filters 25-1 and 25-2 provided every pixel 61 are alternately arranged in the row direction and in the column direction of the pixel area 71. In such a TOF sensor 26, the control circuit 76 can carry out the control for the vertical drive circuit 72 and the horizontal drive circuit 74 so as to drive the pixel 61 in which one, which is selected by the conjunction control portion 31, of the filters 25-1 and 25-2 is arranged.

Figure 26:
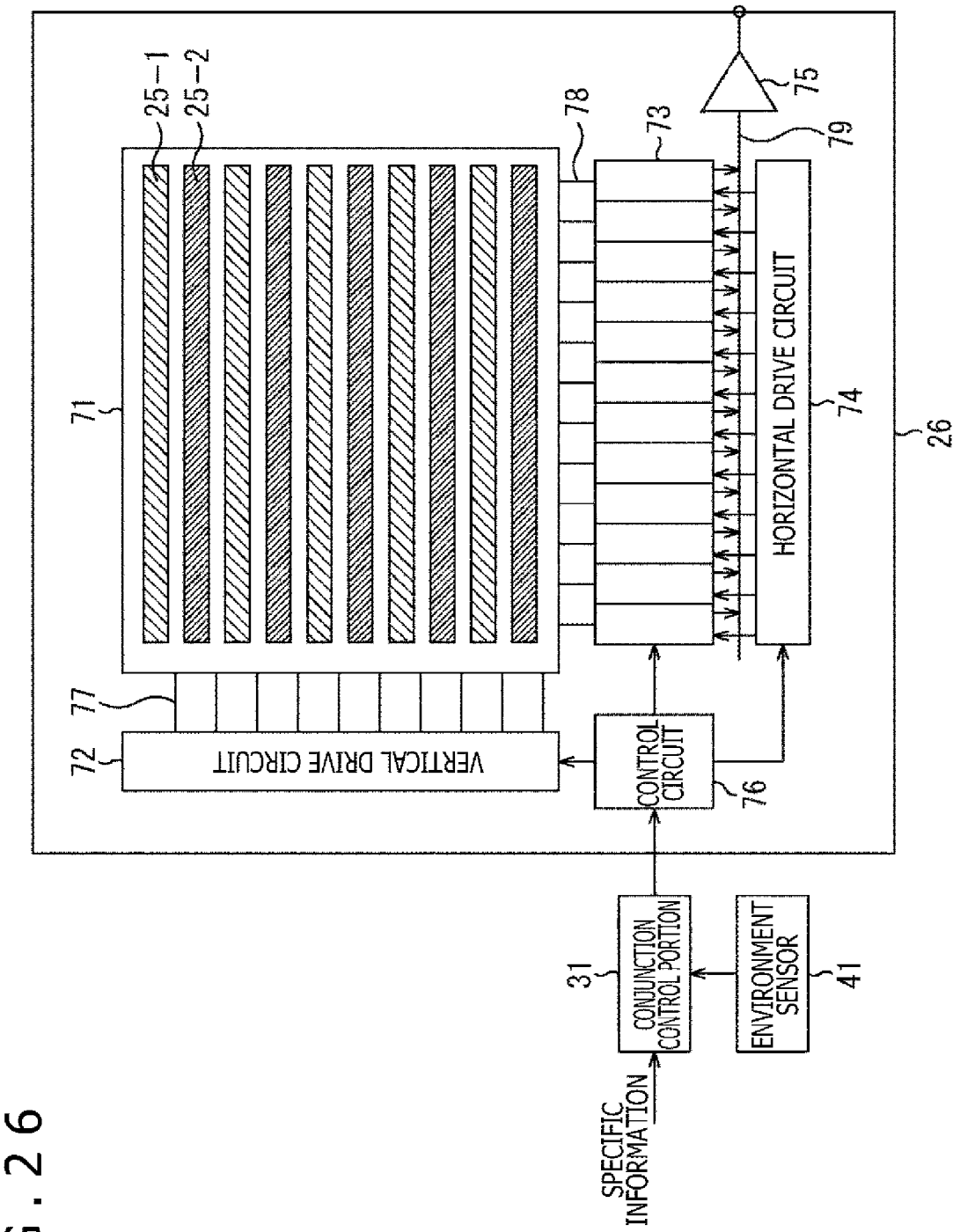
FIG. 26 is a block diagram depicting an example of arrangement in which filters are alternately arranged in a column direction of the pixels.

FIG. 26 depicts an example of arrangement in which the filters 25-1 and 25-2 provided along the row of the pixels 61 are alternately arranged in the column direction of the pixel area 71. In such a TOF sensor 26, the control circuit 76 can carry out the control for the vertical drive circuit 72 so as to drive the row of the pixels 61 in which one, which is selected by the conjunction control portion 31, of the filters 25-1 and 25-2 is arranged. At this time, the drive for the row, of the pixels 61 which is not selected by the conjunction control portion 31, of the rows corresponding to the filters 25-1 and 25-2 is not carried out, the control circuit 76 can carry out the control so as to stop the drive elements of the vertical drive circuit 72 corresponding to the row concerned. In such a manner, by stopping the reading of the pixel signal, the TOF sensor 26, for example, can promote the low power consumption and the speed-up.

Figure 27:
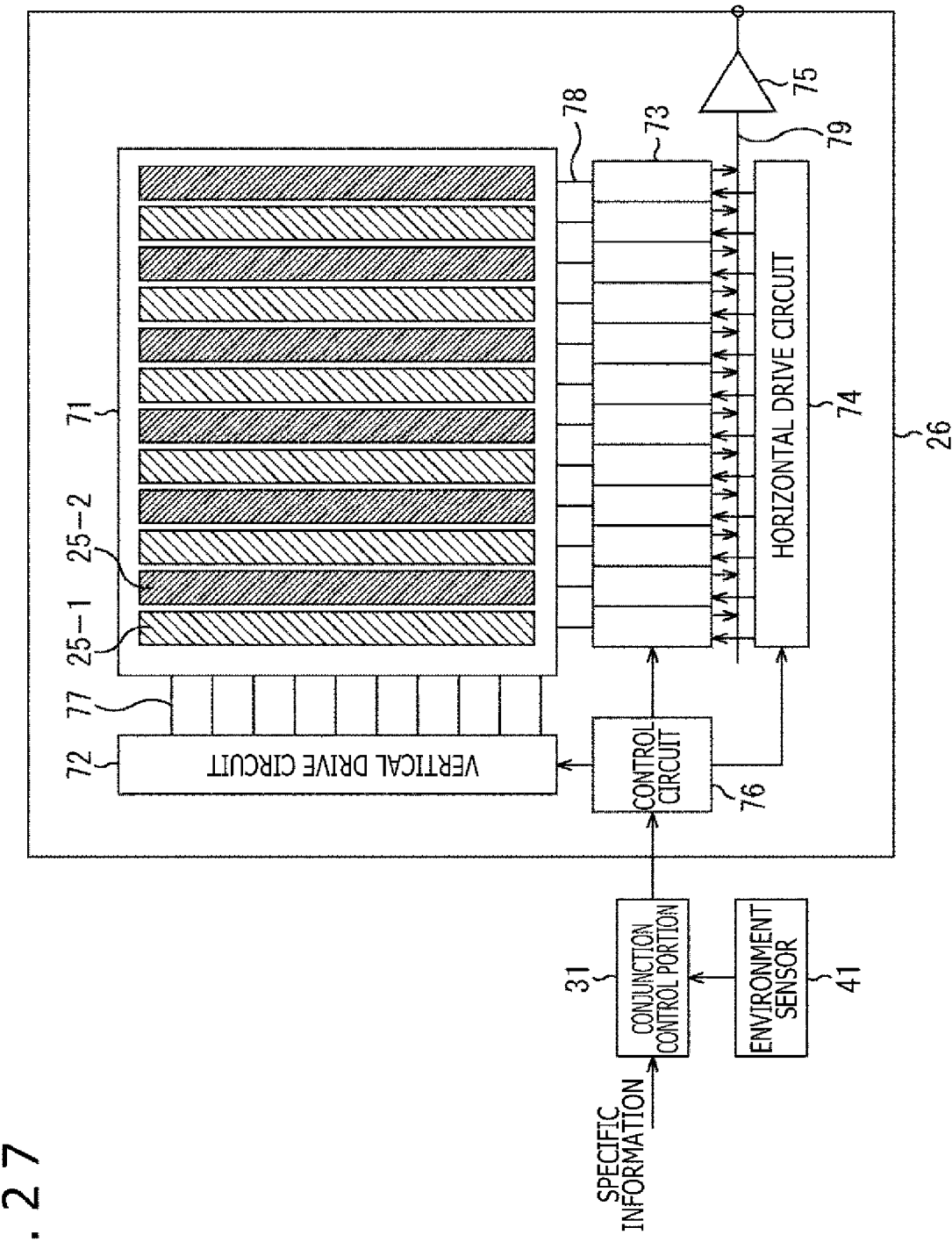
FIG. 27 is a block diagram depicting an example of arrangement in which filters are alternately arranged in a row direction of the pixels.

FIG. 27 depicts an example of arrangement in which the filters 25-1 and 25-2 provided along the column of the pixels 61 are alternately arranged in the row direction of the pixel area 71. In such a TOF sensor 26, the control circuit 76 can carry out the control for the horizontal drive circuit 74 so as to drive the column of the pixels 61 in which one, which is selected by the conjunction control portion 31, of the filters 25-1 and 25-2 is arranged. At this time, the drive for the column, of the pixels 61 which is not selected by the conjunction control portion 31, of the columns corresponding to the filters 25-1 and 25-2 is not carried out. Therefore, the control circuit 76 can carry out such control as to stop the drive of the AD conversion elements of the column signal processing circuit 73 corresponding to the column connection. In such a manner, by stopping the reading of the pixel signal, the TOF sensor 26, for example, can promote the low power consumption and the speed-up.

Figure 28:
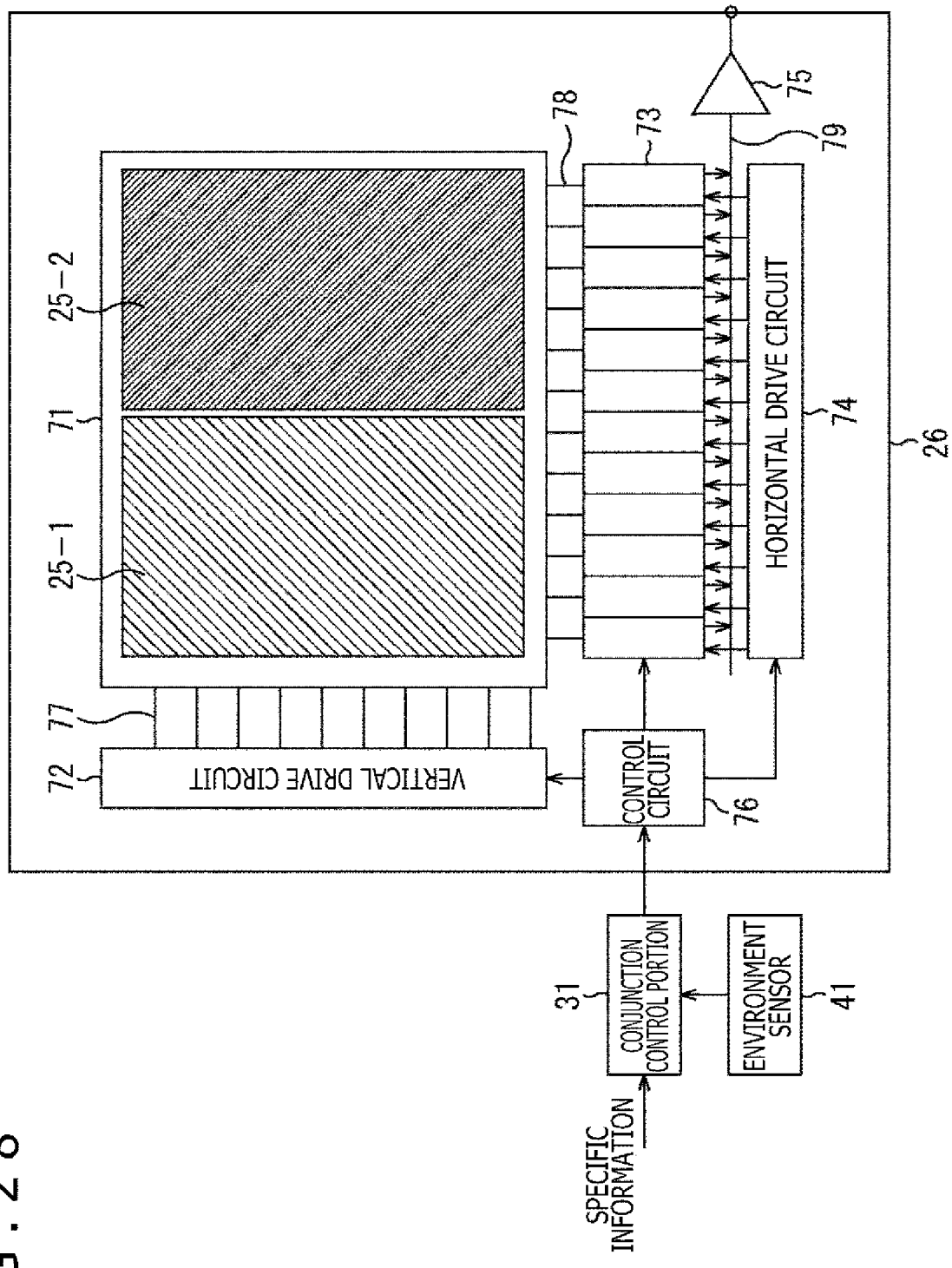
FIG. 28 is a block diagram depicting an example of arrangement in which a filter is arranged so as to be divided into two right and left.

FIG. 28 depicts an example of arrangement in which the filter 25-1 is arranged in an area of a left half of the pixel area 71, and the filter 25-2 is arranged in an area of a right half of the pixel area 71. In such a TOF sensor 26, the control circuit 76 can carry out the control for the horizontal drive circuit 74 so as to drive an area of the pixels 61 in which one, which is selected by the conjunction control portion 31, of the filters 25-1 and 25-2. At this time, the drive for the area of the pixels 61 which is not selected by the conjunction control portion 31, of the areas corresponding to the filters 25-1 and 25-2 is not carried out. Therefore, the control circuit 76 can carry out such control as to stop the drive of the AD conversion elements of the column signal processing circuit 73 corresponding to the area concerned can be carried out. In such a manner, by stopping the reading of the pixel signal, the TOF sensor 26, for example, can promote the low power consumption and the speed-up.

Figure 29:
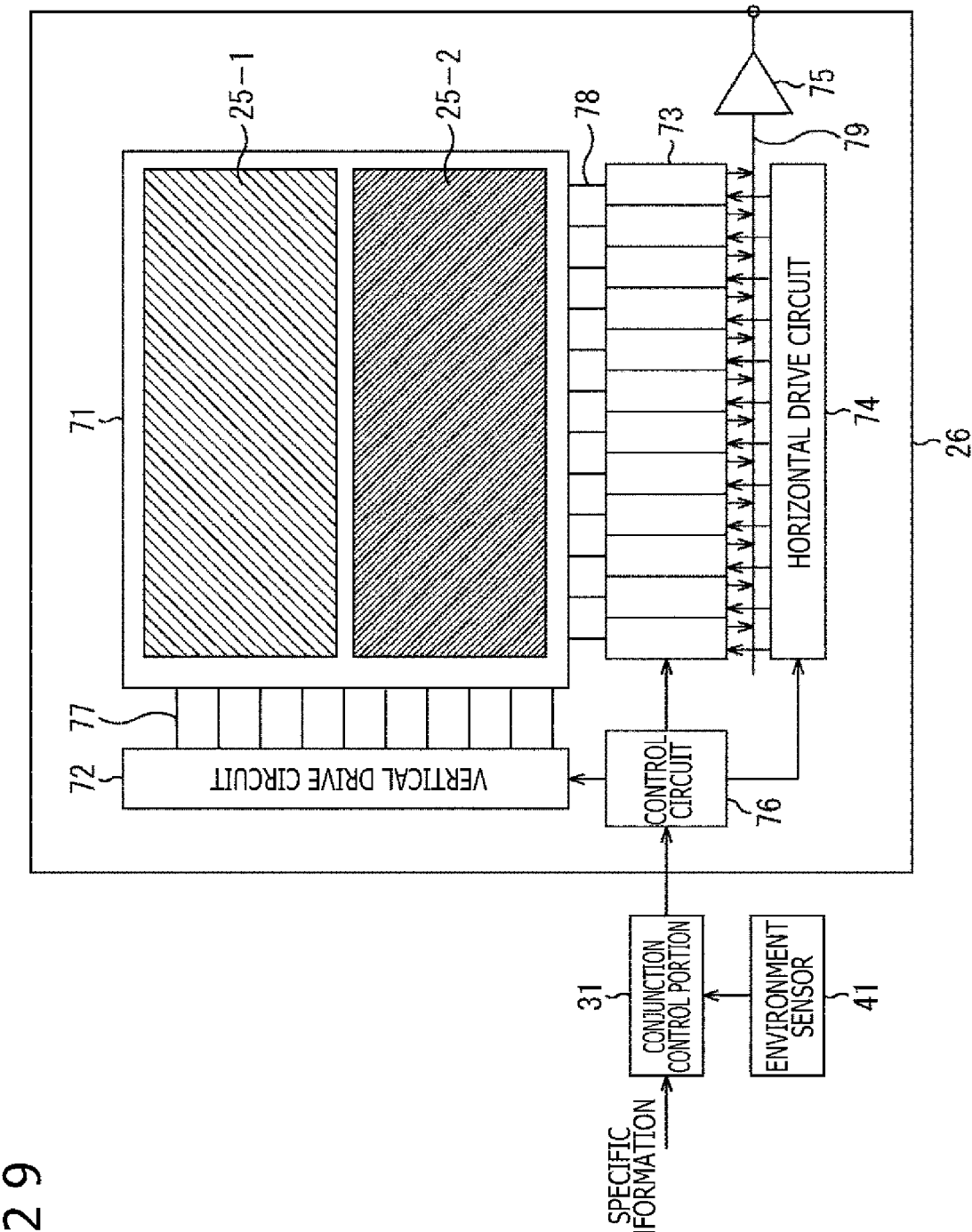
FIG. 29 is a block diagram depicting an example of arrangement in which the filter is arranged so as to be divided into two up and down.

FIG. 29 depicts an example of a configuration in which the filters 25-1 is arranged in an area of an upper half of the pixel area 71, and the filters 25-2 is arranged in an area of a lower half of the pixel area 71. In such a TOF sensor 26, the control circuit 76 can carry out the control for the vertical drive circuit 72 so as to drive the area of the pixels 61 in which one, which is selected by the conjunction control portion 31, of the filters 25-1 and 25-2. At this time, the drive for the area, of the pixels 61 which is not selected by the conjunction control portion 31, of the areas corresponding to the filters 25-1 and 25-2 is not carried out. Therefore, the control circuit 76 can carry out the control so as to stop the drive elements of the vertical drive circuit 72 corresponding to the row concerned. In such a manner, by stopping the reading of the pixel signal, the TOF sensor 26, for example, can promote the low power consumption and the speed-up.

Figure 30:
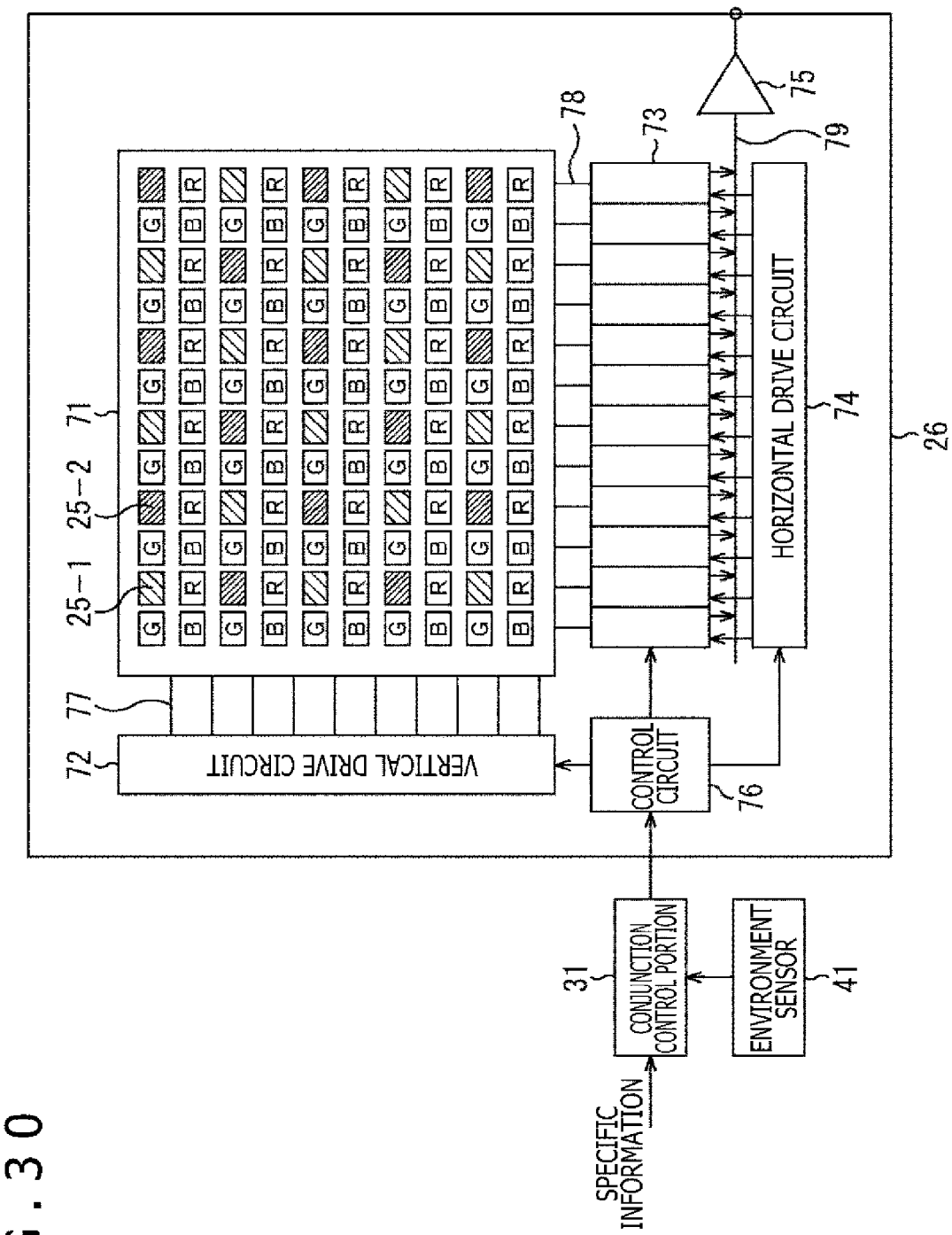
FIG. 30 is a block diagram depicting an example of arrangement in which the filter is arranged in combination with Bayer array.

FIG. 30 depicts an example of arrangement in which the filters 25-1 and 25-2 are arranged in combination with a Bayer array. That is to say, a red filter R, a green filter G, and a blue filter B, and the filter 25-1 or 25-2 are arranged for four pixels 61 arranged in the form of 2×2. In addition, the filter 25-1 and 25-2 are alternately arranged in the row direction and in the column direction of the pixel area 71. By the TOF sensor 26 of such an example of arrangement, the RGB image can be acquired together with the depth image.

Figure 31:
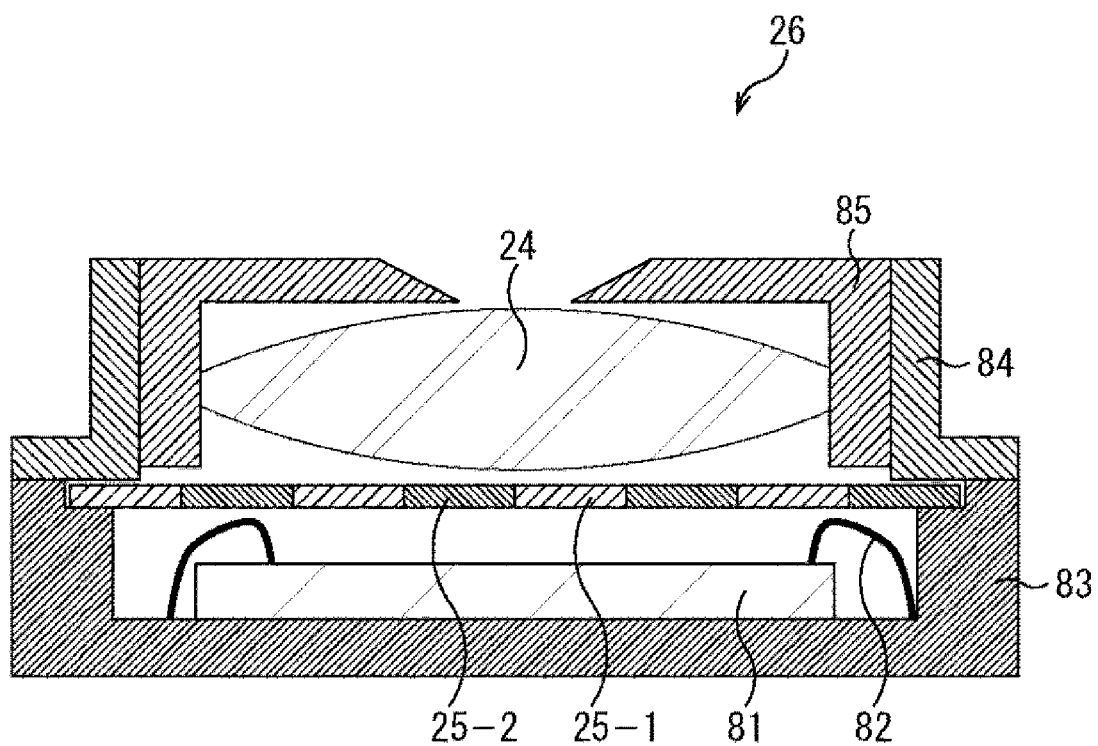
FIG. 31 is a cross-sectional view depicting a cross-sectional configuration of the TOF sensor having a configuration based on module equipment.

FIG. 31 depicts a cross-sectional configuration example of the TOF sensor 26 having a configuration by module arrangement. For example, in addition to the arrangement of such an on-chip as to directly laminate the filters 25-1 and 25-2 on the light receiving surface of the semiconductor layer 64 of the TOF sensor 26 as depicted in FIG. 23, as depicted in FIG. 31, the filters 25-1 and 25-2 can be arranged in the form of a module.

As depicted in the figure, for example, a signal can be output from a sensor substrate 81 to the outside through a bonding wire 82. The filters 25-1 and 25-2 are arranged on the light receiving surface side of the sensor substrate 81 as a module in the form of an outside style by utilizing a storage case 83 for storing therein the sensor substrate 81. Moreover, a light receiving lens 24 is fixed to the storage case 83 by using lens holders 84 and 85.

Example of Configuration of Computer

It should be noted that the pieces of processing described with reference to the flow chart described above are not necessarily executed in a time-series manner along the order described in the form of the flow chart, and includes pieces of processing which are executed in parallel or individually (for example, parallel processing or processing by an object). In addition, a program may be processed by a single CPU, or may be processed in a distributed manner by a plurality of CPUs.

In addition, the series of pieces of processing (control method) described above can be executed by hardware or can be executed by software. In the case where the series of pieces of processing are executed by the software, a program constituting the software is installed in a computer incorporated in dedicated hardware, or, for example, is installed in a general-purpose personal computer or the like which can execute various functions by installing various kinds of programs from a program recording media in which a program is recorded.

Example of Configuration of Computer

Figure 32:
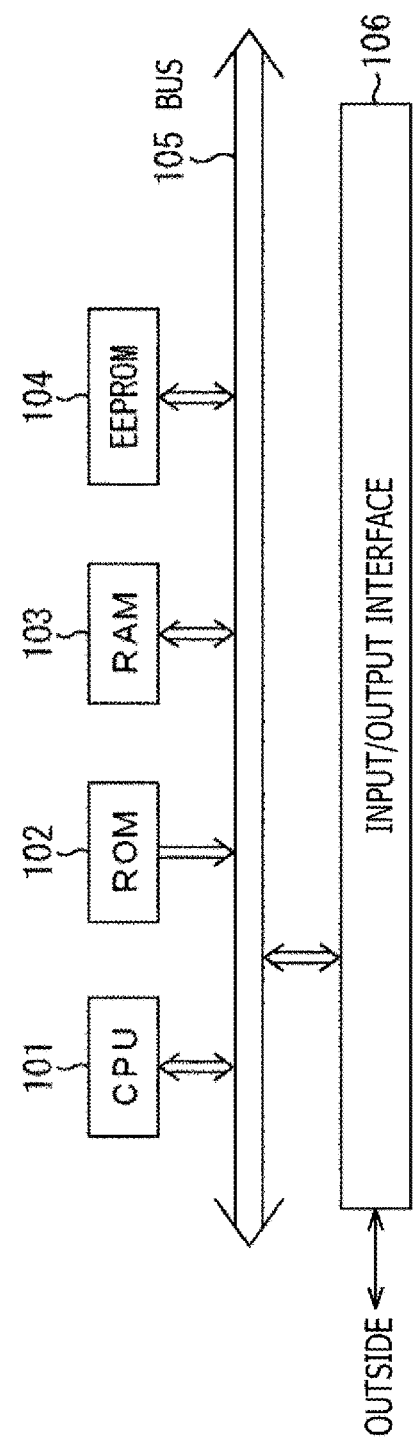
FIG. 32 is a block diagram depicting an example of a configuration of an embodiment of a computer to which the present technique is applied.

FIG. 32 is a block diagram depicting an example of a configuration of hardware of a computer which executes the series of pieces of processing described above in accordance with a program.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to one another through a bus 105. Moreover, an input/output interface 106 is connected to the bus 105, and the input/output interface 106 is connected to the outside.

In the computer configured in such a manner, the CPU 101, for example, loads a program stored in the ROM 102 and the EEPROM 104 into the RAM 103 through the bus 105, and executes the program, thereby executing the series of processing described above. In addition, the program executed by the computer (CPU 101) can be previously written to the ROM 102. In addition thereto, that program can be installed in the EEPROM 104 from the outside through the input/output interface 106 or can be updated.

Examples of Applications to Moving Body

The technique pertaining to the present disclosure (present technique) can be applied to various products. For example, the technique pertaining to the present disclosure may be realized as an apparatus which is mounted to any of kinds of moving bodies such as an auto mobile, an electric vehicle, a hybrid motor vehicle, a two-wheeled motor vehicle, a bicycle, a personal mobility, an air plane, a drone, a marine vessel, and a robot.

Figure 33:
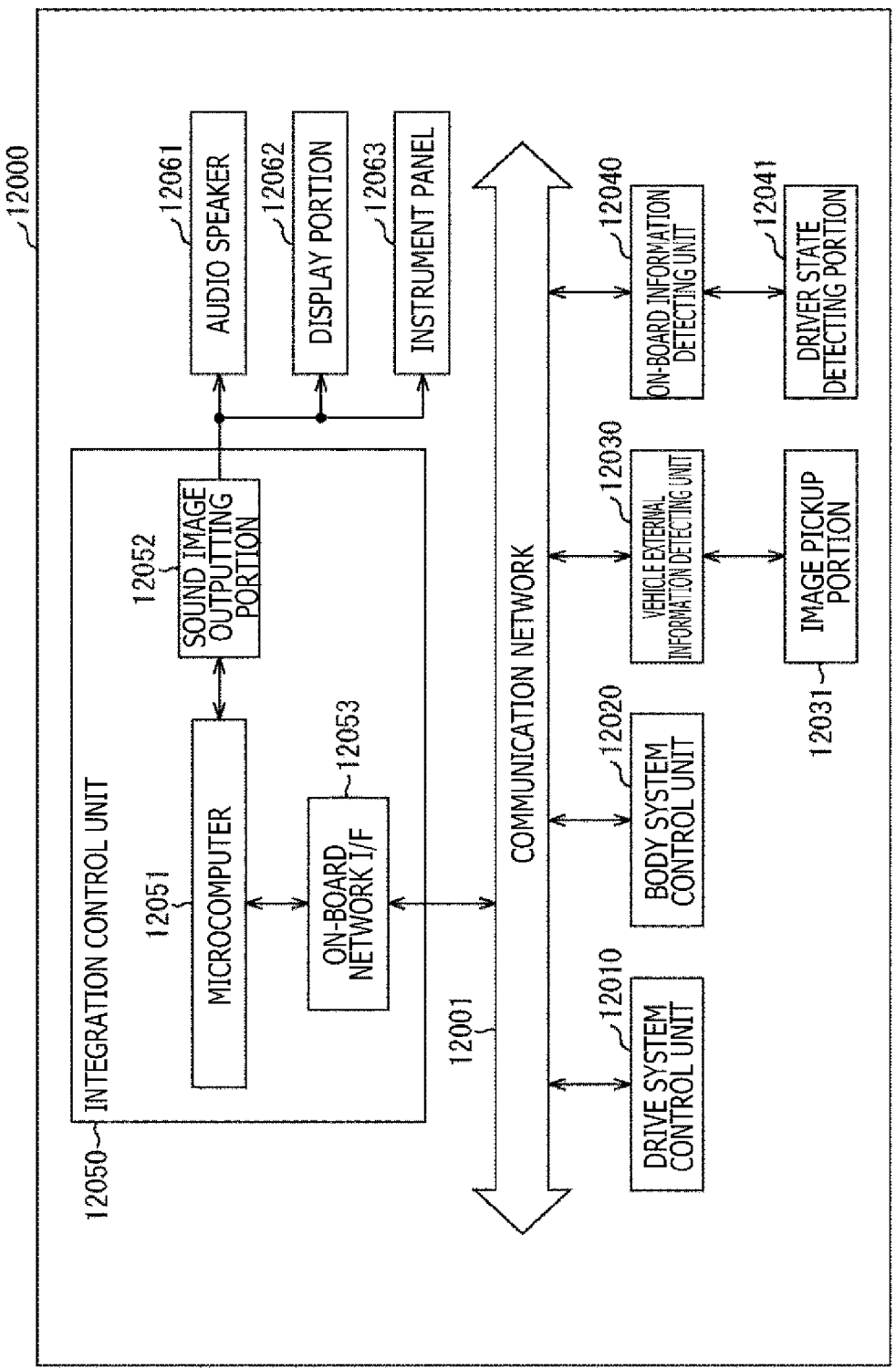
FIG. 33 is a block diagram depicting an example of a schematic configuration of a vehicle control system.

FIG. 33 is a block diagram depicting an example of a schematic configuration of a vehicle control system as an example of a moving body control system to which the technique pertaining to the present disclosure can be applied.

A vehicle control system 12000 is provided with a plurality of electronic control units which are connected to one another through a communication network 12001. In the example depicted in FIG. 33, the vehicle control system 12000 is provided with a drive system control unit 12010, a body system control unit 12020, a vehicle external information detecting unit 12030, an on-board information detecting unit 12040, and an integration control unit 12050. A microcomputer 12051, a sound image outputting portion 12052, and an on-board network I/F (Interface) 12053 are illustrated as a functional configuration of the integration control unit 12050.

The drive system control unit 12010 controls operations of apparatuses associated with the drive system of the vehicle in accordance with various kinds of programs. For example, the drive system control unit 12010 functions as a controller for a driving force generating apparatus for generating a driving force for a vehicle such as an internal combustion engine or a driving motor, a driving force transmitting mechanism for transmitting of a driving force to a wheel, a steering mechanism for adjusting a steering angle of a vehicle, a braking apparatus for generating a braking force for a vehicle, and the like.

The body system control unit 12020 controls operations of various kinds of apparatuses with which the vehicle body is equipped in accordance with various kinds of programs. For example, the body system control unit 12020 functions as a controller for a keyless entry system, a smart key system, and a power window device, or various kinds of lamps such as a head lamp, a back lamp, a brake lamp, a winker or a fog lamp, and the like. In this case, an electric wave transmitted from a portable device or signals from various kinds of switches substituted for a key may be input to the body system control unit 12020. The key system control units 12020 receives the input of the electric wave or the signals, thereby controlling a door lock device, a power window device, lamps and the like of the vehicle.

The vehicle external information detecting unit 12030 detects information associated with the outside of the vehicle having the vehicle control system 12000 mounted thereto. For example, an image pickup portion 12031 is connected to the vehicle external information detecting unit 12030. The vehicle external information detecting unit 12030 causes the image pickup portion 12031 to capture an image of the outside of the vehicle, and receives a signal associated with the image obtained through the capturing. The vehicle external information detecting unit 12030 may execute processing for detecting an object such as a human being, a vehicle, an obstacle, a traffic sign, characters on a road surface, or the like, or distance detecting processing on the basis of the signal associated with the image thus received.

The image pickup portion 12031 is an optical sensor for receiving the light, and outputting an electric signal corresponding to a quantity of light concerned. The image pickup portion 12031 can output the electric signal as an image or can output the electric signal as information associated with the measured distance. In addition, the light received by the image pickup portion 12031 may be the visible light, or may be the nonvisible light such as the infrared light.

The on-board information detecting unit 12040 detects information associated with the inside of the vehicle. For example, a driver state detecting portion 12041 for detecting a state of a driver is connected to the on-board information detecting unit 12040. The driver state detecting portion 12041, for example, includes a camera for imaging a driver. The on-board information detecting unit 12040 may calculate the degree of fatigue or the degree of concentration of a driver, or may discriminate whether or not a driver is dozing on the basis of the detection information input from the driver state detecting portion 12041.

The microcomputer 12051 can calculate a control target value of the driving force generating device, the steering mechanism or the braking apparatus on the basis of the information associated with the inside or outside of the vehicle acquired by either the vehicle external information detecting circuit 12030 or the on-board information detecting unit 12040, and can output a control instruction to the drive system control unit 12010. For example, the microcomputer 12051 can carry out cooperative control for the purpose of realizing a function of an ADAS (Advanced Driver Assistance System) including collision avoidance or impact mitigation of the vehicles, follow-up travelling based on an inter-vehicular distance, vehicle speed maintaining travelling, collision warning for a vehicle, lane departure warning of a vehicle, or the like.

In addition, the microcomputer 12051 can carry out the cooperative control for the purpose of carrying out the automatic driving of the vehicle which autonomously travels without depending on the manipulation by a driver by controlling the driving force generating device, the steering mechanism, the braking device or the like on the basis of the information associated with the circumference of the vehicle acquired by the vehicle external information detecting unit 12030 or the on-board information detecting unit 12040.

In addition, the microcomputer 12051 can output the control instruction to the body system control unit 12030 on the basis of the information associated with the outside of the vehicle acquired by the vehicle external information detecting unit 12030. For example, the microcomputer 12051 can carry out the cooperative control for the purpose of realizing anti-glare such as switching a high beam over to a low beam by controlling the head lamp in response to a position, of a leading vehicle or an oncoming vehicle, detected by the vehicle external information detecting unit 12030.

The sound image outputting portion 12052 transmits an output signal associated with at least one of the sound or the image to the output device which can visually or aurally notify a passenger of a vehicle or an outside of a vehicle of the information. In the example of FIG. 33, an audio speaker 12061, a display portion 12062, and an instrument panel 12063 are exemplified as the output device. The display portion 12062, for example, may include at least one of an on-board display or a headup display.

Figure 34:
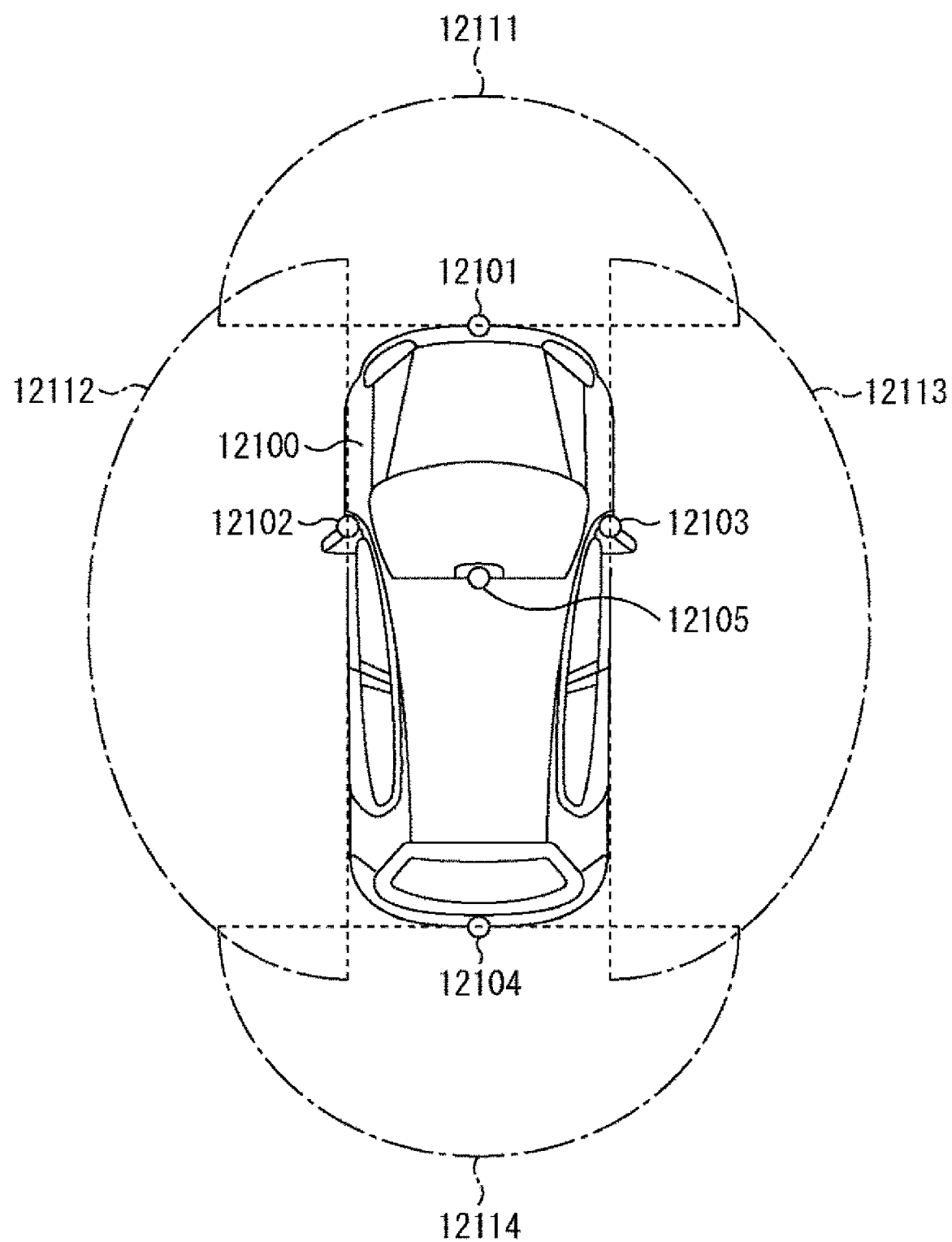
FIG. 34 is an explanatory view depicting an example of installation positions of a vehicle exterior information detecting portion and an image pickup portion.

FIG. 34 is a view depicting an example of installation positions of the image pickup portion 12031.

In FIG. 34, a vehicle has image pickup portions 12101, 12102, 12103, 12104, and 12105 as the image pickup portion 12031.

The image pickup portions 12101, 12102, 12103, 12104, and 12105, for example, are provided in positions of a front nose, side mirrors, a rear bumper, a backdoor of the vehicle 12100, and an upper portion or the like of a front glass within an interior. The image pickup portion 12101 provided in the front nose, and the image pickup portion 12105 provided in the upper portion of the front glass within the interior mainly acquire an image in the front of the vehicle 12100. The image pickup portions 12102 and 12103 provided in the side mirrors mainly acquire images on the sides of the vehicle 12100. The image pickup portion 12104 provided in either the rear bumper or the back door mainly acquires an image in the rear side of the vehicle 12100. The image pickup portion 12105 provided in the upper portion of the front glass within the interior is mainly used to detect a leading vehicle, a pedestrian, an obstacle, a traffic light, a traffic sign, a lane or the like.

It should be noted that FIG. 34 depicts an example of the photographed range by the image pickup portions 12101 to 12104. An image capturing range 12111 exhibits an image capturing range of the image pickup portion 12101 provided in the front nose. Image captured ranges 12112 and 12113 exhibit image capturing ranges of the image pickup portions 12102 and 12103 which are provided in the side mirrors, respectively. An image capturing range 12114 exhibits an image capturing range of the image pickup portion 12104 provided in either the rear bumper or the back door. For example, the pieces of data associated with the images captured by the image pickup portions 12101 to 12104 are superimposed on one another, thereby obtaining a bird's eye view image when the vehicle 12100 is viewed from the upper side.

At least one of the image pickup portions 12101 to 12104 may have a function of acquiring distance information. For example, at least one of the image pickup portions 12101 to 12104 may a stereoscopic camera including a plurality of image pickup elements, or may be an image pickup element having a pixel for detection of a phase difference.

For example, the microcomputer 12051 obtains a distance to a three-dimensional object within the image capturing ranges 12111 to 12114, and a temporal change in this distance (a relative speed with respect to the vehicle 12100) on the basis of the distance information obtained from the image pickup portions 12101 to 12104. As a result, especially, the microcomputer 12051 can extract the nearest three-dimensional object, as the leading vehicle, on a travelling path of the vehicle 12100, which travels at a predetermined speed (for example, 0 km/h or more) approximately in the same direction as that of the vehicle 12100. Moreover, the microcomputer 12051 can set an inter-vehicular distance which should be previously ensured on the rear side of the leasing vehicle, and can carry out the automatic brake control (including follow-up stop control as well), automatic acceleration control (including follow-up start control as well), or the like. In such a manner, the microcomputer 12051 can carry out the cooperative control for the purpose of realizing the automatic driving or the like by which the vehicle autonomously travels without depending on the manipulation by the driver.

For example, the microcomputer 12051 can classify the three-dimensional object data associated with the three-dimensional object into pieces of data associated with the three-dimensional objects of a two-wheeled vehicle, a normal vehicle, a large vehicle, a pedestrian, a telegraph pole, and others to extract the desired one on the basis of the distance information obtained from the image pickup portions 12101 to 12104, thereby being used for automatic avoidance of the obstacle. For example, the microcomputer 12051 discriminates the obstacles in the circumference of the vehicle 12100 into the obstacle which the driver of the vehicle 12100 can visually recognize, and the obstacle which the driver of the vehicle 12100 is difficult to visually recognize. Then, the microcomputer 12051 determines the collision risk exhibiting the degree of risk of the collision with the obstacle. Then, when the collision risk is equal to or larger than a set value to provide a situation in which there is the possibility of the collision, the microcomputer 12051 outputs an alarm to the driver through the audio speaker 12061 or the display portion 12062, or carries out the forced deceleration or the avoidance steering through the drive system control unit 12010, thereby enabling the drive support for the collision avoidance to be carried out.

At least one of the image pickup portions 12101 to 12104 may be an infrared light camera for detecting the infrared light. For example, the microcomputer 12051 determines whether or not the pedestrian is present in the captured images from the image pickup portions 12101 to 12104, thereby enabling the pedestrian to be recognized. Such recognition of the pedestrian is carried out in accordance with a procedure for extracting feature points in the captured images from the image pickup portions 12101 to 12104 as the infrared light camera, and a procedure for determining whether or not the object is the pedestrian by executing pattern matching processing for a series of feature points exhibiting the contour of the object. When the microcomputer 12051 determines that the pedestrian is present in the captured images from the image pickup portions 12101 to 12104 to recognize the pedestrian, the sound image outputting portion 12052 controls the display portion 12062 in such a way that a rectangular contour line for the emphasis is displayed so as to be superimposed on the image of the pedestrian thus recognized. In addition, the sound image outputting portion 12052 may control the display portion 12062 in such a way that an icon or the like exhibiting the pedestrian is displayed in a desired position.

A description has been given so far with respect to the example of the vehicle control system to which the technique pertaining to the present disclosure can be applied. The technique pertaining to the present disclosure may be applied to the image pickup portion 12031 or the like of the constituent elements which have been described so far. As a result, the acquisition distance by which the more highly accurate depth image can be acquired can be made to be longer and, for example, the safer automatic driving or the like can be realized. Moreover, the technique pertaining to the present disclosure can also be applied to the driver state detecting portion 12041 of the constituent elements which have been described so far. As a result, the more highly accurate depth image in which the influence of the ambient light such as the sunlight is reduced can be acquired. Therefore, for example, the gesture, the wakefulness, the attribute information or the like of the driver can be more accurately detected.

Figure 35:
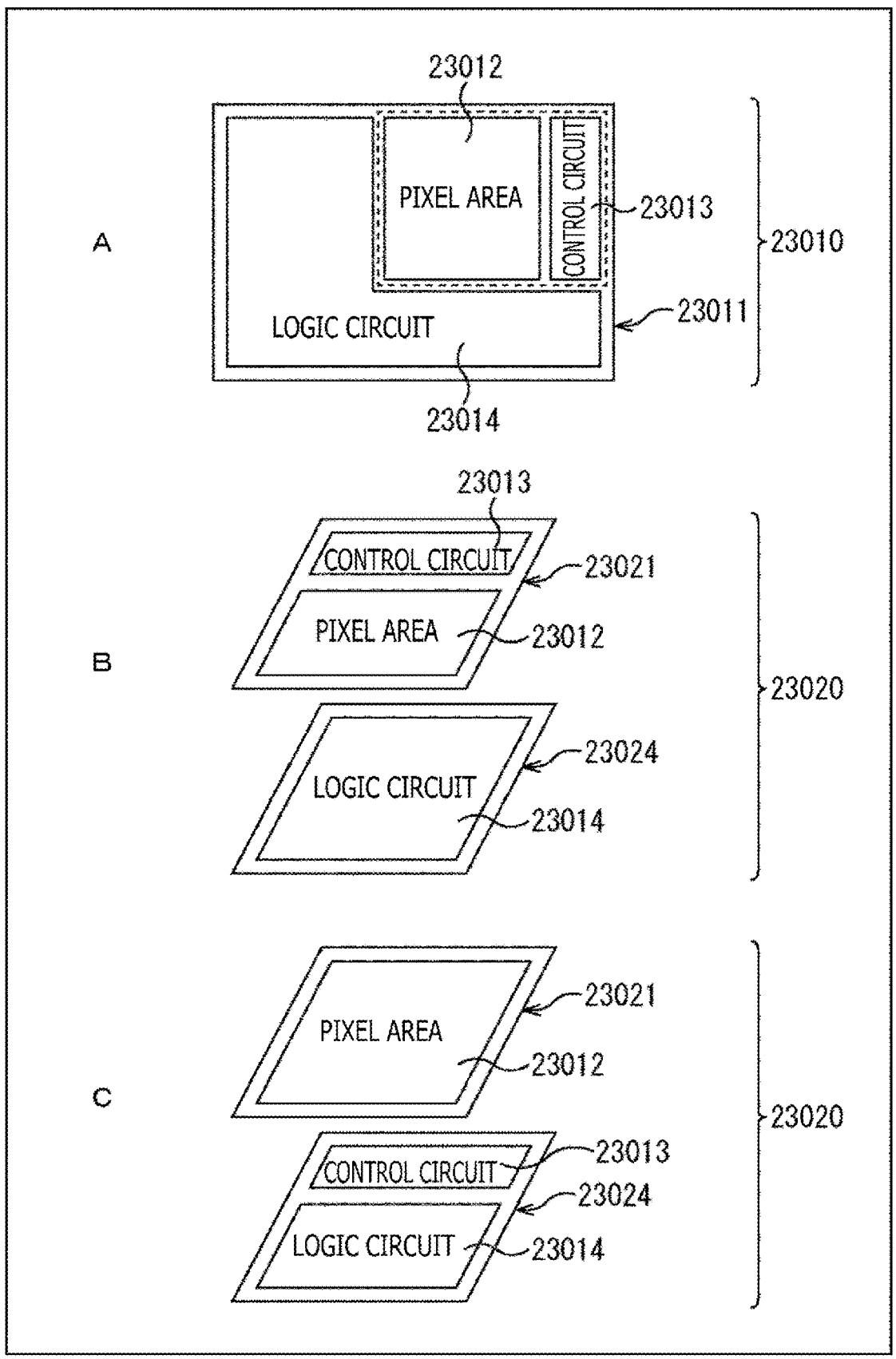
FIG. 35 is a view depicting an outline of an example of a configuration of a lamination type solid-state image pickup device to which a technique pertaining to the present disclosure can be applied.

Configuration Example of Lamination Type Solid-State Image Pickup Device to Which Technique Pertaining to Present Disclosure can be Applied FIG. 35 is a view depicting an outline of an example of a configuration of a lamination type solid-state image pickup device to which the technique pertaining to the present disclosure can be applied.

A of FIG. 35 depicts an example of a schematic configuration of a non-laminated type solid-state image pickup device. As depicted in A of FIG. 35, the solid-state image pickup device 23010 has one sheet of die (semiconductor substrate) 23011. The die 23011 is equipped with a pixel area 23012, a control circuit 23013, and a logic circuit 23014. In this case, the pixels are arranged in array in the pixel area 23012. The control circuit 23013 carries out the various pieces of control for drive of the pixels, and others. In addition, the logic circuit 23014 includes a signal processing circuit for executing the signal processing.

B and C of FIG. 35 depict an example of a schematic configuration of a laminated solid-state image pickup device. In the solid-state image pickup device 23020, as depicted in B and C of FIG. 35, two sheets of dies: a sensor die 23021; and a logic die 23024 are laminated on each other, and electrically connected to each other be configured in the form of one semiconductor chip.

In B of FIG. 35, the sensor die 23021 is equipped with the pixel area 23012 and the control circuit 23013, and the logic die 23024 is equipped with the logic circuit 23014 including a signal processing circuit for executing the signal processing.

In C of FIG. 35, the sensor die 23021 is equipped with the pixel area 23012, and the logic die 23024 is equipped with the control circuit 23013 and the logic circuit 23014.

Figure 36:
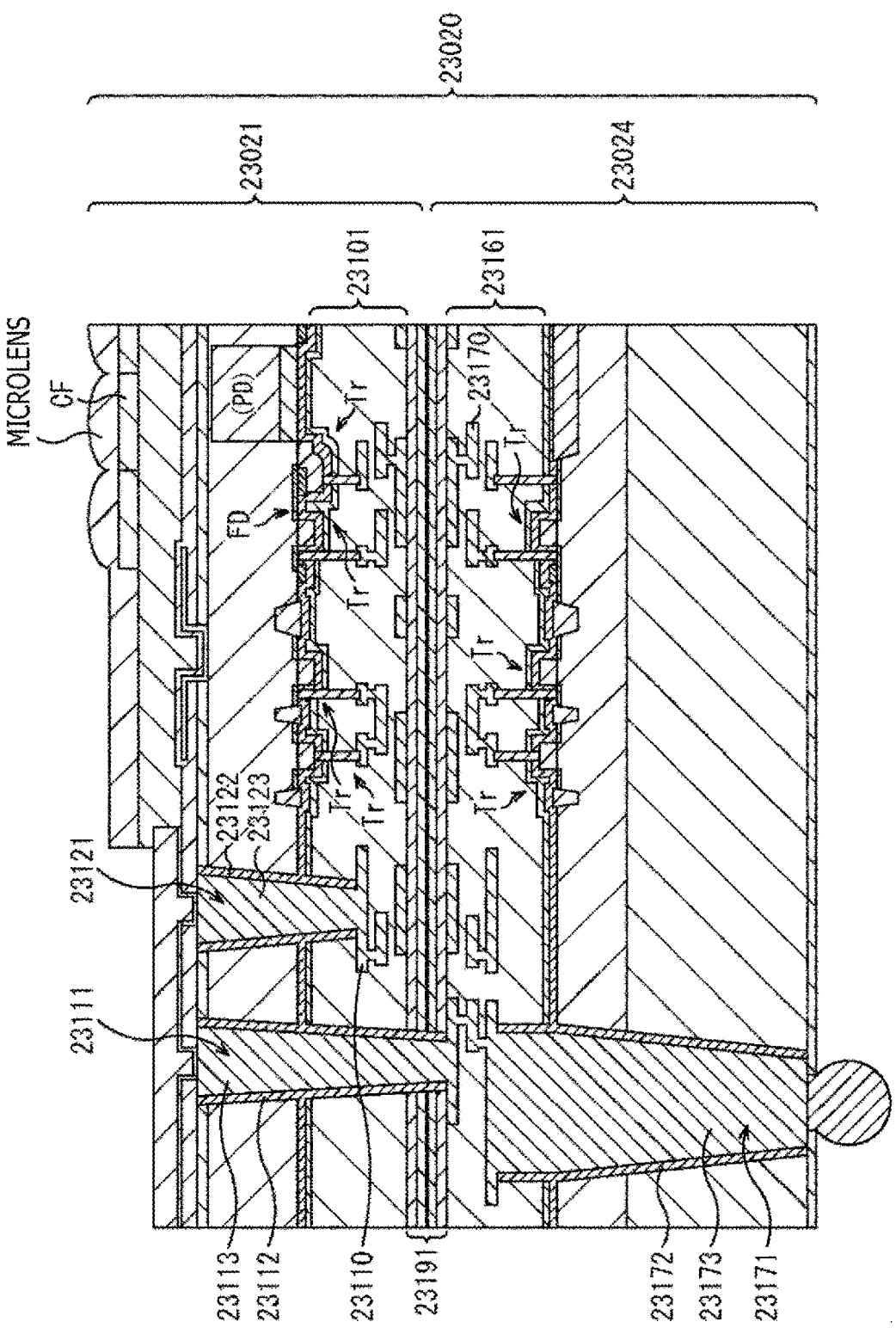
FIG. 36 is a cross-sectional view depicting a first structural example of a lamination type solid-state image pickup device.

FIG. 36 is a cross-sectional view depicting a first example of a configuration of the laminated solid-state image pickup device 23020.

A PD (photodiode), an FD (floating diffusion), and a Tr (MOS FET) constituting the pixel becoming the pixel area 23012, Tr becoming the control circuit 23013, and the like are formed on the sensor die 23021. Moreover, a wiring layer 23101 having wirings 23110 of a plurality of layers, three layers in this example, is formed on the sensor die 23021. It should be noted that (Tr becoming) the control circuit 23013 can also be configured in the logic die 23024 instead of being configured in the sensor die 23021.

Tr constituting the logic circuit 23014 is formed in the logic die 23024. Moreover, a wiring layer 23161 having a wiring 23170 of a plurality of layers, three layers in this example, is formed in the logic die 23024. In addition, a connection hole 23171 in which an insulating film 23172 is formed on an inner wall surface thereof is formed in the logic die 23024. A connection conductor 23173 connected to the wiring 23170, and the like is filled in the connection hole 23171.

The sensor die 23021 and the logic die 23024 are stuck to each other in such a way that their wiring layers 23101 and 23161 face each other. As a result, the solid-state image pickup device 23020 is structured in which the sensor die 23021 and the logic die 23024 are laminated on each other. A film 23191 such as a protective film is formed on a surface through which the sensor die 23021 and the logic die 23024 are stuck to each other.

A connection hole 23111 which completely extends through the sensor die 23021 from a back surface side (a side of incidence of light to the PD) (an upper side) of the sensor die 23021 to reach the wiring 23170 of the uppermost layer of the logic die 23024 is formed in the sensor die 23021. Moreover, a connection hole 23111 which is closely adjacent to the connection hole 23111 to reach the first level wiring 23110 from the back surface side of the sensor die 23021 is formed in the sensor die 23021. An insulating film 23112 is formed on an inner wall surface of the connection hole 23111, and an insulating film 23122 is formed on an inner wall surface of the connection hole 23121. In addition, connection conductors 23113 and 23123 are filled in the connection holes 23111 and 23121, respectively. The connection conductor 23113 and the connection conductor 23123 are electrically connected to each other on the back side surface of the sensor die 23121. As a result, the sensor die 23021 and the logic die 23024 are electrically connected to each other through the wiring layer 23101, the connection hole 23121, the connection hole 23111, and the wiring layer 23161.

Figure 37:
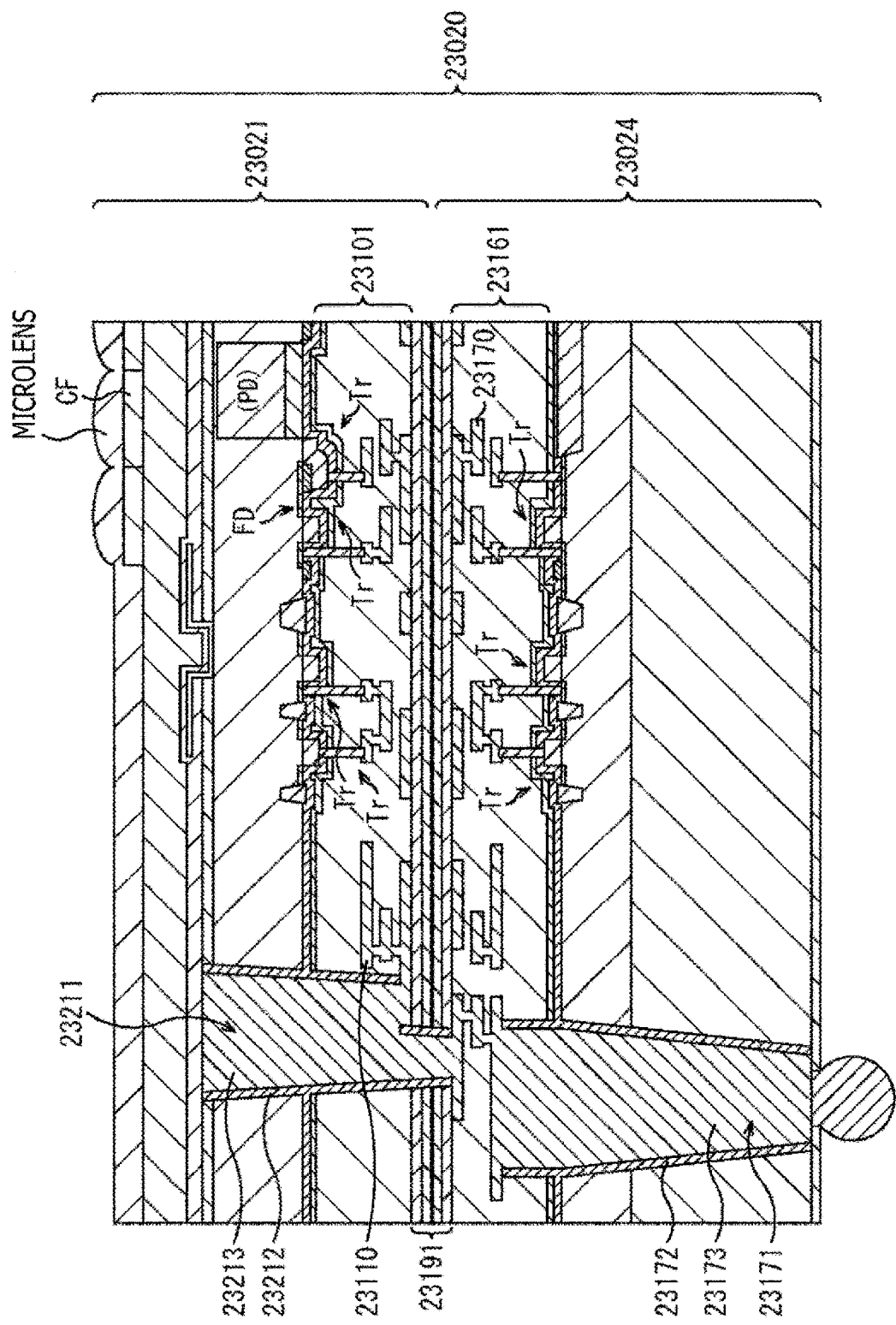
FIG. 37 is a cross-sectional view depicting a second structural example of the lamination type solid-state image pickup device.

FIG. 37 is a cross-sectional view depicting a second example of a configuration of the laminated solid-state image pickup device 23020.

In the second example of a configuration of the solid-state image pickup device 23020, ((a wiring 23110 of) a wiring layer 23101 of) the sensor die 23021, and ((a wiring 23170 of) a wiring layer 23161 of) the logic die 23024 are electrically connected to each other through one connection hole 23211 formed in the sensor die 23021.

That is to say, in FIG. 37, the connection hole 23211 is formed so as to completely extend through the sensor die 23021 from the back side surface side of the sensor die 23021 to reach the wiring 23170 of the uppermost layer of the logic die 23024, and reach the wiring 23110 of the uppermost layer of the sensor die 23021. An insulating film 23212 is formed on an inner wall surface of the connection hole 23211, and a connection conductor 23213 is filled in the connection hole 23211. In FIG. 36 described above, the sensor die 23021 and the logic die 23024 are electrically connected to each other through the two connection holes 23111 and 23121. In FIG. 37, however, the sensor die 23021 and the logic die 23024 are electrically connected to each other through the one connection hole 23211.

Figure 38:
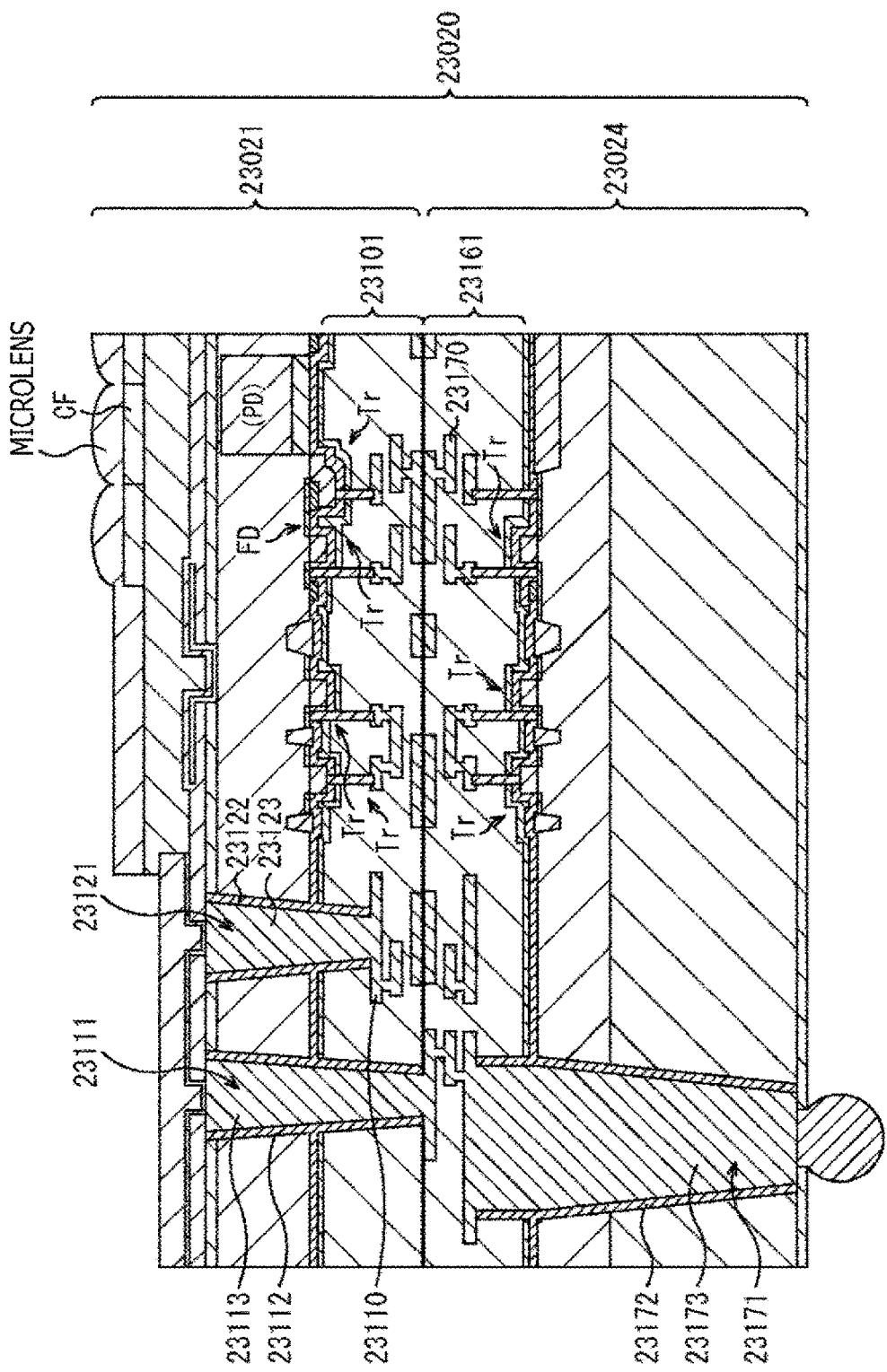
FIG. 38 is a cross-sectional view depicting a third structural example of the lamination type solid-state image pickup device.

FIG. 38 is a cross-sectional view depicting a third example of a configuration of the lamination type solid-state image pickup device 23020.

The solid-state image pickup device 23020 of FIG. 38 is different from the solid-state image pickup device 23020 of FIG. 36 in that the film 23191 such as the protective film is not formed on the surface through which the sensor die 23021 and the logic die 23024 are stuck to each other. In case of the solid-state image pickup device 23020 of FIG. 36, the film 23191 such as the protective film is formed on the surface through which the sensor die 23021 and the logic die 23024 are stuck to each other.

The solid-state image pickup device 23020 of FIG. 38 is configured in such a way that the sensor die 23021 and the logic die 23024 are stacked on each other so that the wirings 23110 and 23170 directly contact each other, and the wirings 23110 and 23170 are directly joined to each other by heating the sensor die 23021 and the logic die 23024 while a necessary load is applied thereto.

Figure 39:
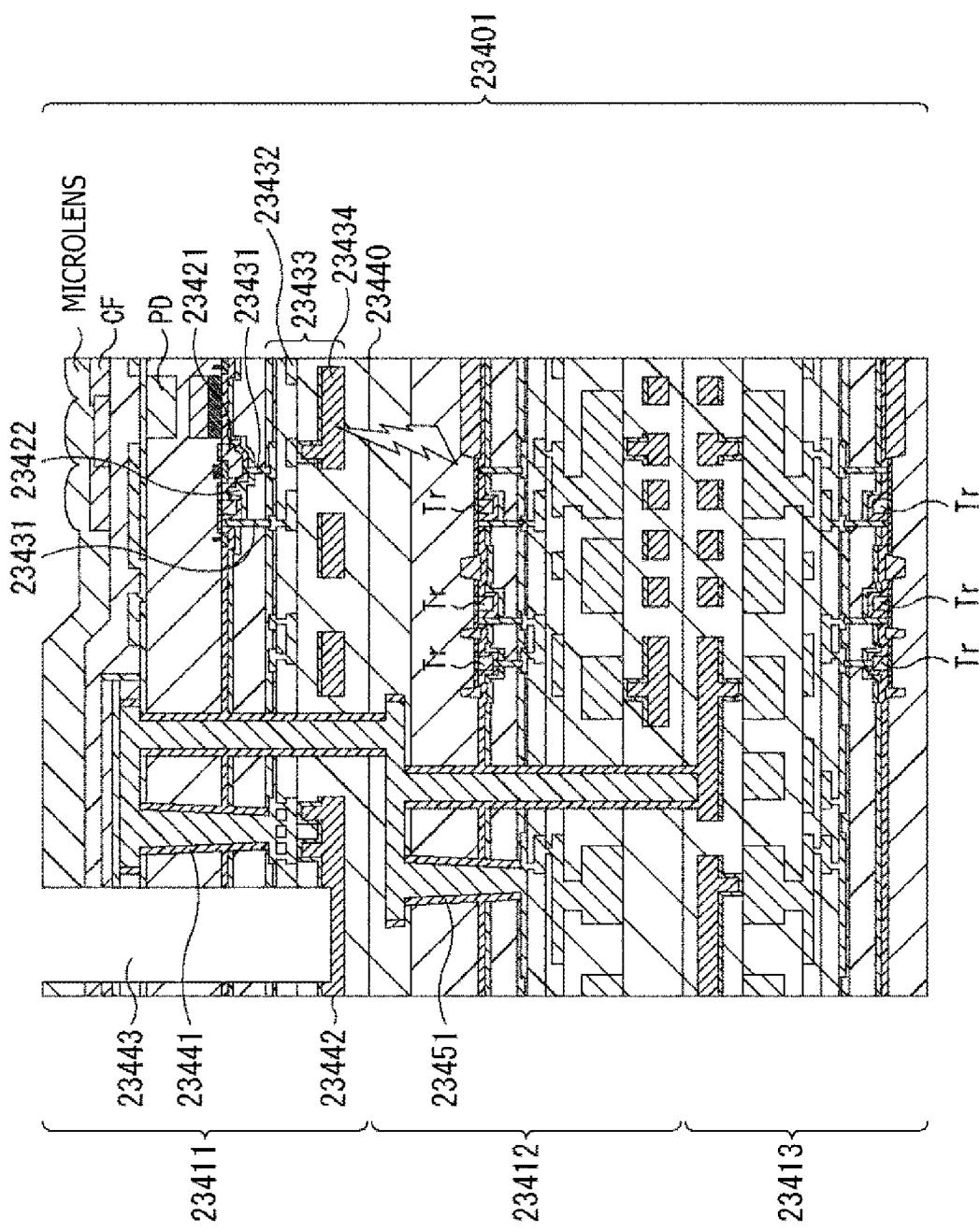
FIG. 39 is a cross-sectional view depicting another example of the lamination type solid-state image pickup device to which a technique pertaining to the present disclosure can be applied.

FIG. 39 is a cross-sectional view depicting another example of a configuration of the lamination type solid-state image pickup device to which the technique pertaining to the present disclosure can be applied.

In FIG. 39, the solid-state image pickup device 23401 has a three-layer lamination structure in which three sheets of dies: a sensor die 23411; a logic die 23412; and a memory die 23413 are laminated on one another.

The memory die 23413, for example, has a memory circuit for storing therein data which is temporarily necessary in the signal processing executed in the logic die 23412.

In FIG. 39, the logic die 23412 and the memory die 23413 are laminated in this order under the sensor die 23411. However, the logic die 23412 and the memory die 23413 can be laminated in reverse order, that is, the memory die 23413 and the logic die 23412 can be laminated in this order under the sensor die 23411.

It should be noted that in FIG. 39, a PD becoming a photoelectric conversion portion of a pixel, source/drain regions of a pixel transistor Tr are formed in the sensor die 23411.

A gate electrode is formed in the circumference of the PD through a gate insulating film, and a pixel Tr 23421 and a pixel Tr 23422 are formed by source/drain regions paired with the gate electrode.

The pixel Tr 23421 adjacent to the PD is a transfer Tr, and one of the paired source/drain regions configuring the pixel Tr 23421 is an FD.

In addition, an interlayer insulating film is formed in the sensor die 23411, and a connection hole is formed in the interlayer insulating film. A connection conductor 23431 connected to the pixel Tr 23421 and the pixel Tr 23422 is formed in the connection hole.

Moreover, a wiring layer 23433 having a plurality of layers of wirings 23432 connected to the connection conductors 23431 is formed in the sensor die 23411.

An aluminum pad 23434 becoming an electrode for external connection is formed in a lowermost layer of the wiring layer 23433 of the sensor die 23411. That is to say, in the sensor die 23411, the aluminum pad 23434 is formed in a position closer to an adhesive surface 23440 to the logic die 23412 than the wiring 23432. The aluminum pad 23434 is used as an end of a wiring pertaining to input/output of a signal to/from the outside.

Moreover, a contact 23441 used for the electrical connection to the logic die 23412 is formed in the sensor die 23411. The contact 23441 is connected not only to a contact 23451 of the logic die 23412, but also to an aluminum pad 23442 of the sensor die 23411.

Then, a pad hole 23443 is formed in the sensor die 23411 so as to reach the aluminum pad 23442 from the back side (upper side) of the sensor die 23411.

The technique according to the present disclosure can be applied to the solid-state image pickup device described above.

Examples of Combination of Constitutions

It should be noted that the present technique can also adopt the following constitutions.

(1)

A depth image acquiring apparatus comprising:

a light emitting unit configured to irradiate modulated light toward a detection area;

a sensor configured to receive the modulated light upon being reflected by an object positioned in the detection area and output a signal based on the received modulated light so as to generate depth information;

a filter unit configured to pass more light having a wavelength in a predetermined pass bandwidth than light having a wavelength in a pass bandwidth other than the predetermined pass bandwidth;

an environment sensor configured to acquire environment information at the light emitting unit or the sensor; and a controller configured to control at least one among the light emitting unit, the sensor, or the filter unit in accordance with the environment information acquired by the environment sensor.

(2)

The depth image acquiring apparatus according to (1) described above, in which the environment sensor comprises a temperature sensor for acquiring a temperature of the light emitting unit.

(3)

The depth image acquiring apparatus according to (1) described above, in which the controller is configured to control, in accordance with the environment information, a wavelength of the modulated light or a pass bandwidth of the filter unit.

(4)

The depth image acquiring apparatus according to (2) described above, in which the light emitting unit comprises a plurality of light sources for emitting light exhibiting temperature characteristics such that wavelength shifts arise in response to a temperature change, and having respective peaks at different wavelengths, and the controller is configured to select at least one of the plurality of light sources in accordance with the temperature.

(5)

The depth image acquiring apparatus according to (2) described above, in which the filter unit comprises a plurality of filters having respective pass bandwidths different from one another, the light emitting unit exhibits a temperature characteristic such that a wavelength shift arises in response to a temperature change, and the controller is configured to select at least one of the plurality of filters in accordance with the temperature.

(6)

The depth image acquiring apparatus according to (2) described above, in which the filter unit comprises a plurality of filters having respective pass bandwidths different from one another, the plurality of filters are laminated on a light receiving surface of the sensor, the light emitting unit has a temperature characteristic such that a wavelength shift arises in response to a temperature change, and the controller is configured to output the signal by selecting at least one of a plurality of pixel areas of the sensor that corresponds to a filter of the plurality of filters in accordance with the temperature.

(7)
The depth image acquiring apparatus according to (6) described above, in which
the plurality of filters has a predetermined number of first filters having a first pass bandwidth, and a predetermined number of second filters having a second pass bandwidth,
each of the first and second filters has a rectangular shape, and
the first and second filters are alternately arranged in a transverse direction of the light receiving surface of the sensor.

(8)
The depth image acquiring apparatus according to (6) described above, in which
the plurality of filters has a predetermined number of first filters having a first pass bandwidth, and a predetermined number of second filters having a second pass bandwidth, and
the first and second filters are alternately arranged in a longitudinal direction and in a transverse direction of the light receiving surface of the sensor.

(9)
The depth image acquiring apparatus according to (8) described above, in which
a first depth image is generated from first pixels in which the first filters are arranged,
a second depth image is generated from second pixels in which the second filters are arranged,
a full depth image is generated (i) by interpolating the first depth image when the first filters are selected by the controller, or (ii) by interpolating the second depth image when the second filters are selected by the controller.

(10)
The depth image acquiring apparatus according to any one of (6) to (9) described above, in which
the sensor is configured to stop driving a pixel in an area corresponding to filters of the plurality of filters that are not selected by the controller.

(11)
The depth image acquiring apparatus according to any one of (2) to (10) described above, in which
the sensor is thermally coupled to the light emitting unit, and
a sensor controller is configured to reduce a number of pixels of the sensor that carry out a dummy operation in response to a rise of the temperature of the light emitting unit, and to increases the number of pixels that carry out the dummy operation in response to a decrease of the temperature of the light emitting unit.

(12)
The depth image acquiring apparatus according to any one of (1) to (11) described above, in which
when a predetermined object positioned in the detection area is detected on a basis of the depth information from the sensor, a notification that the predetermined object is detected is output.

(13)
The depth image acquiring apparatus according to any one of (1) to (12) described above, in which
the filter unit has a plurality of filters having respective pass bandwidths different from one another, and the plurality of filters is arranged on a light receiving surface side of the sensor, and the plurality of filters is detachable from the sensor.

(14)
The depth image acquiring apparatus according to any one of (4) to (13) described above, in which
the controller is configured to cause the light source which is selected from the plurality of light sources to irradiate the light, and to stop irradiation from one or more light sources that are not selected from the plurality of light sources.

(15)
The depth image acquiring apparatus according to any one of (4) to (14) described above, in which
a wavelength shift of a predetermined variation width is generated in the light emitting unit in response to a temperature change of 100 degrees, and
½ of a width of the predetermined pass bandwidth in the filter unit is narrower than the predetermined variation width.

(16)
The depth image acquiring apparatus according to (15) described above, in which
a wavelength shift of at least 10 nm is generated in the light emitting unit in response to the temperature change of 100 degrees, and
½ of the width of the predetermined pass bandwidths in the filter unit is less than 10 nm.

(17)
The depth image acquiring apparatus according to any one of (1) to (16) described above, in which
a central wavelength of the predetermined pass bandwidth is between 920 and 960 nm.

(18)
The depth image acquiring apparatus according to any one of (1) to (17) described above, in which
the filter unit is configured to transmit 60% or more of the light in the predetermined pass bandwidth, and is configured to transmit less than 30% of the light in a pass bandwidth other than the predetermined pass bandwidth.

(19)
A method of controlling a depth image acquiring apparatus including
a light emitting unit configured to irradiate modulated light toward a detection area in which a depth image is to be acquired to detect a distance,
a sensor configured to receive light reflected by an object positioned in the detection area in response to receiving the modulated light, and to produce the depth image by outputting a signal representative of the reflected light, and
a filter unit configured to pass more light having a wavelength in a predetermined pass bandwidth than light having a wavelength in a pass bandwidth other than the predetermined pass bandwidth of the reflected light,
the method of controlling the depth image acquiring apparatus, comprising:
acquiring environment information at the light emitting unit or the sensor; and
controlling at least one of the light emitting unit, the sensor, or the filter unit in accordance with the environment information.

(20)
A depth image acquiring system comprising:
a controller configured to control at least one among a light emitting unit, a sensor, or a filter unit in accordance with environment information at the light emitting unit or to the sensor, wherein the environment information is acquired using an environment sensor, wherein the light emitting unit is configured to irradiate modulated light toward a detection area in which a depth image is to be acquired to detect a distance, wherein the sensor is configured to receive light having passed through the filter unit and reflected by an object positioned in the detection area in response to receiving the modulated light, and wherein the filter unit is configured for passing more light having a wavelength in a predetermined pass bandwidth than light having a wavelength in a pass bandwidth other than the predetermined pass bandwidth.

(21)

A depth image acquiring apparatus including:

a light source configured to irradiate modulated light toward a detection area becoming an area in which a depth image is to be acquired to detect a distance;

a sensor configured to receive incident light into which the light irradiated from the light source is reflected by an object lying in the detection area to become, thereby outputting a signal used to produce the depth image;

a filter configured to pass more light having a wavelength in a predetermined pass bandwidth than light having a wavelength in a pass bandwidth other than the predetermined pass bandwidth of the light made incident toward the sensor;

an environment sensor configured to acquire environment information associated with the light source or the sensor; and a conjunction control portion configured to control at least any one of the light source, the sensor, or arrangement of the filter in accordance with the environment information acquired by the environment sensor.

(22)

The depth image acquiring apparatus according to (21) described above, in which the environment sensor is a temperature sensor for acquiring a temperature of the light source.

(23)

The depth image acquiring apparatus according to (21) described above, in which the conjunction control portion controls at least one of a wavelength of the light irradiated from the light source or a pass bandwidth of the filter in conjunction with the other in accordance with the environment information.

(24)

The depth image acquiring apparatus according to (22) described above, in which the light source is a plurality of light sources for emitting light having temperature characteristics in which wavelength shift is generated in response to a temperature change, and having peaks of respective wavelengths different from one another, and the conjunction control portion selects at least any one of the plurality of light sources in accordance with the temperature.

(25)

The depth image acquiring apparatus according to (22) described above, in which the filter is a plurality of filters having respective pass bandwidths different from one another, the light source has temperature characteristics in which wavelength shift is generated in response to a temperature change, and the conjunction control portion selects at least any one of the plurality of filters in accordance with the temperature.

(26)

The depth image acquiring apparatus according to (22) described above, in which the filter is a plurality of filters having respective pass bandwidths different from one another, the plurality of filters is arranged so as to be laminated on a light receiving surface of the sensor, the light source has temperature characteristics in which wavelength shift is generated in response to a temperature change, and the conjunction control portion carries out control for the sensor so as to select at least any one of a plurality of areas in which the plurality of filters is arranged in accordance with the temperature, thereby outputting the signal.

(27)

The depth image acquiring apparatus according to (26) described above, in which the plurality of filters has a predetermined number of first filters having a first pass bandwidth, and a predetermined number of second filters having a second pass bandwidth, and each of the first and second filters has a rectangular shape having a length corresponding to a vertical width of a light receiving surface of the sensor, and such a width as to equally divide a width of the light receiving surface of the sensor by a number which is double the predetermined number, and the first and second filters are alternately arranged in a transverse direction of the light receiving surface of the sensor.

(28)

The depth image acquiring apparatus according to (27) described above, in which the plurality of filters has the predetermined number of first filters having the first pass bandwidth, and the predetermined number of second filters having the second pass bandwidth, and the first and second filters are alternately arranged in a longitudinal direction and in a transverse direction on the light receiving surface of the sensor every division area in which a plurality of pixels of the sensor is arranged in a rectangular style.

(29)

The depth image acquiring apparatus according to (28) described above, in which of the depth image corresponding to the division area in which the first filters are arranged, and the depth image corresponding to the division area in which the second filters are arranged, an other of the depth images which cannot be normally acquired is restored from one of the depth images which can be normally acquired.

(30)

The depth image acquiring apparatus according to any one of (26) to (29) described above, in which the sensor stops drive of an element used to read out the signal from the pixel in an area in which the filters which are not selected by the conjunction control portion is arranged.

(31)

The depth image acquiring apparatus according to any one of (22) to (30) described above, in which the sensor is arranged close to the light source, and of a plurality of pixels which the sensor has, the number of pixels each of which is caused to carry out a dummy operation is reduced in response to rising of a temperature of the light source, while the number of pixels each of which is caused to carry out the dummy operation is increased in response to lowering of the temperature of the light source.

(32)

The depth image acquiring apparatus according to any one of (21) to (31) described above, in which when a predetermined object lying in the detection area is detected on the basis of the depth image produced from a signal output from the sensor, a signal exhibiting that the predetermined object is detected is supplied to notice means for notifying an outside of that the predetermined object is detected.

(33)

The depth image acquiring apparatus according to any one of (21) to (32) described above, in which the filter has a plurality of filters having respective pass bandwidths different from one another, and the plurality of filters is arranged on a light receiving surface side of the sensor in the form of an external module.

(34)

The depth image acquiring apparatus according to any one of (24) to (33) described above, in which the conjunction control portion causes the light source which is selected from the plurality of light sources to irradiate the light, and stops irradiation from the light source which is not selected from the plurality of light sources.

(35)

The depth image acquiring apparatus according to any one of (24) to (34) described above, in which wavelength shift of a predetermined variation width is generated in the light source in response to a temperature change of 100 degrees, and ½ of the width of the predetermined pass bandwidth in the filter is narrower than the predetermined variation width.

(36)

The depth image acquiring apparatus according to (35) described above, in which the wavelength shift of at least 10 nm is generated in the light source in response to the temperature change of 100 degrees, and ½ of the width of the predetermined pass bandwidths in the filter is less than 10 nm.

(37)

The depth image acquiring apparatus according to any one of (21) to (36) described above, in which a central wavelength of the predetermined pass bandwidth is in the range of 920 to 960 nm.

(38)

The depth image acquiring apparatus according to any one of (21) to (37) described above, in which the filter transmits 60% or more of the light in the predetermined pass bandwidth, and transmits less than 30% of the light in a pass bandwidth other than the predetermined pass bandwidth.

(39)

A method of controlling a depth image acquiring apparatus including a light source configured to irradiate modulated light toward a detection area becoming an area in which a depth image is to be acquired to detect a distance, a sensor configured to receive incident light into which the light irradiated from the light source is reflected by an object lying in the detection area to become, thereby outputting a signal used to produce the depth image, and a filter configured to pass more light having a wavelength in a predetermined pass bandwidth than light having a wavelength in a pass bandwidth other than the predetermined pass bandwidth of the light made incident toward the sensor, the method of controlling the depth image acquiring apparatus, including:

acquiring environment information associated with the light source or the sensor; and controlling at least any one of the light source, the sensor, or arrangement of the filter in accordance with the environment information.

(40)

A depth image acquiring system including:

a conjunction control portion configured to control at least any one of a light source, a sensor, or arrangement of the filter in accordance with environment information acquired by an environment sensor acquiring the environment information associated with either the light source configured to irradiate modulated light toward a detection area becoming an area in which a depth image is to be acquired to detect a distance or the sensor configured to receive light made incident through the filter for passing more light having a wavelength in a predetermined pass bandwidth than light having a wavelength in a pass bandwidth other than the predetermined pass bandwidth of the light into which the light irradiated from the light source is reflected by an object lying in the detection area to become.

It should be noted that the embodiments are by no means limited to the embodiments described above, and various changes can be made without departing from the subject matter of the present disclosure. For example, there is adopted a configuration in which the system including the light emitting diode 22, the TOF sensor 26 and the like which are provided in the outside, the conjunction control portion 31, the depth image producing portion 30, and the like carries out the control for the light emitting diode 22, and executes the processing for the pixel signal of the TOF sensor 26. In addition, the effects described in this description are merely the exemplification and are not limited, and thus other effects may also be available.

REFERENCE SIGNS LIST

11 Depth image acquiring apparatus
12 Sound outputting device
13 Vibration device
14 Recording device
21 Light modulating portion
22 Light emitting diode
23 Light projecting lens
24 Light receiving lens
25 Filter
26 TOF sensor
27 Image storing portion
28 Synchronous processing portion
29 Distance information calculating portion
30 Depth image producing portion
31 Conjunction control portion
41 Environment sensor
51 to 54 TOF systems
61 Pixel
62 Logic substrate
63 Sensor substrate
64 Semiconductor layer
65 On-chip lens layer
66 Photodiode
67 Microlens
71 Pixel area
72 Vertical drive circuit
73 Column signal processing circuit 74 Horizontal drive circuit
75 Output circuit
76 Control circuit
77 Horizontal signal line
78 Vertical signal line
79 Data output signal line
81 Sensor substrate
82 Bonding wire
83 Storage case
84 and 85 Lens holders

The invention claimed is:

1. A depth image acquiring apparatus comprising:
a light emitting unit configured to irradiate modulated light toward a detection area;
a sensor configured to receive the modulated light upon being reflected by an object positioned in the detection area and output a signal based on the received modulated light so as to generate depth information;
a filter unit configured to pass more light having a wavelength in a predetermined pass bandwidth than light having a wavelength in a pass bandwidth other than the predetermined pass bandwidth;
an environment sensor configured to acquire environment information at the light emitting unit or the sensor; and
a controller configured to control at least one among the light emitting unit, the sensor, or the filter unit in accordance with the environment information acquired by the environment sensor, wherein the environment sensor comprises a temperature sensor for acquiring a temperature of the light emitting unit, wherein the light emitting unit comprises a plurality of light sources for emitting light exhibiting temperature characteristics such that wavelength shifts arise in response to a temperature change, and having respective peaks at different wavelengths, and wherein the controller is configured to select at least one of the plurality of light sources in accordance with the acquired temperature.

2. The depth image acquiring apparatus according to claim 1, wherein the controller is configured to control, in accordance with the environment information, a wavelength of the modulated light or a pass bandwidth of the filter unit.

3. The depth image acquiring apparatus according to claim 1, wherein the filter unit comprises a plurality of filters having respective pass bandwidths different from one another,
the light emitting unit exhibits a temperature characteristic such that a wavelength shift arises in response to a temperature change, and the controller is configured to select at least one of the plurality of filters in accordance with the temperature.

4. The depth image acquiring apparatus according to claim 1, wherein when a predetermined object positioned in the detection area is detected on a basis of the depth information from the sensor, a notification that the predetermined object is detected is output.

5. The depth image acquiring apparatus according to claim 1, wherein the filter unit has a plurality of filters having respective pass bandwidths different from one another, and
the plurality of filters is arranged on a light receiving surface side of the sensor, and the plurality of filters is detachable from the sensor.

6. The depth image acquiring apparatus according to claim 1, wherein the controller is configured to cause the light source which is selected from the plurality of light sources to irradiate the light, and to stop irradiation from one or more light sources that are not selected from the plurality of light sources.

7. The depth image acquiring apparatus according to claim 1, wherein a wavelength shift of a predetermined variation width is generated in the light emitting unit in response to a temperature change of 100 degrees, and
½ of a width of the predetermined pass bandwidth in the filter unit is narrower than the predetermined variation width.

8. The depth image acquiring apparatus according to claim 7, wherein a wavelength shift of at least 10 nm is generated in the light emitting unit in response to the temperature change of 100 degrees, and
½ of the width of the predetermined pass bandwidths in the filter unit is less than 10 nm.

9. The depth image acquiring apparatus according to claim 1, wherein a central wavelength of the predetermined pass bandwidth is between 920 and 960 nm.

10. The depth image acquiring apparatus according to claim 1, wherein the filter unit is configured to transmit 60% or more of the light in the predetermined pass bandwidth, and is configured to transmit less than 30% of the light in a pass bandwidth other than the predetermined pass bandwidth.

11. A depth image acquiring apparatus comprising:
a light emitting unit configured to irradiate modulated light toward a detection area;
a sensor configured to receive the modulated light upon being reflected by an object positioned in the detection area and output a signal based on the received modulated light so as to generate depth information;
a filter unit configured to pass more light having a wavelength in a predetermined pass bandwidth than light having a wavelength in a pass bandwidth other than the predetermined pass bandwidth;
an environment sensor configured to acquire environment information at the light emitting unit or the sensor; and
a controller configured to control at least one among the light emitting unit, the sensor, or the filter unit in accordance with the environment information acquired by the environment sensor, wherein the environment sensor comprises a temperature sensor for acquiring a temperature of the light emitting unit and wherein the filter unit comprises a plurality of filters having respective pass bandwidths different from one another,
the plurality of filters are laminated on a light receiving surface of the sensor,
the light emitting unit has a temperature characteristic such that a wavelength shift arises in response to a temperature change, and
the controller is configured to output the signal by selecting at least one of a plurality of pixel areas of the sensor that corresponds to a filter of the plurality of filters in accordance with the temperature.

12. The depth image acquiring apparatus according to claim 11, wherein the plurality of filters has a predetermined number of first filters having a first pass bandwidth, and a predetermined number of second filters having a second pass bandwidth,
each of the first and second filters has a rectangular shape, and the first and second filters are alternately arranged in a transverse direction of the light receiving surface of the sensor.

13. The depth image acquiring apparatus according to claim 11, wherein the plurality of filters has a predetermined number of first filters having a first pass bandwidth, and a predetermined number of second filters having a second pass bandwidth, and the first and second filters are alternately arranged in a longitudinal direction and in a transverse direction of the light receiving surface of the sensor.

14. The depth image acquiring apparatus according to claim 13, wherein a first depth image is generated from first pixels in which the first filters are arranged, a second depth image is generated from second pixels in which the second filters are arranged, a full depth image is generated (i) by interpolating the first depth image when the first filters are selected by the controller, or (ii) by interpolating the second depth image when the second filters are selected by the controller.

15. The depth image acquiring apparatus according to claim 11, wherein the sensor is configured to stop driving a pixel in an area corresponding to filters of the plurality of filters that are not selected by the controller.

16. A depth image acquiring apparatus comprising:
a light emitting unit configured to irradiate modulated light toward a detection area;
a sensor configured to receive the modulated light upon being reflected by an object positioned in the detection area and output a signal based on the received modulated light so as to generate depth information;
a filter unit configured to pass more light having a wavelength in a predetermined pass bandwidth than light having a wavelength in a pass bandwidth other than the predetermined pass bandwidth;
an environment sensor configured to acquire environment information at the light emitting unit or the sensor; and
a controller configured to control at least one among the light emitting unit, the sensor, or the filter unit in accordance with the environment information acquired by the environment sensor, wherein the environment sensor comprises a temperature sensor for acquiring a temperature of the light emitting unit and wherein the sensor is thermally coupled to the light emitting unit, and a sensor controller is configured to reduce a number of pixels of the sensor that carry out a dummy operation in response to a rise of the temperature of the light emitting unit, and to increase the number of pixels that carry out the dummy operation in response to a decrease of the temperature of the light emitting unit.

17. A method of controlling a depth image acquiring apparatus including a light emitting unit configured to irradiate modulated light toward a detection area in which a depth image is to be acquired to detect a distance, a sensor configured to receive light reflected by an object positioned in the detection area in response to receiving the modulated light, and to produce the depth image by outputting a signal representative of the reflected light, and a filter unit configured to pass more light having a wavelength in a predetermined pass bandwidth than light having a wavelength in a pass bandwidth other than the predetermined pass bandwidth of the reflected light, the method of controlling the depth image acquiring apparatus, comprising:

acquiring environment information at the light emitting unit or the sensor; and controlling at least one of the light emitting unit, the sensor, or the filter unit in accordance with the environment information, wherein acquiring environment information includes acquiring a temperature of the light emitting unit, wherein the light emitting unit comprises a plurality of light sources for emitting light exhibiting temperature characteristics such that wavelength shifts arise in response to a temperature change, and having respective peaks at different wavelengths, and wherein controlling includes selecting at least one of the plurality of light sources in accordance with the acquired temperature.

18. A depth image acquiring system comprising:
a controller configured to control at least one among a light emitting unit, a sensor, or a filter unit in accordance with environment information at the light emitting unit or to the sensor, wherein the environment information is acquired using an environment sensor, wherein the light emitting unit is configured to irradiate modulated light toward a detection area in which a depth image is to be acquired to detect a distance, wherein the sensor is configured to receive light having passed through the filter unit and reflected by an object positioned in the detection area in response to receiving the modulated light, and wherein the filter unit is configured for passing more light having a wavelength in a predetermined pass bandwidth than light having a wavelength in a pass bandwidth other than the predetermined pass bandwidth, wherein acquiring environment information includes acquiring a temperature of the light emitting unit, wherein the light emitting unit comprises a plurality of light sources for emitting light exhibiting temperature characteristics such that wavelength shifts arise in response to a temperature change, and having respective peaks at different wavelengths, and wherein the controller is configured to select at least one of the plurality of light sources in accordance with the acquired temperature.

* * * * *